United States Patent [19]

Floro et al.

[11] Patent Number: 4,568,866
[45] Date of Patent: Feb. 4, 1986

[54] PROGRAMMABLE CONTROLLER FOR STEPPING MOTOR CONTROL

[75] Inventors: William E. Floro, Willoughby Hills; Raymond R. Burkholder, Stowe, both of Ohio

[73] Assignee: Allen-Bradley Company, Milwaukee, Wis.

[21] Appl. No.: 545,768

[22] Filed: Oct. 26, 1983

[51] Int. Cl.⁴ .............................................. G05B 8/00
[52] U.S. Cl. .................................. 318/696; 318/685; 318/561; 318/601
[58] Field of Search ................ 318/696, 685, 561, 601

[56] References Cited

U.S. PATENT DOCUMENTS 4,340,848  7/1982  Hanagata et al. ................... 318/561

OTHER PUBLICATIONS

"B575 Stepping Control Module User's Manual", Gould Corp., Modicon Division, Publication Date Nov. 1979.
"Preliminary User's Manual Stepper Motor Positioning Assembly Cat. No. 1771 QA (Confidential Material)", Allen-Bradley Co., publication date unknown but believed to be prior to Oct., 1983.

Primary Examiner—William M. Shoop, Jr.
Assistant Examiner—Saul M. Bergmann
Attorney, Agent, or Firm—Barry E. Sammons

[57] ABSTRACT

An improved stepping motor controller is comprised of a programmable controller provided with a pair of input/output circuits for controlling the stepping motor in accordance with move data blocks from the programmable controller's central processing unit (CPU) containing user-programmed stepping motor move profile parameters including a user-programmed stepping motor acceleration interval for stepping motor acceleration, user-programmed stepping motor deceleration interval for stepping motor deceleration and a user-programmed stepping motor final position. The pair of input/output circuits includes a master controller module and at least one and up to three satellite output modules. The master controller module is coupled to the programmable controller CPU to read and process the move data blocks to generate satellite move set data blocks for each satellite output module. Each satellite move set data block contains data elements specifying the stepping motor acceleration rate for accelerating the stepping motor to a steady state rate and a stepping motor deceleration rate to decelerate the stepping motor from the steady state rate to a rate to reach the user-programmed final position within the user programmed acceleration and deceleration interval within the user-programmed intervals. Each satellite output module is coupled to the master controller module to read the satellite move set data block therefrom and in response to process the satellite move set data block and generate the pulses which are coupled to the stepping motor to achieve stepping motor acceleration and deceleration over the user-programmed intervals to achieve the user-programmed final position.

19 Claims, 55 Drawing Figures

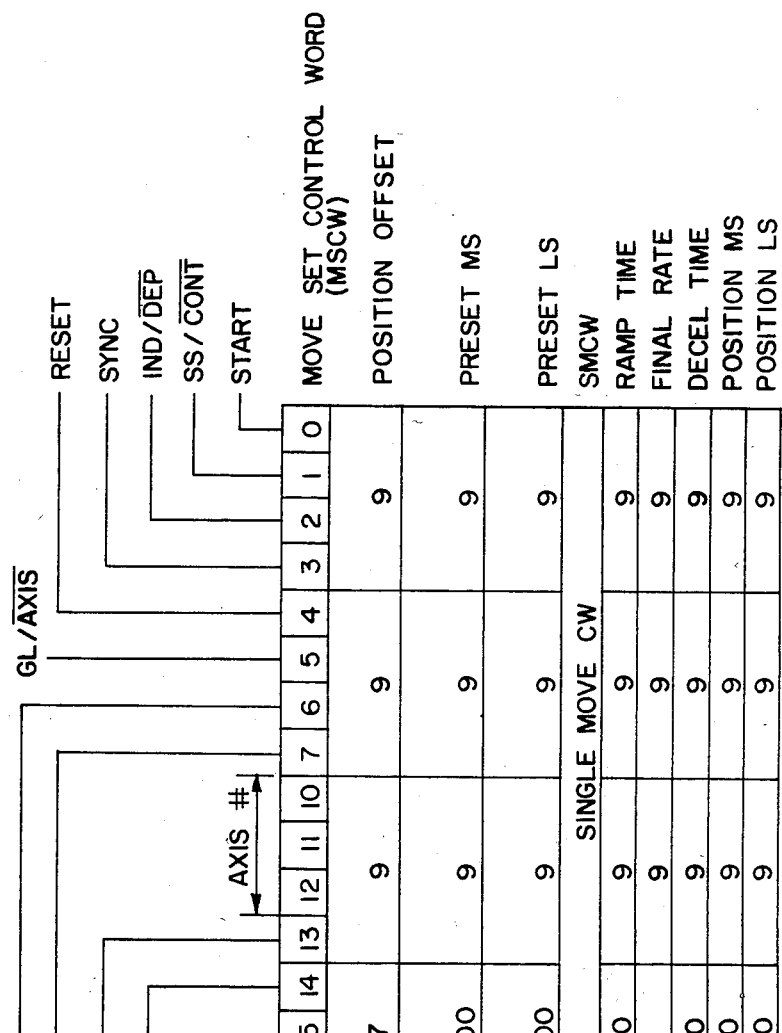
FIG. 4
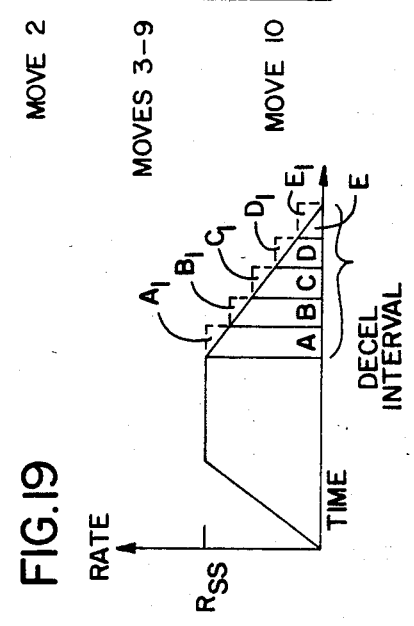
FIG. 26
FIG. 19

RAM

| | |
|---|---|
| (1) | TYPE OF MOVE |
| (2) | Σ |
| (3) | CONTROL BYTE 1 |
| (4) | CONTROL BYTE 2 |
| (5) | CONTROL BYTE 3 |
| (6) | MODE |
| (7-8) | RAMP |
| (9-10) | RATE |
| (11) | REMAINDER |
| (12-13) | DECEL |
| (14-16) | # OF INC'S OF DECEL |
| (17-19) | POSITION |
| (20) | # PULSES / 10 MS DECEL |
| (21-23) | PRESET |
| (24-25) | RAMP REM |
| (26-27) | DECEL REM |
| (28) | P'S / 10 MS RATE |
| (29-31) | ALPHA |
| (32-33) | # DECEL INC'S |

FIG. 7B

RAM

| | | | |
|---|---|---|---|
| DONE | MOVE SET | STATUS | #MOVE |
| POSITION LS (BCD) | | | |
| POSITION MS (BCD) | | | |
| TOTAL NUMBER OF WORDS | | | |
| MSCW | | LS | |
| OFFSET | | | |
| PRESET LS (BCD) | | | |
| PRESET MS (BCD) | | | |
| SINGLE MOVE SET CW | | | |
| RAMP | | | |
| RATE | | | |
| DECEL | | | |
| POSITION | LS (BCD) | | |
| | MS (BCD) | | |
| WSR | | | |

} MOVE # 1

FIG. 7A

TIMER CIRCUIT 168

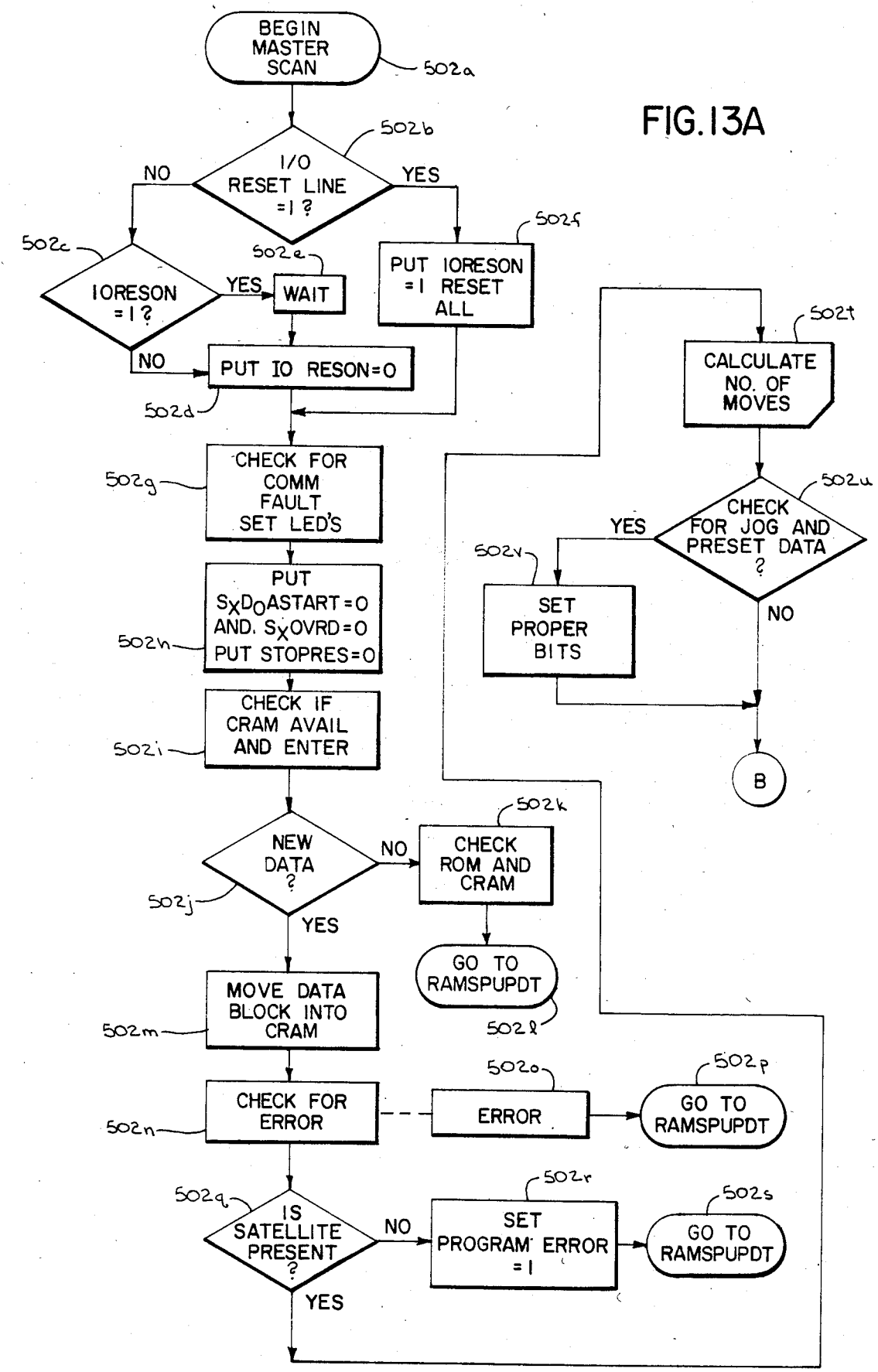

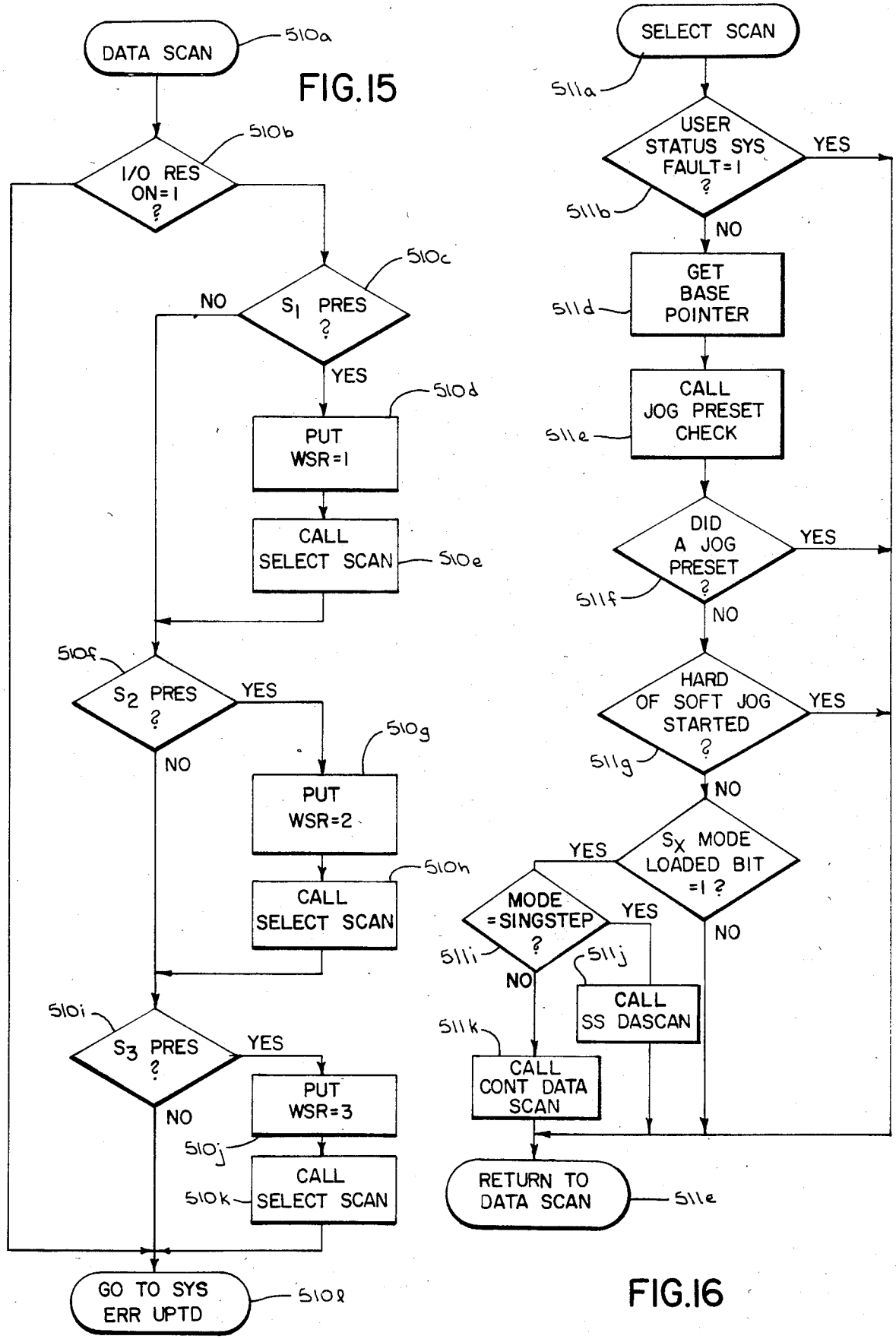

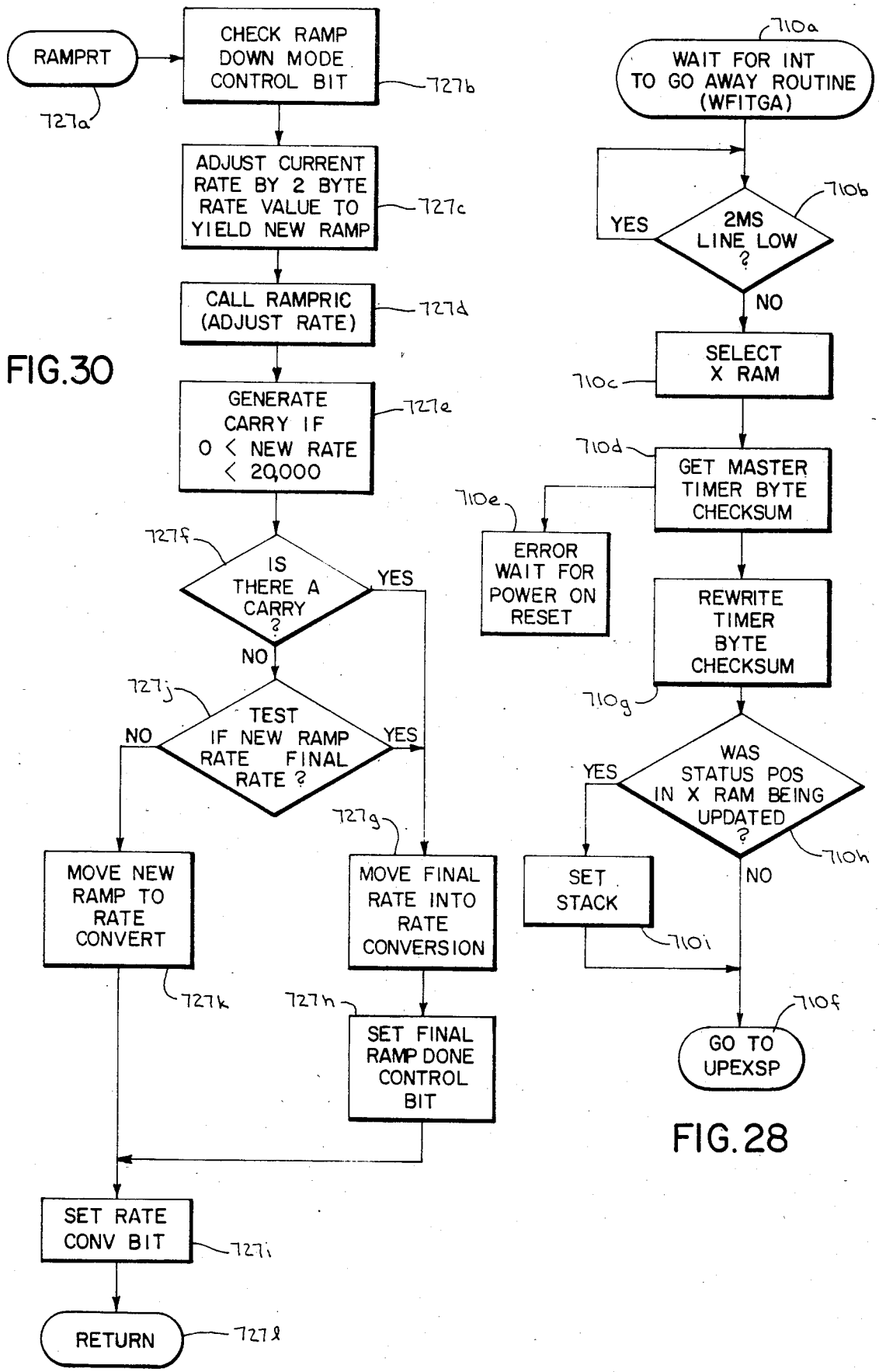

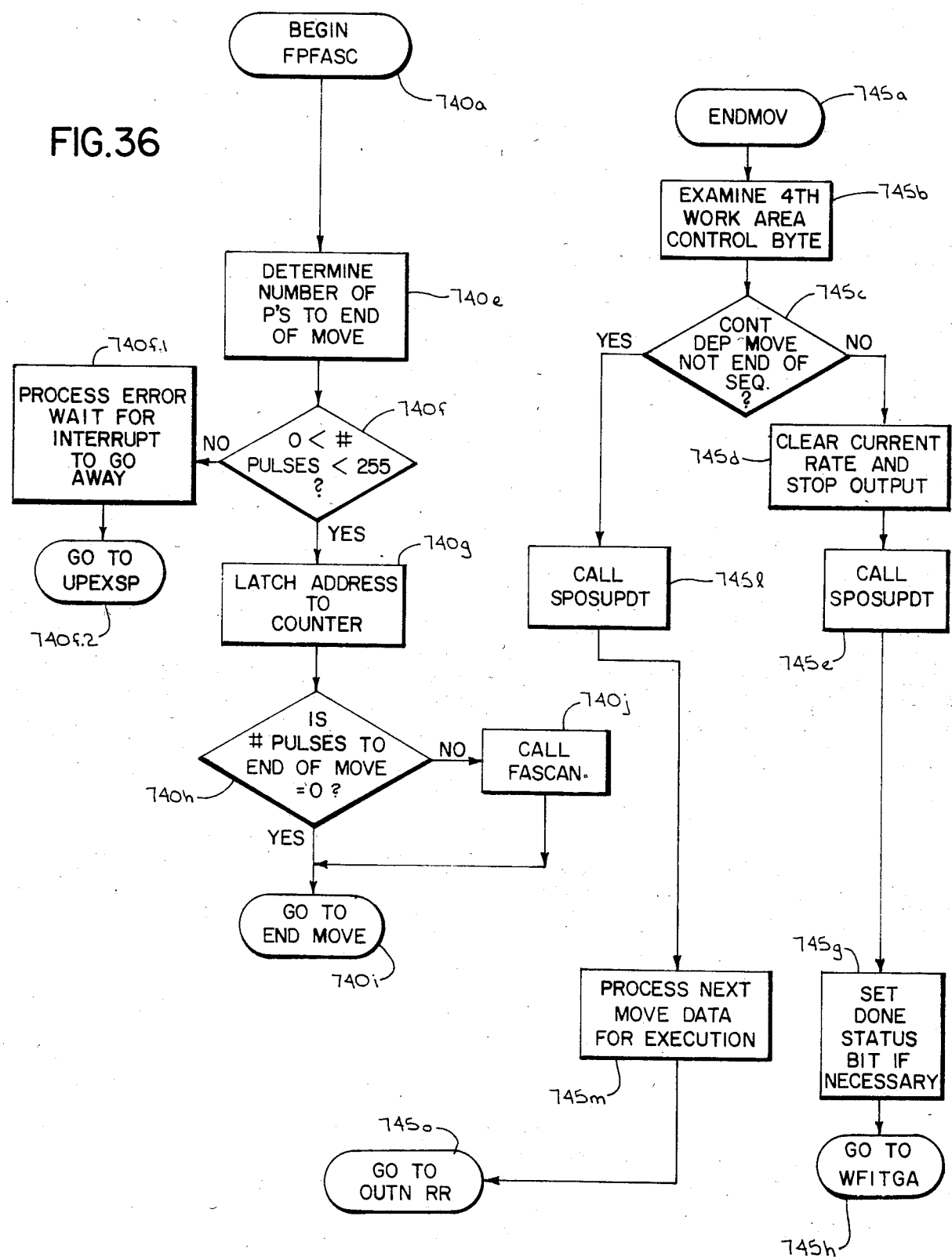

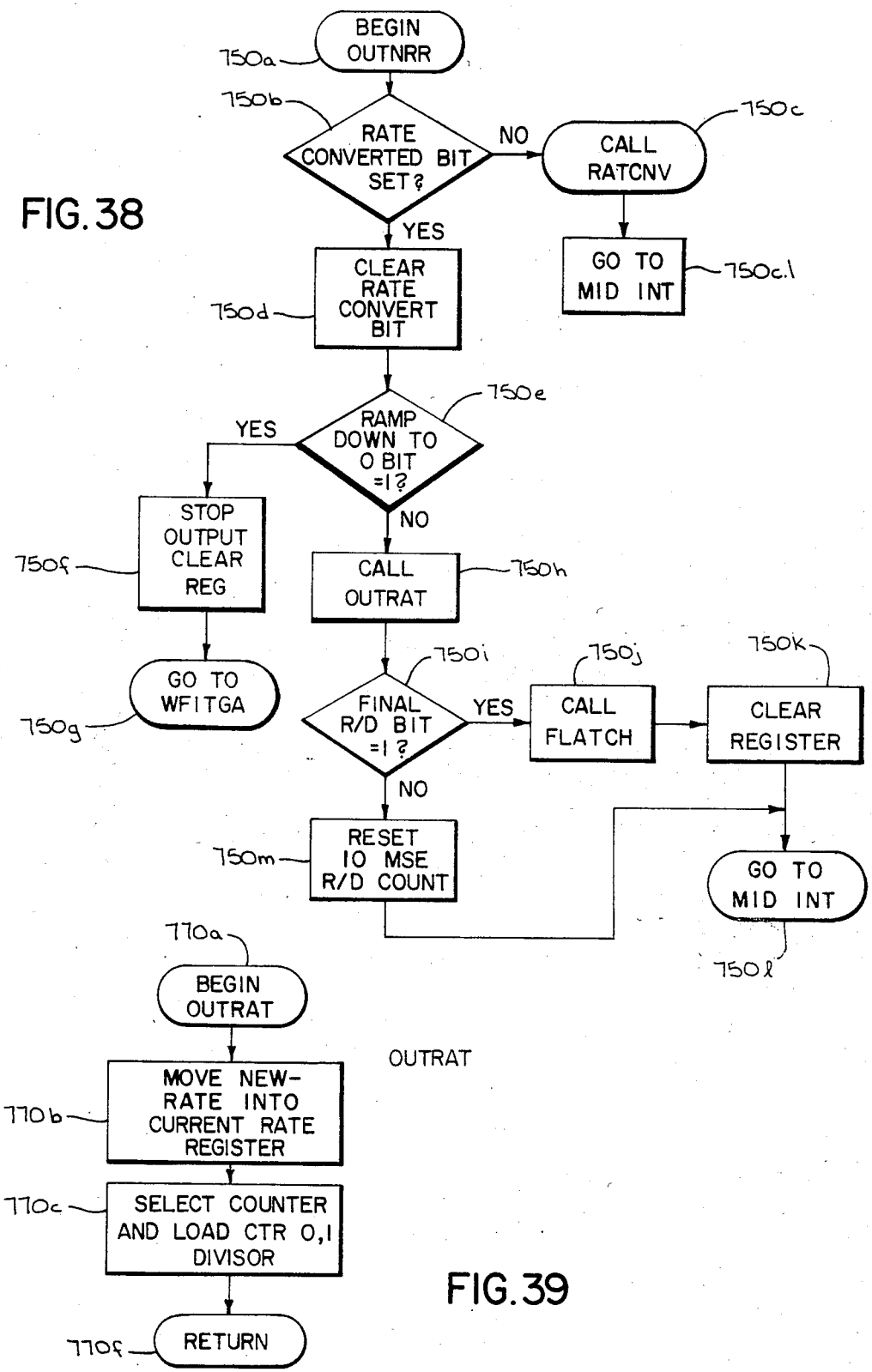

PROGRAMMABLE CONTROLLER FOR STEPPING MOTOR CONTROL

FIELD OF THE INVENTION

This invention relates generally to programmable controllers, and more particularly to a programmable controller for controlling a stepping motor to achieve a stepping motor move profile and to control the stepping motor acceleration, velocity and deceleration necessary to achieve the move profile.

BACKGROUND ART

Stepping motors are increasingly being used in many industrial applications for positioning control. Stepping motors can be controlled in a closed loop fashion, like a servo-controlled motor, by monitoring the actual motor position and adjusting the motor excitation in accordance with the difference between the actual and commanded position to minimize the difference therebetween. Unlike the servo-controlled motor, the stepping motor can also be controlled in an open looped fashion were there is no monitoring of the actual position and comparison with the commanded position.

A typical stepping motor is excited from a stepping motor translator with pulsed excitation signals. The stepping motor translator is driven by pulses which each represent an increment (typically 1.8 degrees) of stepping motor shaft rotation. In response to the application of pulses, the stepping motor translator excites the stepping motor, causing the stepping motor shaft to rotate through an arc determined by the total number of applied pulses. The frequency of the pulse train applied to the stepping motor translator determines the velocity of stepping motor rotation.

The stepping motor shaft inertia prevents the stepping motor from instantaneously achieving a constant velocity in response to the application of a constant frequency pulse train to the stepping motor translator. To assure timely response to an input command, the stepping motor must be accelerated or decelerated to reach the desired steady state rate. A problem in stepping motor control is to assure that the motor acceleration and deceleration does not exceed the physical limitations of the stepping motor. If the commanded stepping motor acceleration or deceleration is too high, then the stepping motor shaft position may not keep up with or will be ahead of the commanded position, as number of pulses, and positional accuracy will be lost. In an open loop system, which lacks position comparison, the motor not responding to pulses or rotating due to inertia of the motor and/or system without pulses being applied results in a position error which cannot be corrected without reinitializing the system.

Prior art stepping motor controllers whether they be of the stand-alone type or an integral element of a larger control system usually require that the user specify the slope or the rate of velocity change in order for the stepping motor controller to control motor acceleration and deceleration. For the sophisticated user, inputting the motor acceleration and deceleration in accordance with the acceleration and deceleration value is not necessarily a disadvantage because the sophisticated user can match the motor acceleration and deceleration in accordance with the physical limitations of the stepping motor and its driven load to achive relatively efficient stepping motor operation. For the unsophisticated machine user, the ease of inputting parameters for the operation of the stepping motor is more important. Users are often familiar with the time intervals in which a stepping motor is to accelerate or decelerate. However, prior stepping motor controllers do not allow the user to program the stepping motor acceleration or deceleration directly from the acceleration or deceleration intervals. Rather, the user must first calculate the acceleration and deceleration values in accordance with the acceleration and deceleration intervals, respectively.

In a large system, the stepping motor is but one of a number of devices which are to be simultaneously controlled. To facilitate control of many different devices programmable controllers are often employed to communicate with all of the devices within a regulated period of time. To control the stepping motor, the programmable controller determines the number of and frequency of pulses to be supplied to the stepping motor to accomplish a stepping motor move profile and accordingly, applies the pulses to the stepping motor translator. In the past, programmable controllers for controlling a stepping motor have accomplished the complex processing functions to calculate the number of stepping motor pulses within the central processing unit. Incorporating the complex processing functions within the central processing unit of the programmable controller incurs the disadvantage that the rate at which the central processor can communicate with the controlled devices may be adversely affected. Also, incorporation of the complex calculating functions within the central processing unit may also limit the ability of the central processing unit to control multiple stepper motors.

BRIEF SUMMARY OF THE INVENTION

The present invention is directed to a controller for a stepping motor which allows the user to input the stepping motor acceleration and deceleration in accordance with an acceleration interval and a deceleration interval, respectively. The controller processes the acceleration and deceleration interval to calculate the acceleration and deceleration values based on the user-programmed acceleration and deceleration time intervals and the user programmed final position.

More particularly,, the present invention is directed to a stepper motor controller having a main processor for storing a plurality of stepping motors move profile parameters which are input by the user in a data block including (i) a acceleration interval, (ii) a steady state rate, (iii) a deceleration interval, and (iv) a final position. The main processor is operative to transmit the move data block containing these data elements to a master controller module which possesses the move data block to yield a satellite move set data block containing data elements including the stepping motor acceleration value and a stepping motor deceleration value. A satellite output module is coupled to the master controller and receives the satellite move set data block therefrom. In response to the satellite move set data block, the satellite output module generates the pulses supplied to the stepping motor to accomplish the move profile parameter.

In accordance with another aspect of the invention there is provided a method for controlling the stepping motor to accomplish a user-programmed stepping motor move profile. The method includes the steps of reading a move data block storing a plurality of move profile parameters which are input by the user including (i) a acceleration interval, (ii) a stepping motor deceleration interval, (iii) a final position and (iv) a steady state rate. The move data block is processed to yield move data elements including a stepping motor acceleration value and a stepping motor deceleration value. The motor is accelerated to the steady state rate by first incrementing the stepping motor rate by an amount determined by the acceleration value. The steady state rate is checked to determine whether the steady state rate has been reached and if not, the step of incrementing the stepping motor rate is periodically repeated until the stepping motor steady state rate is reached. The motor is decelerated by first decrementing the current stepping motor rate by a calculated amount determined from the deceleration value to achieve a new incremental stepping motor rate, then calculating the number of deceleration interval pulses required to achieve the new stepping motor rate, and finally, outputting the calculated number of deceleration interval pulses to the stepping motor. The steps of decrementing the current stepping motor rate, calculating the number of deceleration interval pulses, and outputting the calculated number of deceleration interval pulses is periodically repeated to decelerate the motor to a zero rate to reach the final position within the deceleration interval.

To account for the fractional pulse remainder which may result from the calculation of the number of deceleration interval pulses required to be output during each interval, the fractional pulse remainder is saved. The saved fractional pulse remainders are accumulated in an accumulating register. When the accumulated value of the saved fractional pulses exceeds a predetermined value, the number of deceleration interval pulses to be output to the stepping motor during the next interval is incremented to account for the fractional pulses.

It is an object of the present invention to provide a stepping motor controller which allows the user to set up the stepping motor move profile by inputing the stepping motor acceleration and deceleration time intervals, the steady-state stepping motor rate and the stepping motor final position. The stepping motor controller accomplishes the necessary calculations to derive the stepping motor acceleration and deceleration values to facilitate ease of the input of parameters.

It is yet another object of the present invention to provide an improved method for controlling a stepping motor in accordance with the stepping motor move profile parameters including the stepping motor acceleration and deceleration intervals, the stepping motor final position and at least one steady state rate. The improved method includes the step of converting the acceleration and deceleration intervals into an acceleration value and a deceleration value, respectively. From the calculated acceleration and deceleration values, the number of stepping motor acceleration interval pulses and deceleration interval pulses can be supplied to the stepping motor to accomplish the stepping motor move profile.

BRIEF DESCRIPTION OF THE DRAWINGS

FIG. 4 is a map of the move data block generated and stored by the main processor of FIG. 1 to control each stepping motor;

FIG. 7a is a map of the random access memory associated with the arithmetic processor of the master controller module;

FIG. 7b is a map of the common random access memory shared by both master controller module and the satellite output module;

FIGS. 13a and 13b comprise a flow chart representation of the subroutine BEGMSCAN which is executed to preprocess the move data block supplied from the main processor;

FIG. 15 is a flow chart representation of the DATA SCAN routine which is executed to process the move data block and yield the satellite move set data block which is sent to each satellite output module;

FIG. 16 is a block diagram of the SELECT SCAN routine which is executed during the DATA SCAN routine of FIG. 15 to select the appropriate scan mode for the type of user programmed stepping motor move profile;

FIG. 19 is a graphical representation of the rate versus time for a single mode stepping motor move profile; showing the periodic deceleration intervals;

FIG. 26 is a graphical representation of the rate vs. position for a single step mode designating the beginning of the deceleration interval;

FIG. 28 is a flow chart representation of the subroutine WFITGA which is executed at the completion of the interrupt routine of FIG. 27 to wait for the interrupt to go away;

FIG. 30 is a flow chart representation of the subroutine RAMPRT which is executed during the XMOVA routine of FIG. 29 to calculate the ramp rate;

FIG. 36 is a flow chart representation of the FPFASC routine which is executed during the MIDINT routine of FIG. 33 to determine whether the point of fast scan has been reached during the deceleration portion of a single mode move profile;

FIG. 37 is a flow chart representation of the ENDMOV routine which is executed at the completion of the FPFASC routine of FIG. 36 to initiate the output of pulses to the stepping motor translator to achieve the stepping motor move;

FIG. 38 is a flow chart representation of the subroutine OUTNRR which is executed during the ENDMOV routine of FIG. 37 to output pulses to the stepping motor translator to achieve the stepping motor move;

FIG. 39 is a flow chart representation of the OUTRAT routine which is executed during the OUTNRR routine of FIG. 38 to move data into the counter of the satellite output module so that the counter may be decremented to produce the pulses supplied to the stepping motor translator to achieve the stepping motor move profile;

DETAILED DESCRIPTION OF THE PREFERRED EMBODIMENT

Figure 1:
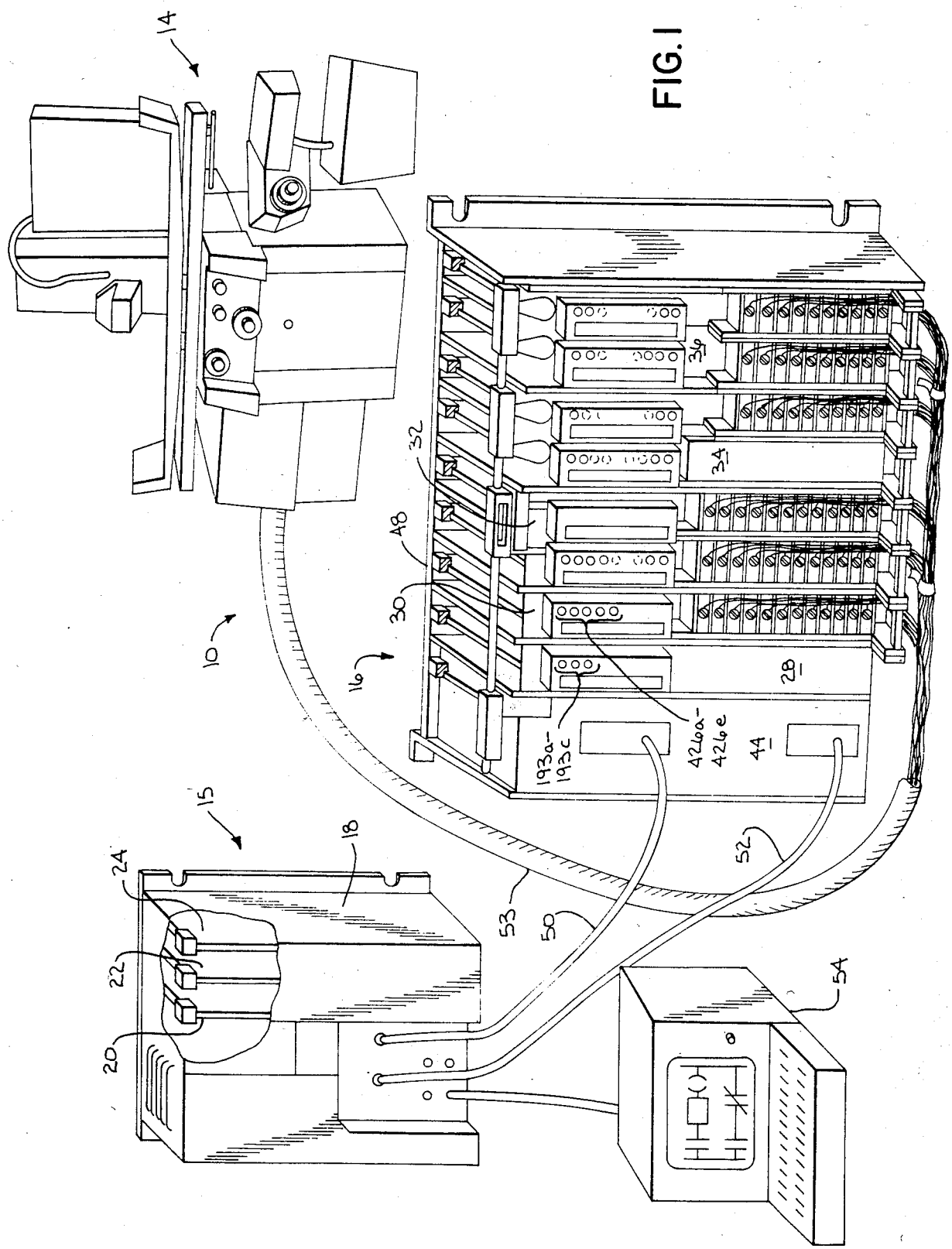
FIG. 1 is a perspective view of the stepping motor controller of the present invention.

Referring now to FIG. 1, there is shown a stepping motor controller 10 for controlling a stepping motor 13 (illustrated in FIG. 2) such as may be embodied within a grinding machine 14. Grinding machine 14 is only exemplary of the many different types of machinery which may embody stepping motors and thus it should be understood that the stepping motor controller 10 of the present invention is not specifically limited for use with grinding machines. The stepping motor controller 10 of the present invention includes a programmable controller comprised of a processor unit 15 and an interface rack 16. In the presently preferred embodiment, the programmable controller comprised of the processor unit 15 and the interface rack 16 takes the form of an Allen-Bradley model PLC-2/30 ™ programmable controller which is described and claimed in U.S. Pat. No. 4,266,281 issued May 5, 1981 to O. Struger and assigned to the assignee of the present invention. The processor unit 15 comprises an enclosure 18 which houses a memory module 20, a processor module 22 and a processor interface module 24, each of which comprises a plurality of integrated circuits and other electrical components which are solder bonded to a printed circuit board having edge connections for electrical connection to each of the other modules. For a further, more detailed description of the primary functional units formed by the memory module 20, the processor module 22 and the processor interface module 24, reference should be had to the aforesaid Struger patent.

The interface rack 16 of FIG. 1 carries up to 8 input/output I/O modules 28, 30, 32, 34, 36, respectively, together with an adapter module 44. Each of the input/output modules 34 and 36 occupies two slots which accounts for the reason only six I/O modules have been shown in rack 16. The I/O modules 28-36 are coupled to the adapter module 44 via a back plane motherboard 48 which extends across the entire length of the interface rack 16. A multiconductor input/output (I/O) interconnect cable 50 couples the adapter module 44 to the processor unit 15 so that a parallel bus is created between the adapter module 44 and each of the memory module 20, the processor module 22 and the processor interface module 24 of the processor unit 15. A power supply cable 52 couples the power supply (not shown) of the processor unit 15 to the adapter module 44 so that the adapter module 44 and each of the I/O modules 28-42 is powered from the power supply within the processor unit 15. If the processor unit 15 is to be located more than 50 feet (15 meters) from the interface rack 16, then it may be desirable to employ a separate power supply (not shown), carried by the input/output rack 16 for powering the adapter module 44 in each of the input/output modules 28-42.

Still referring to FIG. 1, the memory module 20 of the processor unit 15 stores a user program which is entered to processor unit 15 via a terminal 54. The user program is expressed in the form of a ladder diagram having one or more rungs which will represent the actuation of one or more output devices in accordance with the actuation state of one or more input devices. The processor 15 is not physically connected to the machine 14. Only the input/output modules 28-42 are connected to the machine via a multiconductor cable 53. Rather, the processor unit 15 is supplied from the input/output modules 28-36 with data, in the form of binary bit strings (words) signifying the condition of the various output devices such as limit switches, relay contacts or manually actuated push buttons, for example, of the machine 14. In response to data which represents the output state of various limit switches, relays, and manual switches of the machine 14, as supplied to the processor unit 15 from the I/O modules 28-36, the processor unit 15 generates output data in accordance with the user program which is in turn supplied to the machine via the input/output modules 28-36 to control the machine 14.

As may now be appreciated, the I/O modules 28-36 thus serve to interface the processor unit 15 to the machine 14 to allow the machine to be controlled by the processor responsive to the condition of the machine output devices in accordance with the user program 62.

The particular construction of each of the input/output modules 28-36 is determined by the machine output devices to be sensed by the module and by the machine input devices to be controlled by the processor unit 15 via the module. The I/O modules 28 and 30 operate in combination with the processor unit 15 to control the stepping motor 13 (FIG. 2) of machine 14 which moves the machine grinding wheel along a programmed path. The remaining input/output modules 32, 34 and 36 operate in combination with the processor unit 15 to control auxiliary machine 14 functions such as coolant flow and do not actually comprise a portion of the stepping motor control of the present invention and therefore will not be described.

The stepping motor controller 10 of the present invention (comprised of the processor unit 15 and the interface rack 16 in combination with the I/O modules 28 and 30) is unique as compared to conventional stepping motor controllers. As will be described in greater detail hereinafter, the stepper motor controller 10 of the present invention allows the user to program stepping motor acceleration and deceleration in accordance with the desired acceleration and deceleration intervals. In contrast, present day stepping motor controllers require that the user program the machine acceleration and deceleration by programming the acceleration and deceleration values, respectively. Often times, the machine user may lack the sophistication necessary to evaluate and calculate the machine acceleration and deceleration values. However, based on past experience, the machine user will likely have a good intuitive feeling as to how long the acceleration and deceleration intervals should be to achieve the desired machine operation. Thus, allowing the machine user to program the stepping motor acceleration and deceleration by programming the acceleration and deceleration intervals simplifies machine programming which is very desirable.

Figure 2:
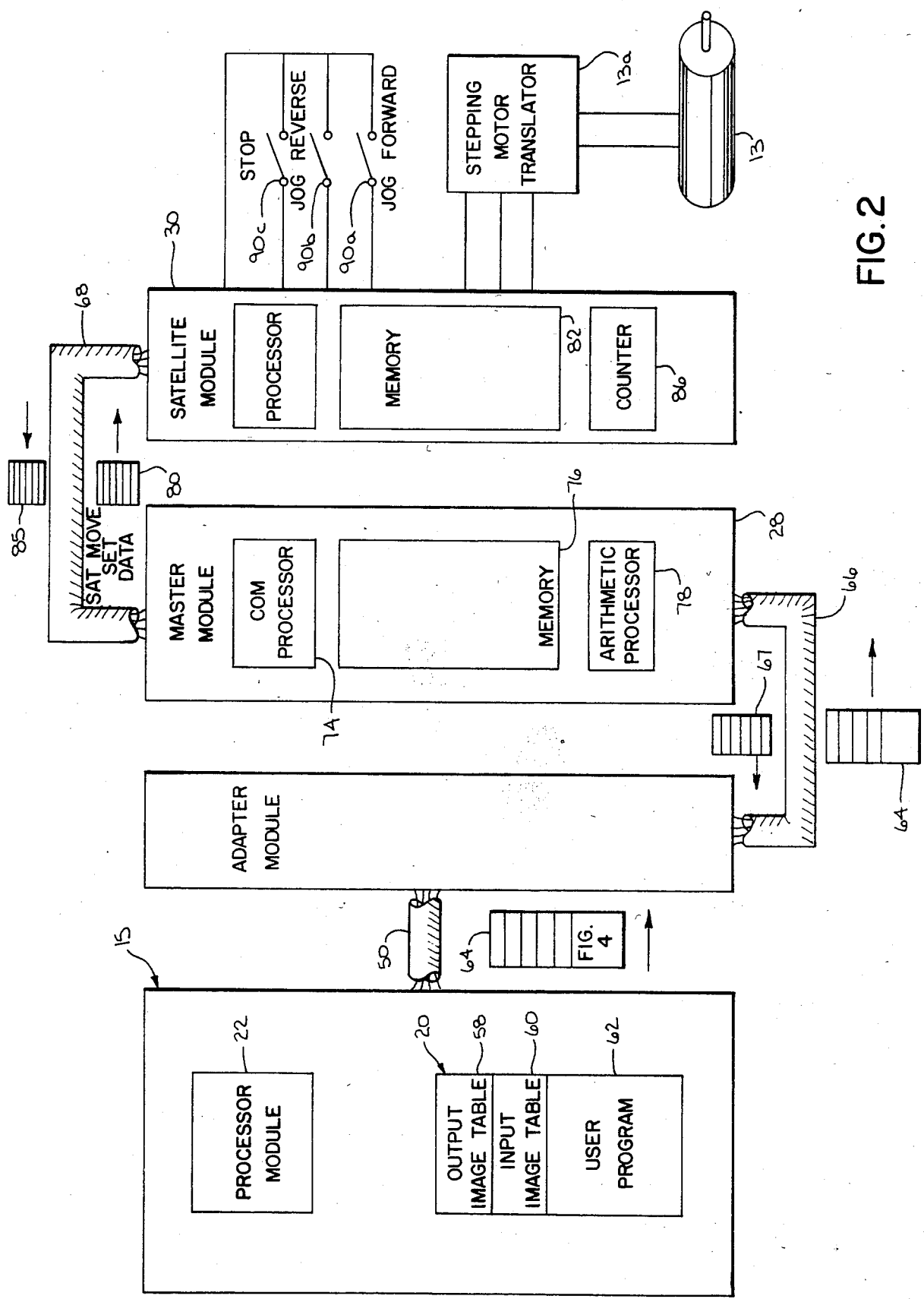
FIG. 2 is a simplified electrical block diagram of the stepping motor controller of FIG. 1.

Referring now to FIG. 2, there is shown a block diagram of the stepping motor controller 10 described in part with respect to FIG. 1. As illustrated in FIG. 2, the memory module 20 of the processor unit 15 stores an output image table 58, an input image table 60, and a user program 62. The input image table 60 stores input data representative of the stepping motor status and position, which data is supplied to the processor unit 15 from the input/output module 28. Thus, when the processor module 22 addresses the image table 60 within the memory module 20, the processor module 22 can sense the stepping motor 13 status and position. In a similar fashion, the move data block 64 generated by the processor module 22 in accordance with the user program 62 for controlling the stepping motor 13 responsive to the input data, is stored in the output image table 58 of the memory module 20. The move data block stored in the output image table is transmitted via interconnect conductor 50 to the adapter module 44 for transmission via a primary data bus 66 on the back plane motherboard 48 (illustrated in FIG. 1) to the module 28.

The adapter module 44 serves to multiplex and demultiplex the data sent between the processor unit 15 and input/output module 28, which will hereafter be identified as the master controller module as it serves to control the operation of I/O module 30 which is hereafter referred to as a satellite module 30. In particular, the adapter module 44 serves to demultiplex the move data block 64 from the processor unit 15. The move data block 64 contains user programmed stepping motor move parameters, including an acceleration interval, deceleration interval, a steady state rate, and a final position.

Still referring to FIG. 2, the adapter module 44 also serves to multiplex status information, received from the master controller module 28 along bus 66 in the form of a status and position block 67, for transmission to the processor unit 15. The status data contained in block 67 is indicative of the stepping motor 13 status and position. Such status and position information is generated in accordance with the status and position data produced by the satellite output module 30 and is put on a secondary data bus 68 embodied on the back plane motherboard 48 of FIG. 1 for transmission to the master controller module 28. The combination of the connecting cable 50, the adapter module 44 and the primary bus 66 effectively provides a parallel bus connection between the master controller module 28 and the main processor 15.

The master controller module 28 includes a communications processor 74 which controls communication between the processor unit 15 and the master controller module 28. The program for the communicating processor 74 is stored within the memory 76 of the master controller module 28. The memory 76 also stores the move data blocks 64 sent from the processor unit 15. The master controller module 28 also includes an arithmetic processor 78 coupled to the memory 76 for processing the move data blocks 64 supplied from the processor unit 15 to yield satellite move set data, represented graphically by satellite move set data blocks 80. The satellite move set data block 80 is sent by the master controller module 28 to the satellite module 30 along the secondary data bus 68. In accordance with the satellite move set data block 80 received from the master controller module 28, the satellite output module 30 controls the stepping motor 13 by supplying the stepping motor translator 13a with the appropriate sequence of pulses. Each master controller module 28 is capable of controlling up to three satellite modules in accordance with three separate move data blocks 64. In other words, each master controller module 28 generates a satellite move set data block 80 for each of three satellite output modules 28 whereas each satellite output module 28 controls but a single stepping motor 13. However, for purposes of simplifying the description of the invention, only one satellite output module 30 will be described.

The satellite module 30 includes a memory 82 which stores the satellite move set data block 80. A processor 84 within the satellite output module 30 is responsive to the satellite move set data block 80 stored in the memory 82 and in accordance with the satellite move set data block 80 stored in memory 82, the processor 84 controls the operation of a counter 86 which in turn supplies the stepping motor translator 13a with pulses, causing the stepping motor translator 13a to excite the stepping motor 13 accordingly to achieve the desired stepping motor move profile. Also, the processor 84 of the satellite output module 30 monitors the position and status of the stepping motor 13. It is the processor 84 which generates the satellite status block 85 containing the stepping motor status and position. In response, the processor 78 of the master controller module 28 combines the status information from each satellite output module to generate the status block 67 put on the primary bus 66 to the processor unit 15.

In addition to being coupled to the secondary data bus 68 and to the stepping motor translator 13a, the satellite output module 30 is also coupled to switches 90a, 90b and 90c. Switch 90a is designated as the "Jog Forward" switch as actuation of switch 90a causes the satellite output module 30 to output pulses to the stepping motor translator 13a to cause a forward jog in stepping motor rotation. Switch 90b is designated as the "Jog Reverse" switch since actuation of switch 90b causes a backward jog in stepping motor 13 rotation. Switch 90c is designated as the "Stop" switch as actuation of switch 90c causes the satellite module to eventually cease outputting pulses to the stepping motor translator 13a, causing the stepping motor translator to cease excitation of the stepping motor 13.

Figure 3A:
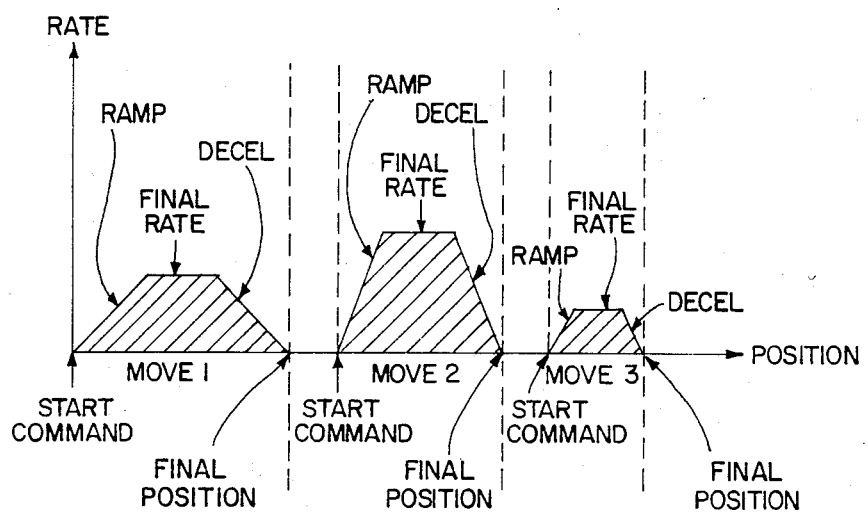
FIGS. 3A–3C graphically illustrate the rate vs. time relationship for a single step mode independent stepping motor move profile, a continuous independent mode stepping motor move profile and a continuous dependent mode stepping motor move profile, respectively.
Figure 3B:
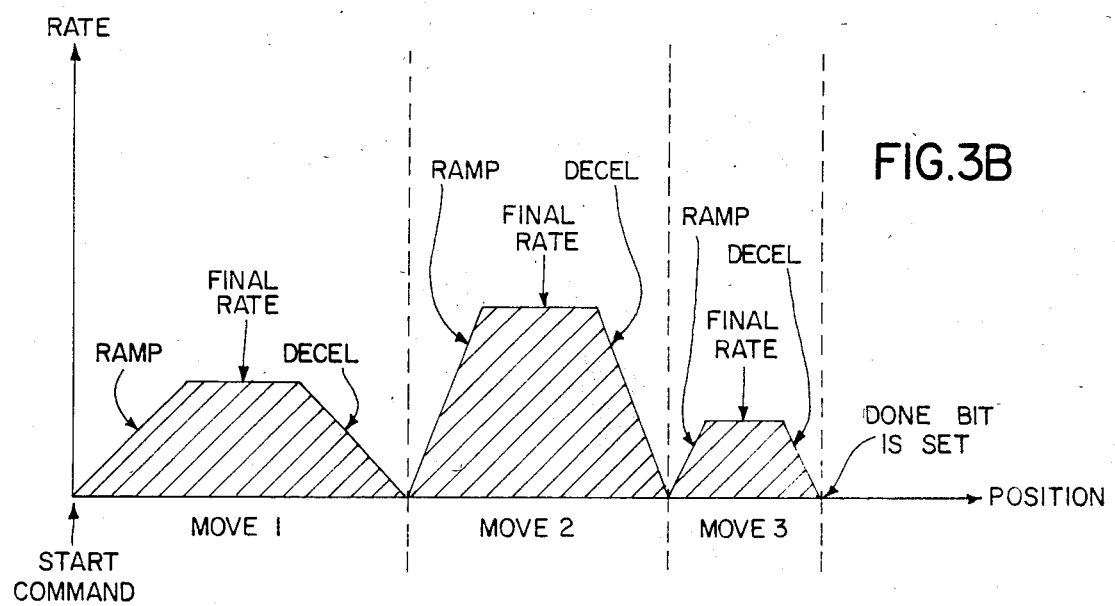
Figure 3C:
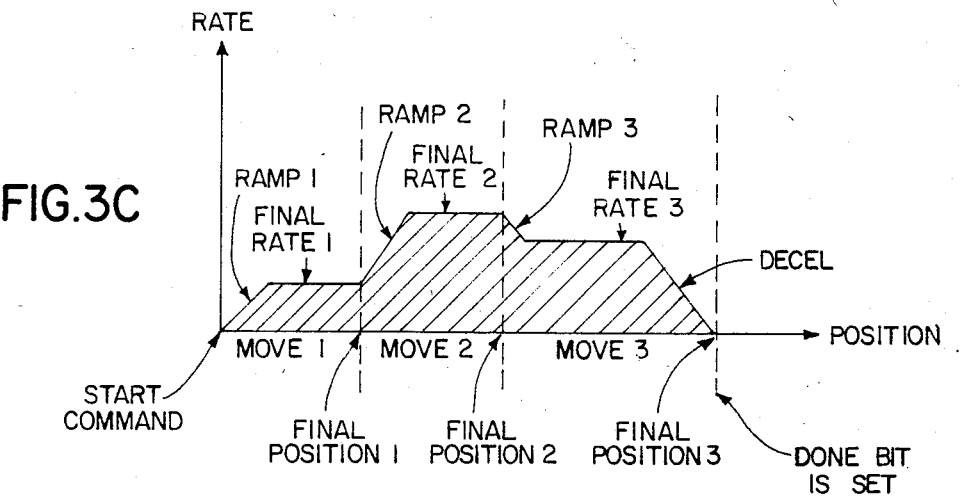

FIGS. 3A, 3B and 3C each graphically depict the relationship between the stepping motor rate versus time for a single step mode stepping motor move profile, an independent mode stepping motor move profile and a continuous mode stepping motor move profile, respectively. Regardless of the mode type of the move profile, the distance of stepping motor movement from a starting position (when a start command is received) to the end position (at which the done bit is set) is determined by the number of pulses supplied to the stepping motor translator 13a of FIG. 2. Returning to FIG. 2, in response to each pulse received from the satellite output module 30, the stepping translator 13a excites the stepping motor 13 causing its shaft to move through a preset arc of typically 1.8°. The distance of stepping motor movement equals the number of applied pulses and is given by the product of the stepping motor rate (the number of pulses per time interval supplied to the stepping motor) and the time (the number of intervals of applied pulses). Referring now to FIGS. 3A, 3B and 3C, the total distance of movement between initiation of a stepping motor move (start command) and when the done bit is set (signifying completion of the move) is equal to the shaded area under each curve.

Because of the inertia attributable to the stepping motor 13 of FIG. 2 and its driven load, the stepping motor does not instantaneously accelerate to a desired steady state rate upon receipt of a constant frequency pulse train from the stepping motor translator 13a of FIG. 2. Rather, the stepping motor only reaches the final steady state rate after a given interval of time. If an attempt is made to instantaneously accelerate the stepping motor 13 to a desired steady state rate by the application of a constant frequency pulse train to the stepping motor translator, it is quite probable that the stepping motor 13 will not keep with the pulses so that a positioning error inevitably will occur. Referring to FIGS. 3A, 3B and 3C, to overcome this problem, during each move profile the stepping motor must be accelerated, during a ramp interval in order to reach a steady state rate ($R_{ss}$). Since the inertia of the stepping motor 13 and its driven load also prevents instantaneous stepping motor deceleration, in order to reach a final position at a zero rate, the stepping motor must be decelerated during a deceleration (decel) interval as illustrated in each of FIGS. 3A, 3B and 3C.

Present day stepping motor controllers accomplish stepping motor control by accelerating and decelerating the stepping motor in accordance with a stepping motor acceleration and deceleration value. In order for the user to input the appropriate acceleration and deceleration values, the user must first understand the machine dynamics and then must obtain quantified values indicative of the machine parameters in order to accurately calculate the appropriate acceleration and deceleration values. Many users lack the formal training necessary to undertake such calculations. However, from past experience, the user often knows that the stepping motor should accelerate during a given interval in order to achieve a steady state rate and that the stepping motor should decelerate during a specified interval to achieve a zero velocity at a final position.

As previously indicated, the stepping motor controller 10 of the present invention is unique because it enables the user to accomplish a stepping motor move profile by programming the stepping motor acceleration and deceleration intervals in contrast to the necessity of programming the acceleration and deceleration values as required by prior art stepping motor controllers. Referring back to FIG. 1, to program a particular move profile, the user enters stepping motor move profile parameters into the processor unit 15 of FIG. 1 via the terminal 54 of FIG. 1. The stepping motor move profile parameters are contained within a move data block such as move data block 64 of FIG. 2. The arrangement of the move profile parameters within the move data block 64 is graphically illustrated in FIG. 4 which is a map of the move data block 64.

Turning now to FIG. 4, each move data block 64 can specify up to 10 stepping motor moves of a move profile. Each stepping motor move profile can be composed of (a) from 1 to 10 single step moves, each requiring its own start command, as illustrated in FIG. 3A, (b) from 1 to 10 independent moves, each having an acceleration and deceleration, and a single start command for the whole profile as illustrated in FIG. 3B or (c) a series of from 1 to 10 continuous moves requiring only a single start and each move having a ramp to the steady state rate but in the entire profile there is only one deceleration to 0 Hz rate. As will be described, each move of each move data block 64 contains 6 binary bit strings (words) each typically 16 bits in length and each specifying a particular parameter of the move profile. Each move data block 64 also contains four control words comprising a MOVE SET CONTROL WORD (MSCW) described below, a POSITION OFFSET WORD and two PRESET WORDS.

The MOVE SET CONTROL WORD is always the first word of each move set data block. Each of the bits of the MOVE SET DATA WORD serves to control a particular function in the control of the stepping motor move profile. The function of each bit is summarized below in Table I.

TABLE I

| Bit Number | Description of the Bit Function |
| --- | --- |
| Bit 0 | START COMMAND bit. When the START COMMAND bit is set, that is to say, the START COMMAND bit is a binary "1" the stepping motor controller starts the execution of the first or next move. |
| Bits 1, 2 | MODE Select bits. The two bits of the MODE Select bit determines the type of the move profile.<br>Bit 1  Bit    MOVE TYPE<br>1       9      Continuous (FIG. 3c)<br>0       1      Independent (FIG. 3b)<br>1       1/0    Single Step (FIG. 3a) |
| Bit 3 | SYNCHRONIZED AXIS bit. The SYNCHRONIZED AXIS bit, when set, causes all of the satellite output modules 30 controlled by the master controller module 28 to be synchronized |

TABLE I-continued

|   |   |
| --- | --- |
|  | to one another so that up to three axes can be synchronized. Note that in order for the master controller module 28 to synchronize up to three axes, the SYNCHRONIZED AXIS bit of the MSCW for each of the three axes must be set. |
| Bit 4 | RESET COMMAND Bit. The RESET COMMAND Bit resets the status and position information and all the move block data in the master controller module when the bit is set. The RESET COMMAND Bit resets either a single axis (a single satellite output module) or all the axes depending on the logic state of the global axis bit (Bit 5) described below. |
| Bit 5 | The GLOBAL/$\overline{\text{AXIS}}$ Bit. The setting of this bit causes all of the satellite output modules controlled by the master module 28 to be stopped or reset with a single command. |
| Bit 6 | STOP COMMAND Bit. The setting of this bit causes a cessation of output pulses in either a controlled deceleration fashion or instantaneously, depending on how the decel/$\overline{\text{instantaneous}}$ bit (Bit 7) is set. Depending on setting of the GLOBAL/$\overline{\text{AXIS}}$ Bit (Bit 5), a STOP Command will be limited to either a single satellite output module (axis) or to all axes. |
| Bit 7 | DECEL/$\overline{\text{INSTANTANEOUS}}$ Bit. The setting of this Bit causes the output pulse rate to decelerate to zero in accordance with the deceleration value in the move data block that was being executed when the STOP Command was received. If the DECEL/$\overline{\text{INSTANTANEOUS}}$ Bit is not set, that is to say the Bit is "0", the master controller module 28 causes the satellite output module 30 to immediately cease outputting pulses to the stepping motor translator 13a of FIG. 1. |
| Bits 10, 11 | AXIS ADDRESS Bits. The AXIS ADDRESS Bits define the address of the axis, that is to say the satellite output module which is to be controlled by the data or commands or both in the move data block.<br><br>Bit 10   Bit 11   Satellite Module No.<br>0        1        1<br>1        0        2<br>1        1        3 |
| Bit 12 | Bit 12 is always set to zero. |
| Bit 13 | OFFSET COMMAND Bit. When the OFFSET COMMAND Bit is set, the offset value contained in the offset word (described below) is added or subtracted to the final position value of all moves. Whether the offset value is added or subtracted is determined by the particular value of a selected bit within the OFFSET word described hereinafter. |
| Bit 14 | SOFTWARE JOG REVERSE Command Bit. The setting of the JOG REVERSE Command Bit causes stepping motor movement in the reverse direction for so long as the bit is set or until the final program position is |

TABLE I-continued

| | |
|---|---|
| | achieved. The stepping motor move profile parameters (ramp, steady state rate, decel value and final position) are followed during a REVERSE JOG. |
| Bit 15 | Software JOG FORWARD Command Bit. The JOG FORWARD Command Bit serves a function identical to the JOG REVERSE Command Bit except that the stepping motor moves in a forward direction for so long as the JOG FORWARD Command Bit is set or until the final program position is reached. |
| Bit 16 | MOVESET Bit. The MOVESET bit allows continuous execution of move data blocks by setting the MOVESET bit to label each move data block as a moveset "0" or a moveset "1" block. When the MOVESET bits of consecutive move data blocks are alternately labeled "1" for the first, "0" for the second, "1" for the third etc., the movesets are executed in sequence without interruption as one large moveset. |
| Bit 17 | OVERRIDE COMMAND bit. The OVERRIDE COMMAND bit, when set, causes the current move block to be interrupted and the override move block to be blended immediately to the interrupted move in progress. |

The second word in each block is the POSITION OFFSET word which, when set, allows the entire move profile (all of the moves of the move data block 64) to be shifted to compensate for machine wear without the need to reinput the move profile. Up to 7,999 pulses can be specified. As illustrated in the move set data block map of FIG. 4, the offset value is entered via binary coded decimal (BCD), each BCD digit being entered in bits 0–3, 4–7, 10–14 and 14–16, respectively. The highest order bit (Bit 17) of the POSITION OFFSET word is designated as the offset control bit and is set to a 0 or 1 depending on whether the offset values are to be added or subtracted from the final position. The POSITION OFFSET word effects only the move profile of the moveset specified in the current move data block. If the subsequent move profiles (as specified by subsequent move data blocks) are to be offset, then the offset control bit (bit 13) of the MOVE SET CONTROL WORD described previously must be reenabled.

The two PRESET words which follow the POSITION OFFSET word in the move data block, serve two important functions. The first function of the two PRESET words is to define the starting point of the positioning profile and the second function is to extend one or more moves of the move profile beyond the 999,999 pulse, that is to say, position limit of the stepping motor controller of the present invention. The preset data can take any value between 0 and 999,999. To represent the maximum preset data value of 999,999 in binary coded decimal requires two 16 bit words. Thus, the first PRESET word contains the three most significant digits in binary coded decimal of the preset value and the second of the words containing the least significant three digits in binary coded decimal. The three digits of the most and least significant preset value are entered in bits 0–3, 4–7, and 10–13, respectively, of the first (most significant) and second (least significant) PRESET words, respectively. Bits 14–16 of the first and second PRESET words have no function and are set equal to 0. The bit 17 of the first or most significant PRESET word is defined as the assert or initialization preset bit because when this bit is set (which is allowable only before a move profile has begun), the preset values represented by the BCD values in the first or most significant and second or least significant PRESET words are written over, that is to say, they are substituted for the position value in the position value register (described hereinafter) of the master controller module 28 of FIG. 1.

Figure 5A:
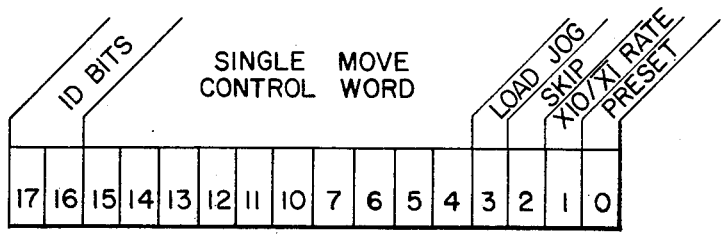
FIG. 5 is a map of the single move control word comprising a part of each move of the move data block of FIG. 4.

Still referring to FIG. 4, each of the ten move blocks, such as move block #1, for example, contains 6 words, the first of which is the SINGLE MOVE CONTROL WORD (SMCW). Turning now to FIG. 5, which is a map of the SINGLE MOVE CONTROL WORD, the setting of the various bits of the SINGLE MOVE CONTROL WORD affects the execution of the particular move. The function of the bits of the SINGLE MOVE CONTROL WORD illustrated in FIG. 5 are summarized below in Table II.

TABLE II

| | |
|---|---|
| Bit 0 | MOVE PRESET BIT. When the Move Preset Bit is set, the value contained in the two PRESET WORDS defined above with respect to FIG. 4 becomes the starting position for the move when the move is first begun. The preset value can be changed and reenabled as required so as to extend the position beyond the 999,999 position limit or to enable the stepping motor to return to a home position. |
| Bit 1 | RATE MULTIPLIER BIT. The RATE MULTIPLIER BIT, when set to a "1", allows the final or steady state stepping motor rate to be selected in 10 pulse per second increments between 0 and 20,000 pulses. While the RATE MULTIPLIER BIT remains "0", any final rate from 1 to 9,999 pulses per second can be selected in 1 pulse per second increments. The RATE MULTIPLIER BIT is typically set when the move data block is entered by the operator through the terminal 54 of FIG. 1. |
| Bit 2 | SKIP BIT. The SKIP BIT, when set, causes the master module 28 of FIG. 1 to ignore one or more moves of the move set block without reprogramming. When the Skip Bit is set to a "1", the move is skipped over, even when operating in a continuous mode. |
| Bit 3 | LOAD JOG BIT. Bit 3 is set to identify the accompanying move block data as jog data so that when either Bit 14 (JOG REVERSE) or Bit 15 (JOG FORWARD) of the MOVE SET CONTROL WORD, is set, or if the jog data has already been loaded, and one of switches 90a or 90b of FIG. 2 has been closed, a jog is initiated. |
| Bits 4–15 | These bits are not utilized and are therefore set to 0. |
| Bit 16, 17 | IDENTIFICATION BITS. These bits are set to identify each single move control word. |

Returning back to FIG. 4, the remaining five words of each move block establish the ramp time, the final or steady state rate, the deceleration time required to decelerate to 0 pulses per second, and the most significant and least significant values of the final position, respectively. The ramp value, entered in binary coded decimal, corresponds to the user programmed time interval (as measured in seconds) for the stepping motor to reach the input final or steady state rates. In the continuous mode where each move specifies a move segment of the move profile, the final rate may be greater or lesser than the starting rate. The ramp time can take on any value between 0 and 9.99 seconds.

The word following the ramp time is final rate value, and is also entered in binary coded decimal. The final rate value establishes the final or steady state stepping motor rate. The final rate may take on any value between 0 and 9,999 pulses per second if the rate multiplier bit of the SINGLE MOVE CONTROL WORD is a "0". When the SINGLE MOVE CONTROL WORD rate multiplier bit is set to "1", the final rate may take on any value between 0 and 20,000 pulses per second in increments of 10 pulses per second. The word after the final rate value is the deceleration (decel) time value and it establishes the time duration (in seconds) of the deceleration of the stepping motor to a final rate of zero pulses per second. The decel time value which is entered in binary coded decimal, should not be confused with a ramp to a lower final rate other than a zero rate. Usually the decel time value is not used when the stepping motor is operating in the continuous mode described previously with respect to FIG. 3C. However, if a system failure is detected, the stepping motor is automatically decelerated to a final rate of zero pulses per second during the time interval specified by the deceleration value. Similarly, if a stop command is input by the user, the stepping motor will decelerate to a final rate of zero pulses per second during the interval defined by the deceleration value. This occurs while the DECEL/INSTANTANEOUS bit of the MOVESET CONTROL WORD is set. Otherwise, an instantaneous stop occurs.

The two words following the decel time value represent the most significant and least significant three digits as entered in binary coded decimal, of the final position.

Figure 6:
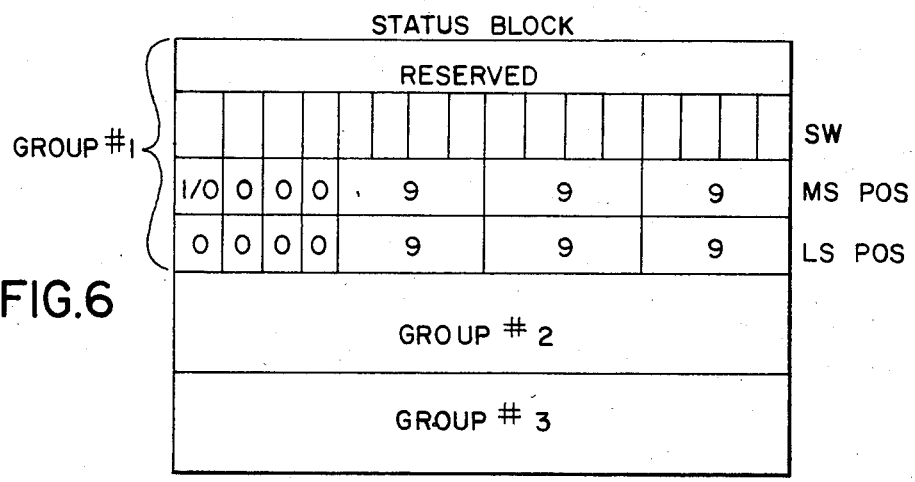
FIG. 6 is a map of the status block which is generated by each satellite output module such as the satellite output module of FIGS. 1 and 2 and sent to the master controller module for transmission to the main processor to apprise the main processor of the stepping motor status and position.
Figure 6A:
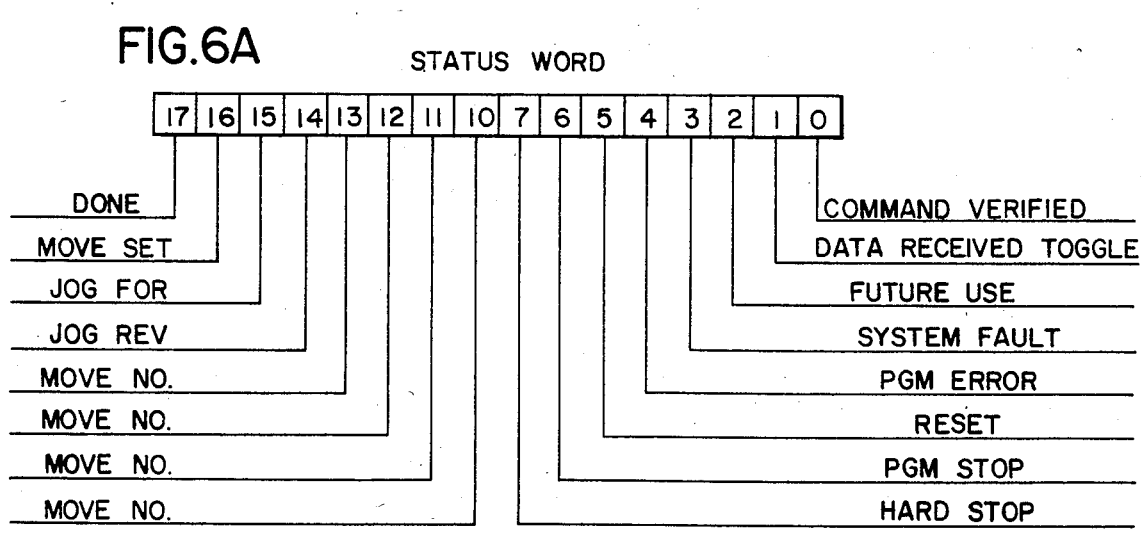
FIG. 6a is a map of the status word of the status block of FIG. 6.

As described previously with respect to FIG. 2, the master controller module 28 provides the processor unit 15 with a status block 67 containing data indicative of the status as well as the position of the stepping motor 13. Turning now to FIG. 6 which is a map of the status data block 67, the status data block 67 sent from the master controller module 28 to the processor unit 15 is comprised of a reserve word and three groups of three data words each, each group of three data words containing information regarding the status and position of the stepping motor associated with each of the three satellite output modules, such as the satellite output module 30, controlled by the master controller module, such as the master controller module 28 of FIG. 2. The first data word of the status block 67 of FIG. 6, is reserved for future use and is not filled. The first data word of each group of the data status block is designated as the status word as most of the bits are set by the satellite output module, such as satellite output module 30 of FIG. 2. The remaining bits are set by the master controller module to verify proper programming and/or that a particular command has been received or executed. Turning now to FIG. 6a, there is shown a map of the status word of each group of status and position words of the status block 67. The description of the function of each bit is provided below in Table III.

TABLE III

| Bit Number | Description of the Bit Function |
|---|---|
| 0 | COMMAND VERIFY bit. This bit is set to "1" to verify that a command bit (START, STOP, OFFSET, JOG, REVERSE, JOG FORWARD, OVERRIDE, INITIALIZATION, PRESET or LOAD JOG) has been received |
| 1 | DATA RECEIVED bit. This bit toggles alternately to a "0" or a "1" every time new satellite move set data block is transferred to the satellite output module. |
| 2 | Reserved for future use. |
| 3 | SYSTEM FAULT bit. This bit is set if a system failure, such as when a communication error is detected by the satellite output module or if invalid data is detected. When bit 3 is found to be set to a "1" the stepping motor is decelerated to 0 Hz at the deceleration value. |
| 4 | PROGRAMMING ERROR bit. This bit is set to reflect one of the following error conditions: an illegal bit combination exists in the data transferred to the satellite output module; the identification bits (Bits 16 and 17) of the SINGLE MOVE SET control word of a move are not set; undefined bit is present in any of the following words: most significant PRESET, least significant PRESET, RAMP DECELERATION, most significant POSITION, and least significant POSITION. Rate values in excess of 20,000 pulses per second, ramp or deceleration values in excess of 9.99 seconds, and preset or position values in excess of 999,999 pulses. |
| 5 | RESET bit. This bit is set to a "1" when a reset command is received or at a power up. |
| 6 | SOFTWARE STOP bit. This bit is set when a software STOP command is received. |
| 7 | HARDWARE STOP bit. This bit is set when a hardware STOP (emergency stop) command is received. |
| 10-13 | MOVE IN PROGRESS bits. The bits 10-13 present a hexadecimal bit pattern which designates the move number (1-10) of the move data block currently being executed. |
| 14 | JOG REVERSE bit. This bit is set when a jog reverse command is received or a jog reverse input is asserted. |
| 15 | JOG FORWARD bit. This bit is set when a software jog forward command is received or when a software jog forward is asserted. Should the jog final position value be reached in a software jog, then the status of the bits 14 or 15 is cleared even if the software jog forward or jog reverse command, respectively remains asserted. However, while a software jog is being executed, the status of bits 14 or 15 remain a "1" until the hardware jog input is removed. |
| 16 | MOVE SET bit. This bit indicates the number (0 or 1) of the current move set being executed. The MOVE SET bit alternately toggles to 1 or 0 when multiple move sets are executed. |
| 17 | DONE bit. This bit is set upon completion of every move in a single step mode (FIG. 3A); or after a move profile is completed either during an independent mode as illustrated in FIG. 3B or during the continuous mode of operation (FIG. 3C). |

MASTER CONTROLLER MODULE 28 HARDWARE DESCRIPTION

Figure 7:
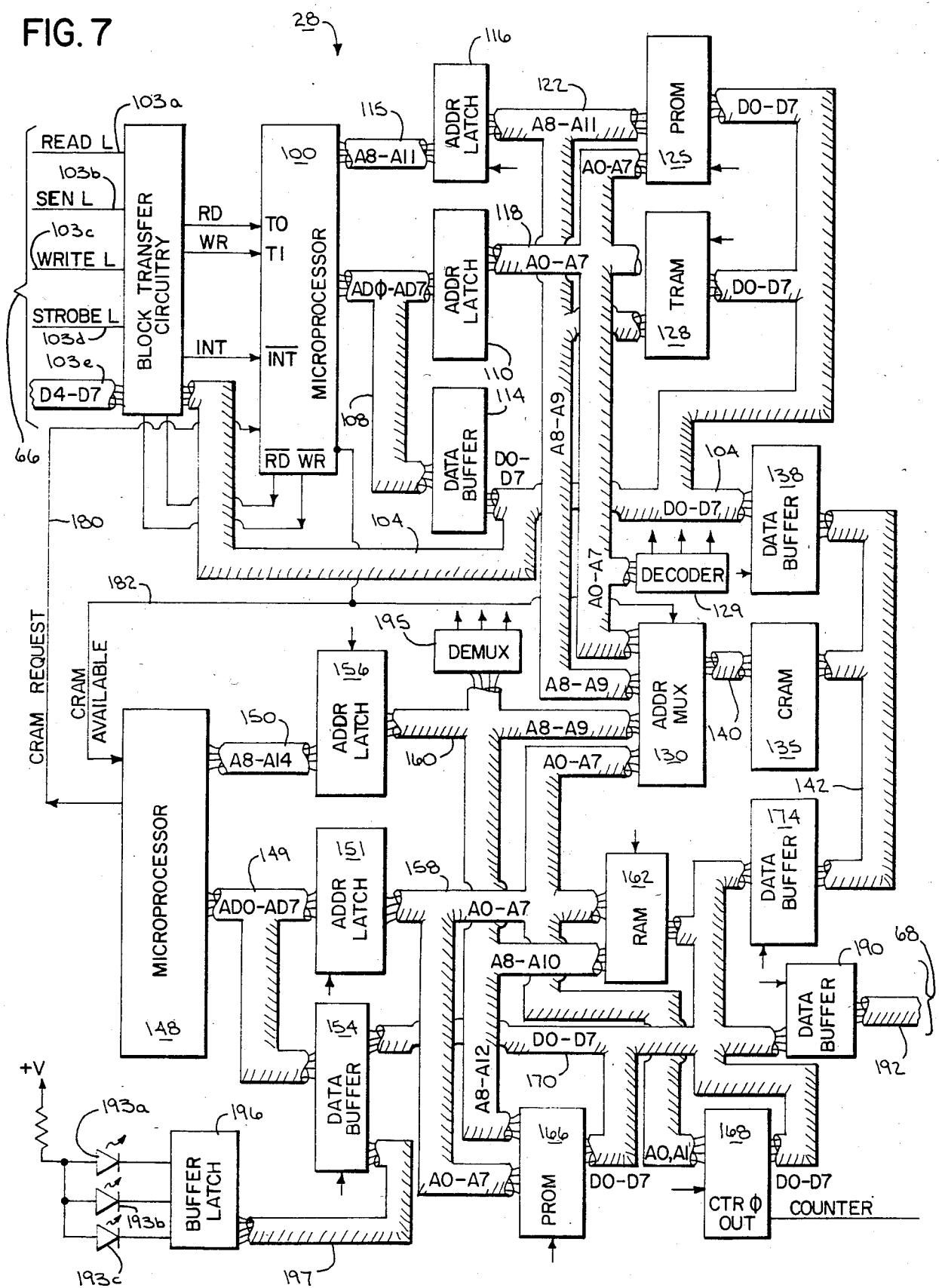
FIG. 7 is an electrical block diagram of the master controller module comprising a portion of the stepping motor controller of FIGS. 1 and 2.
Figure 8:
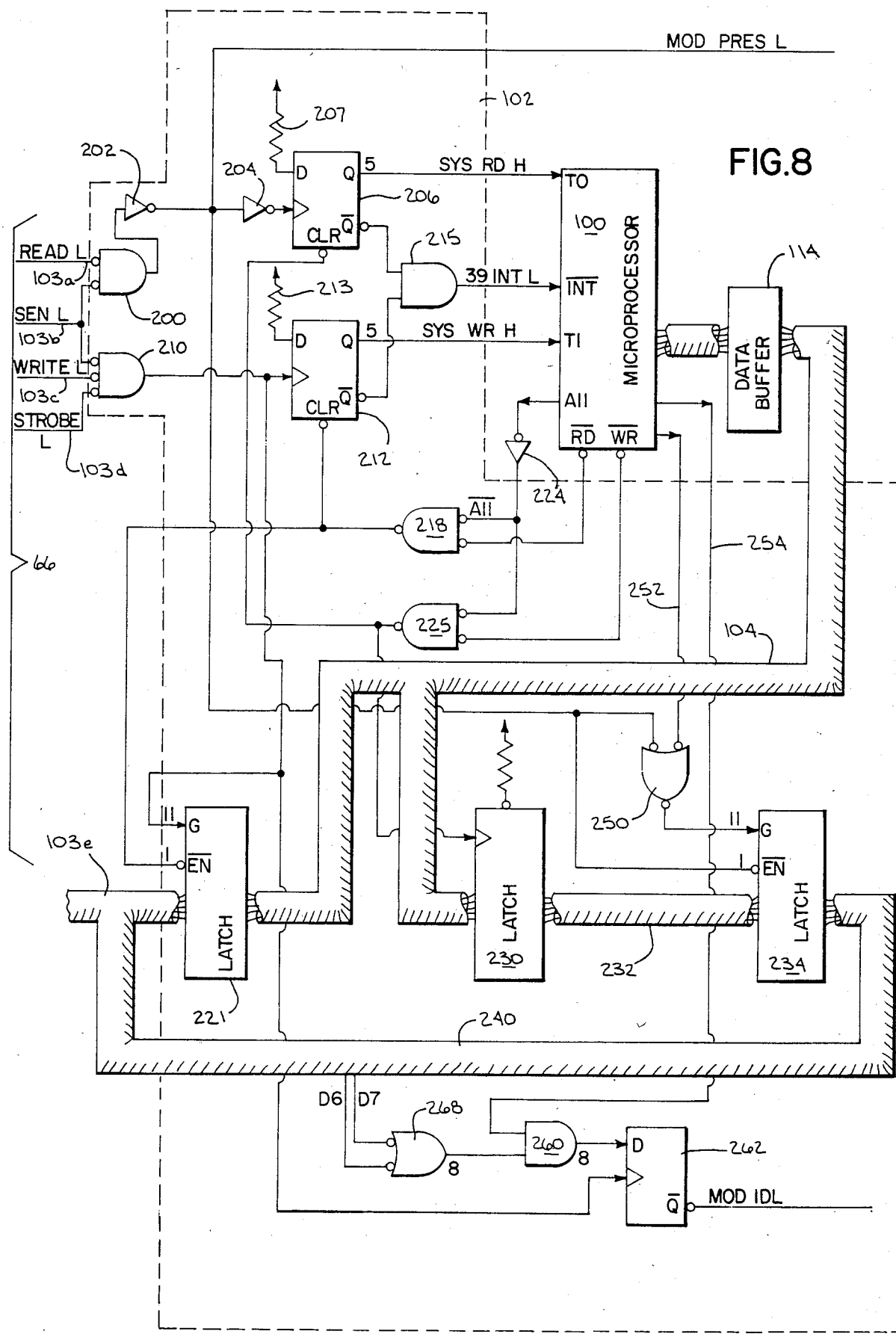
FIG. 8 is an electrical block diagram of the block transfer circuitry of the master controller module of FIG. 7.
Figure 9:
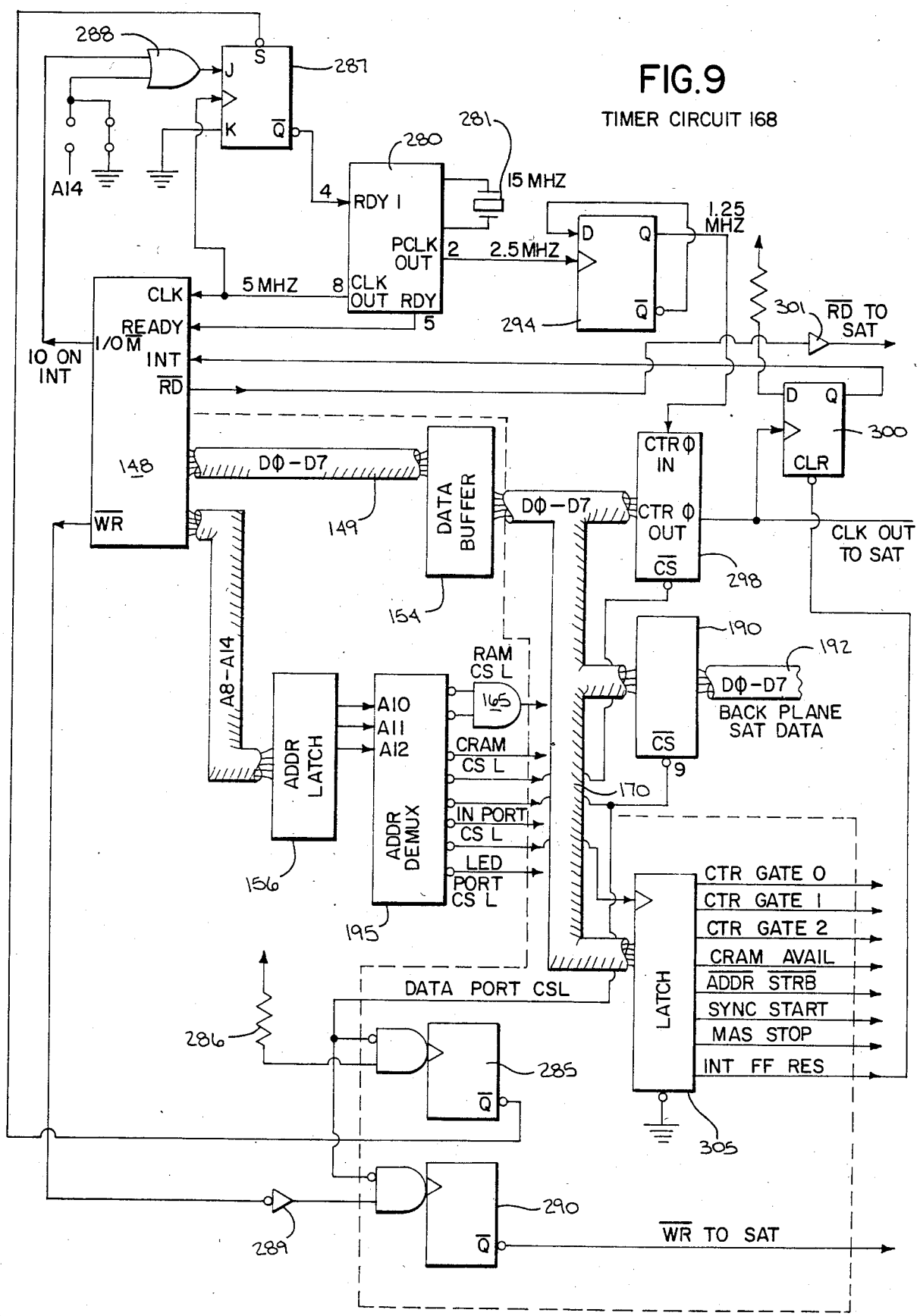
FIG. 9 is an electrical block diagram of the back plane timing circuitry of the master module controller of FIG. 7.
Figure 10:
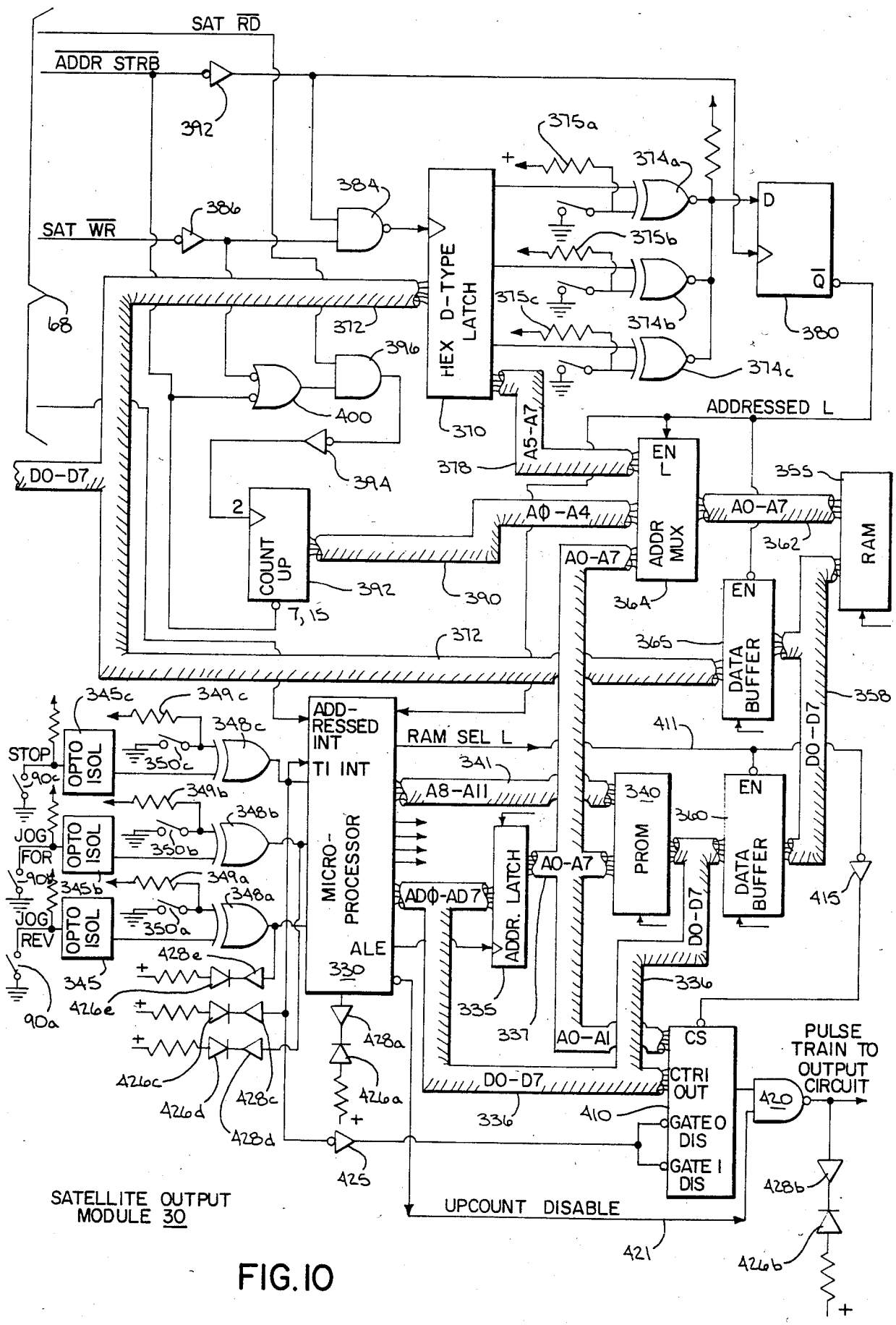
FIG. 10 is an electrical block diagram of the satellite output module comprising a part of the stepping motor controller of FIGS. 1 and 2.

A better understanding of how the information in the move data block 64 described previously with respect to FIGS. 2 and 4 is processed to control the stepping motor 13 of FIG. 1 may be gained by reference to the schematic details of the master controller module 28 illustrated in FIGS. 7, 8 and 9 and by reference to the schematic details of the satellite output module illustrated in FIG. 10. Turning now to FIG. 7, there is shown the block schematic details of the master controller module 28. As described previously with respect to FIG. 2, the master controller module 28 of FIGS. 1 and 2 embodies a communications processor 74, which, in the preferred embodiment, as illustrated in FIG. 7, takes the form of a microprocessor 100. Still referring to FIG. 7, the microprocessor 100 is interfaced to the primary bus 66 of the back plane mother board 48 of the interface rack 16 of FIG. 1 via a block transfer circuit 102, which is described in greater detail with respect to FIG. 8. The block transfer circuit 102 of FIG. 8 is supplied from the block 66 with a signal that is present on each of the READ Line 103a, the SEN (slot enable) Line 103b, the WRITE Line 103c and the STROBE Line 103d. When the processor unit 15 of FIG. 1 wishes to communicate with the master controller module 28, the processor unit 15 addresses the master controller module 28, causing the SEN Line 103a to go "low" or to a logic "0" level. When data is to be written to the master controller module 28, that is to say the master controller module is to read data from the processor unit 15, then the WRITE Line 103c also goes "low". In response to the SEN Line 103c and the WRITE Line 103c both becoming "low" or at a logic "0" level, the block transfer circuit 102 supplies a logic "high" or "1" level SYS WR signal to the $T_1$ input of the microprocessor 100. At the same time, the block transfer circuit 102 also supplies a logic "0" level signal to the interrupt input of the microprocessor 100 to cause the microprocessor to interrupt whatever program it had been executing and process the interrupt. In response to the combination of a logic "1" signal at the microprocessor $T_1$ input and a logic "0" level signal at the microprocessor interrupt (INT) input, the microprocessor 100 generates a logic "0" level signal at its read (RD) output which is supplied to the block transfer circuit 102 to cause the data put on a data bus 103e of the primary bus 66 to be temporarily latched into the block transfer circuit 102 so as to be available on a data bus 104.

When a status data block, such as status data block 67 is to be read from the master controller module 28 by the processor unit 15 of FIG. 1, the SEN Line 103b, the READ Line 103a and the STROBE Line 103d go to a logic "0" level. In response to each of the SEN, READ and STROBE Lines 103b, 103a and 103d, respectively, becoming "low", the block transfer circuit 102 sends a SYS RD signal to the $T_0$ input of the microprocessor 100 while simultaneously sending a logic "0" signal to the microprocessor INT input. In response, the microprocessor 100 generates a logic "0" level signal at its WR output which is supplied to the block transfer circuit 102 to cause a status data block on bus 104 to be latched in the block transfer circuit 102 and transmitted to data bus line 103e to the processor unit 15 of FIG. 1.

The microprocessor 100 has its data and its address lines $AD_0$-$AD_7$ coupled via an address and data bus 108 to the input of an address latch 110 and to the input of a data buffer 114, the output of the data buffer 114 being coupled to the data bus 104. The higher order address lines $A_8$-$A_{11}$ from the microprocessor 100 are coupled via an address bus 115 to the input of an address latch 116. The output of address latches 110 and 116 are each coupled via a separate one of address busses 118 and 122, respectively, to the lower order and higher order address inputs, respectively, of a programmable read only memory (PROM) 125, a temporary storage random access memory (TRAM) 128 and an address multiplexer 130. Both the PROM 125 and TRAM 128 have their data lines $D_0$-$D_7$ coupled to the data lines $D_0$-$D_7$ of data bus 104. The programmable read only memory 125 stores the operating program for the microprocessor 100 and when the PROM 125 is enabled, the program instruction stored at the address latched into address latches 110 and 116 by the microprocessor 100, is written from the PROM 125 into the data buffer 114 so as to be available to the microprocessor 100. Similarly, when the TRAM 128 is enabled, data may be written into, or read from the address location specified by the address latched into the address latches 110 and 116 by the microprocessor 100.

The programmable read only memory 125, and the temporary random access memory 128 are enabled by a decoder 129 which is coupled to the address and data bus 108. The decoder 129 receives a selected portion of the address data latched into the address latch 110 and in response, the decoder 129 decodes the address data to determine whether the PROM 125 or the TRAM 128 is to be addressed. In this way data transfer is "memory mapped".

The temporary random access memory (TRAM) 128 is so named because it serves as a temporary storage location for the move data block 64 of FIG. 4 before it is processed to yield the satellite move set data block 80 (FIG. 2) sent to the satellite output module 30 of FIGS. 1 and 2. Eventually, the move data block 64 of FIG. 4 received from the processor unit 14 of FIG. 1 is transferred from the temporary random access memory 128 to a common random access memory (CRAM) 135 which is enabled by the address multiplexer 130. Transfer of the data from the TRAM 128 to the CRAM 135 is accomplished by microprocessor 100 by first latching the address of the location in the TRAM 128 of the data to be transferred to the CRAM 135 into address latches 110 and 116. This causes the data in the TRAM 128 at the specified address to be sent via data bus 104 both to the data buffer 114 and to a data buffer 138 whose data input is coupled to the data bus 104. When data is to be transferred between the TRAM 128 and the CRAM 135, the data buffer 114 is typically disabled so that data is only held in the data buffer 138. Thereafter, the address of the CRAM memory location at which the data is to be stored is latched into the address latches 116 and 110 for transmission on address buses 118 and 122 to an address multiplexer 130. In accordance with the address information transmitted to the multiplexer 130 on buses 118 and 122, the address multiplexer 130 demultiplexes the address information received from the address latches 110 and 116 and transmits the appropriate address information to the address lines $AD_0$-$AD_7$ of the CRAM memory 135 along address bus 140. When the CRAM 135 is addressed by the address multiplexer 130 and enabled, the CRAM 135 stores the data sent to it from the data buffer 138 along data bus 142 at the address location specified by the address multiplexer 130.

As will be recalled from the description of the master controller module 28 provided with respect to FIG. 2, the master controller module includes an arithmetic processor 78 for processing the move data block 64 to yield the satellite move set data block 80 to enable the satellite output module 30 to excite the stepping motor 13 to achieve the stepping motor move profile. Returning to FIG. 7, the arithmetic processor 78 of the master controller module 28 advantageously takes the form of a microprocessor 148. The microprocessor 148 has its address and data bus lines $AD_0$–$AD_7$ coupled via an address and data bus 149 to the input of an address latch 151 and to the input of a data buffer 154. The higher order address lines $A_8$–$A_{14}$ of the microprocessor 130 are coupled to the input of an address latch 156 by an address bus 150. Each of a pair of address buses 158 and 160 couple the output of a separate one of the address latches 151 and 156, respectively, to the low order and high order address inputs, respectively, of the address multiplexer 130. In addition, each of the address busses 158 and 160 is coupled to the lower and higher order address input of a random access memory (RAM) 162, a programmable read only memory (PROM) 166 and a programmable counter timer circuit 168 which is described in greater detail in FIG. 9.

Still referring to FIG. 7, a data bus 170 couples the data output lines of the data buffer 154 to the data lines $D_0$–$D_7$ of each of RAM 162 and PROM 166. The data bus 170 is also coupled to the first set of data lines of data buffer 174 that has its second set of data lines coupled to the data bus 142 which, as will be recalled, is coupled to the CRAM 135. The CRAM 135 thus may be accessed by the microprocessor 100 when the CRAM address is latched by the microprocessor 100 into the address latches 110 and 116 for transmission along address latches 118 and 122, respectively, to the address multiplexer 130. The microprocessor 148 can also access the CRAM 135 by latching the CRAM address into the address latches 151 and 156 which in turn transmit the address information along buses 158 and 160 to the address multiplexer 130. The address multiplexer then addresses the desired CRAM location accordingly.

To avoid simultaneous addressing of the CRAM 135 by the microprocessor 100 and the microprocessor 148, the microprocessor 148 is coupled via a control line 180 to the microprocessor 100 and during intervals when the microprocessor 148 desires to access the CRAM 135, the line 180 goes to a logic "1" level. This signal, on line 180 referred to as a CRAM REQUEST is supplied via line 180 to microprocessor 100. In response to the CRAM REQUEST signal on line 180, the microprocessor 100 checks to see whether or not the microprocessor 100 itself is accessing the CRAM 135. If the microprocessor 100 is not presently accessing the common random access memory 135, then the microprocessor 100 puts a logic "1" level CRAM AVAIL signal on a control line 182 coupled to the microprocessor 148 and coupled to the address multiplexer 130 to enable the microprocessor 148 to access the CRAM 135. In this way, the move data block 64 of FIG. 4 and stored in CRAM 135 is made available to the microprocessor 148 for processing to yield the satellite move set data block 80 of FIG. 4 supplied to the satellite output module 30 of FIGS. 1 and 2 to control the stepping motor 13 operation.

The operation program for the microprocessor 148 which controls the microprocessor operation is stored in the programmable read only memory 166 and is transmitted to the microprocessor along the lines $D_0$–$D_7$ of the data bus 170 to the data buffer 154 when the programmable read only memory 166 is addressed with the address data latched into address latches 151 and 156. In addition, the data bus 170 is also coupled to the data lines of the RAM 162. The RAM 162 serves not only as a scratch pad memory for the microprocessor 148 but also the RAM 162 serves to store the satellite move set data block 80 of FIG. 2 generated by the microprocessor 148 in accordance with the move data block 64 entered into the CRAM 135 by the microprocessor 100. The satellite move set data blocks stored in RAM 162 are ultimately transferred to the satellite output module 30 of FIGS. 1 and 2 by the microprocessor 148 during execution of the program stored in the programmable read only memory 166. Still referring to FIG. 7, to accomplish transmission of the satellite move set data block 80 to the satellite output module 30 of FIGS. 1 and 2, the satellite move set data blocks stored in the RAM 162 are transmitted via data bus 170 to a data buffer 190 for subsequent transmission along the secondary data bus 68 to the satellite output module 30 of FIGS. 1 and 2.

An address demultiplexer 195 is coupled to the address bus 160 to receive the signals on the high order address lines $A_8$–$A_{14}$ of the microprocessor 148 so that the address multiplexer 195 is provided with a portion of the high order address data latched into the address latch 156. The address demultiplexer 195 demultiplexes the portion of the address data latched into the data latch 156 and supplies a chip select signal to an appropriate one of the RAM 162, the PROM 166, the secondary backplane data buffer 190, the LED buffer/latch 199 and the programmable timer circuit 168 so that a selected device is enabled by the address demultiplexer in accordance with a predetermined combination of the portion of the address information received by the demultiplexer. Just as the decoder 129 enables the memory accesses of microprocessor 100 to be memory mapped to the various memory devices coupled to the microprocessor 100, the address demultiplexer 195 enables the various memory devices coupled to the microprocessor 148 to be memory mapped.

Still referring to FIG. 7, the master controller module 28 is provided with light emitting diodes 193a, 193b and 193c which as illustrated in FIG. 1, are exposed to the user. Each of the light emitting diodes 193a, 193b and 193c is energized from a buffer/latch 196 when the buffer/latch 196 is energized with a signal from bus 170 following the latching of a corresponding l.e.d. command into the data buffer 154 from the microprocessor 148 via the address and data bus 149. The l.e.d. 193a is energized by the buffer/latch 196 in response to the latching of the corresponding l.e.d. command in the buffer 154 to signify a communication fault between the processor unit 15 of FIG. 1 and the master controller module 28. If a communication fault occurs between the satellite output module 30 and the master controller module 28, the microprocessor 148 causes the l.e.d. 193b to be illuminated. The l.e.d. 193c is energized by the microprocessor 148 whenever the master controller module 28 is active, that is to say, whenever the master controller module 28 is controlling the stepping motor 13.

FIGS. 7a and 7b are each partial memory maps of separate portions of the random access memory (RAM) 162 of the master controller module 28 of FIG. 7. As illustrated in FIG. 7a, the RAM 162 stores the first four words of each move data block 64 of FIG. 4 (the MSCW, the POSITION OFFSET, and the most significant and the least significant PRESET words). Also, the random access memory 162 stores the six words of the first move. A portion of RAM 162 is set aside to store the DONE bit which is set when a satellite output module, such as the satellite output module 30 of FIGS. 1 and 2, has completed each move. The move number, various status data, together with the total number of words of the move set and the move set bit (either a 1 or a 0) are also stored in RAM 162. To identify which of the three possible satellite output modules, hereinafter identified as $S_1$, $S_2$ and $S_3$, is presently in communication with the master controller module 28, the RAM 162 includes a memory area, designated as the which satellite register (WSR). The WSR contains a binary value corresponding to the decimal value 1, 2, or 3 depending on whether the satellite output module $S_1$, $S_2$ or $S_3$ is presently in communication with the master controller module 28. It should be understood that the memory map of RAM 162 illustrated in FIG. 7a is only a partial memory map as the RAM 162 serves to store other data. Although the data elements illustrated in FIG. 7a appear in consecutive order, in practice, these elements may not be stored in consecutive locations in the RAM 162.

Turning now to FIG. 7b, there is shown a second memory map of random access memory 162 illustrating the various data elements of the satellite move set data block 80 stored in the RAM 162. As will become better understood hereinafter, the move data block 64 of FIG. 4 is processed to yield the satellite move set data block 80 of FIG. 6, which is stored in RAM 162 in the form of move set data block 80 prior to transmission to the satellite output module 30. In practice, each satellite move set data block 80 contains 33 words. The function of each word will be described below in Table IV.

TABLE IV

| Word Number | Word Description |
|---|---|
| 1 | Type of Move. The bits of this word are set to designate the type of move to be executed. |
| 2 | Summation Word. The bits of this word are set in accordance with the sum of the bits of the data sent from the master controller module 28 of FIGS. 1, 2 and 7 to the satellite output module 30 of FIGS. 1 and 2 to enable the satellite output module 30 to verify the accuracy of the data received from the master controller module. |
| 3-5 | Control bytes 1, 2, and 3. Each of the control bytes 1, 2, and 3 contains a set of bits which are set when the move is processed by the master controller module 28 to designate certain conditions and thereby allow the master controller module 28 of FIGS. 1, 2, and 7-9 to determine the occurrence of such conditions. |
| 6 | Mode Word. The bits of the mode word are set to cause a particular satellite output module mode. |
| 7 and 8 | Ramp Word. The words 7 and 8 contain the least significant and most significant digits, respectively, of the ramp rate. |
| 9 and 10 | Rate Words. The words 9 and 10 contain the least significant and most significant digits, respec- |

TABLE IV-continued

| Word Number | Word Description |
|---|---|
|  | tively, of the steady state or final rate. |
| 11 | Remainder Word. The remainder word stores an intermediate remainder value which results during processing of the move data block 64. |
| 12 and 13 | Deceleration Words. The words 12 and 13 contain the least significant and most significant digits, respectively, of the deceleration. |
| 14-16 | Increments of Deceleration. Words 14-16 together represent the number of periodic increments within the deceleration interval. The least significant digits of the number of increments are represented by word 14 and the most significant digits are represented by word 16. |
| 17-19 | Position Words. The words 17-19 together represent the final position. The least significant digits of the position are represented by word 17 whereas the most significant digits are represented by word 19. |
| 20 | Number of Pulses of Decel/10 ms. Word 20 represents the number of pulses in the last 10 millisecond interval of deceleration; 10 milliseconds being the typical durtion of each of the periodic deceleration intervals. |
| 21-23 | Preset Words. The words 21-23 together comprise the preset value. The least significant digits of the preset value are represented by word 21 whereas the most significant digits are represented by word 23. |
| 24-25 | Ramp Remainder Words. The words 24-25 together represent the ramp remainder value with the least significant digits of the ramp remainder represented by word 24. |
| 26-27 | Deceleration Rate Remainder. The words 26-27 together represent the remainder which is generated during the deceleration value calculation, with the least significant digits of the rate remainder represented by word 26. |
| 28 | Number of Pulses in 10 ms of Steady State Rate. Word 28 represents the number of pulses in 10 milliseconds of steady state rate. |
| 29-31 | Alpha. The words 29-31 represent the value which, as will be described hereinafter, is utilized to calculate the number of pulses to periodically output during each deceleration interval. Word 29 represents the least significant digits of the value whereas word 31 represents the most significant digits of the value. |
| 32-33 | Number of Increments. Words 32-33 together represent the number of decel increments in the deceleration interval. The word 32 represents the least significant digits of the increment value. |

Turning now to FIG. 8, there is shown a schematic diagram of the block timing circuitry 102 which interfaces the microprocessor 100 to the processor unit 15 of FIG. 1. Turning now to FIG. 8, the block transfer circuit 102 includes a two-input NOR gate 200 which is coupled at each of its inputs to the READ line 103a and the SEN (slot enable) line 103b of the primary bus 66 on the back plane mother-board 48 of the interface rack 16 of FIG. 1. Still referring to FIG. 8, the output of the NAND gate 200 is inverted by a gate 202 to yield a signal, hereinafter referred to as the MOD PRES (module present) signal which is active, that is to say, a logic "0" state only when the READ and the SEN lines of the primary bus 68 are both at a logic "0" level. The gate 202 has its output inverted by a gate 204 before being supplied to the clock (CK) input of a D-type flip-flop 206. The D input of the flip-flop 206 is maintained at a logic "1" state by virtue of being coupled through a pull-up resistor 207 to a d.c. voltage supply (not shown) of typically 5 volts. With the D input of the flip-flop 206 held at a logic "1" level, the flip-flop Q output remains at a logic "1" state until the flip-flop clear (CLR) input is asserted with a logic "0" signal. The Q output of the flip-flop 206 provides the SYS RD (system read) signal to the $T_0$ input of the microprocessor 100 to alert the microprocessor that data is to be read from the processor unit 15 of FIGS. 1 and 2.

The SEN line 103b, the WRITE line 103c and the STROBE line 103d of the primary bus 66 are each coupled to a separate one of the three inputs of a three input NOR gate 210 whose output is coupled to the clock (CK) input of a D-type flip-flop 212. As with the flip-flop 206, the D input of flip-flop 212 is coupled through a pull-up resistor 213 to the power supply so as to be held at a logic "1" level. With the D input of flip-flop 212 held to a logic "1" level, then the Q output goes to a logic "0" level in response to the flip-flop CLR input being asserted with a logic "0" level signal. The Q output of flip-flop 212 provides the SYS WR (system write) signal supplied to the microprocessor 100 $T_1$ input to alert the microprocessor 100 that data is to be written to the processor control unit.

The $\overline{Q}$ output of each of the flip flops 206 and 212 is coupled to a separate one of the inputs of a two input AND gate 215 whose output is coupled to the $\overline{INT}$ input of the microprocessor 100. The $\overline{Q}$ output of each of flip-flops 206 and 212 remains at a logic "0" level when the Q output of each separate flip-flop is at a logic "1" level. Thus, when either a SYS RD or a SYS WR is generated by a corresponding one of flip-flops 206 and 212, then the AND gate 215 provides a logic "0" level signal to the $\overline{INT}$ input of the microprocessor 100 to interrupt the microprocessor. In response to a SYS RD command at the $T_0$ input and a logic "0" signal at the microprocessor interrupt input, the microprocessor 100 generates a logic "0" level signal at its $\overline{WR}$ output which is supplied to the first input of a two input OR gate 218 whose output is coupled to the output control input (EN) of a transparent data latch 221. The address line $A_{11}$ of the microprocessor 100 is coupled via a gate 224 to the second input of the NAND gate 218.

In response to a SYS WR command received at the $T_1$ input of the microprocessor and in response to the logic "0" at the microprocessor INT input which indicates data is to be written to the master controller module 28, the microprocessor 100 generates a logic "1" level signal at its $A_{11}$ line and also generates a logic "0" level signal at its $\overline{RD}$ output. In response, the OR gate 218 provides a logic "0" level signal to the clear (CLR) input of the flip-flop 212 to reset the flip-flop. Also, the output of the data latch 221 now is enabled since the OR gate 218 generates a logic "0" level signal at its output. In this way, data that was previously latched in the transparent data latch will appear on the data bus 104 coupling the output of the transparent data latch 221 to the input of the data buffer 114.

The $\overline{WR}$ output of the microprocessor is coupled to the first input of a two input OR gate 225 whose output is coupled to the clear (CLR) input of the flip-flop 206. OR gate 225 has its second input coupled to the output of the NOT gate 224 so as to receive a signal which is the logical inverse of the signal appearing on the microprocessor $A_{11}$ line. In response to a SYS RD command received at the microprocessor $T_0$ input and in response to a logic "0" level signal appearing at the microprocessor INT input, the microprocessor 100 generates a logic "1" signal on its line $A_{11}$ and a logic "0" signal at its $\overline{WR}$ output. Accordingly, the OR gate 225 provides a logic "1" level signal to the CLR input of the flip-flop 206 to reset the flip-flop. The output of the OR gate 225 is also coupled to the clock input of a D-type data latch 230 whose data lines are coupled to the data bus 104. When the output of OR gate 225 goes to a logic "1" state, the D-type latch 230 is clocked so that the data appearing on data bus 104 is latched into the flip-flop.

The output data of the D-type data latch 230 is supplied via a data bus 232 to the respective data inputs of a transparent data latch 234. Data latch 234 has its control input (EN) coupled to the output of the NOT gate 202. When both the READ line 103a and the SEN (slot enable) line 103b of the primary bus go to a logic "0" level state as occurs when the processor 15 of FIGS. 1 and 2 desires to read the status back block 80 of FIG. 6, then the output of the NOT gate 202 goes to logic "0" level to enable the data previously latched into the D-type data latch 230 to be latched into the transparent data latch 234 via data bus 232 and thus be available on the data lines $D_0$–$D_7$ of data line 103e of the primary bus 68.

The G input of the transparent data latch 234 is coupled to the output of a two input AND gate 250. Each of the inputs of AND gate 250 is coupled to the output of the NOT gate 202 and to line 252 of the microprocessor 10. The line 252 is maintained by the microprocessor at a logic "1" level until a SYS READ COMMAND so that when the READ, SEN and STROBE lines 103b, 103c and 103d of the primary bus 68 go to a logic "0" level condition upon a request by the processor unit 15 of FIG. 1 to read data from the master controller module 28, the transparent data latch 234 is enabled by the AND gate 250 to permit data to be latched from the transparent data latch onto the data lines $D_0$–$D_7$ of the primary bus 68. When the microprocessor 100 receives a SYS WRITE command at its $T_1$ input, the enable (G) input of the latch 234 is maintained at a logic "1" level, thus, putting the latch output in a high impedance state.

When data is written from the processor unit 15 of FIG. 1 to the master controller module 28 of FIG. 7, following each of the lines SEN, WRITE and STROBE of the primary bus 68 of FIG. 7 going to a logic "0" condition, it is generally desirable to supply the processing unit 15 of FIG. 1 with a handshaking signal, designated MOD ID signal, to verify that data is, in fact, being written to the master module from the processing unit 15 of FIG. 1. Still referring to FIG. 7, the microprocessor 100 has a line 254, coupled to the first input of a two input AND gate 260 whose output is coupled to the D input of a D-type flip-flop 262. The remaining input of the AND gate 260 is coupled to the output of a two input NAND gate 268, each of whose inputs is coupled to the lines $D_6$ and $D_7$, respectively, of the data bus lines $D_0$–$D_7$ of data bus 103e of the primary bus 66. The clock input of the flip-flop 262 is coupled to the output of NOR gate 210 and thus, the flip-flop 262 is clocked each time flip-flop 212 is clocked.

If the microprocessor 100 is "available" to the main processor 15 to receive or send data, then the line 254 is maintained at a logic "1" level. Therefore, when the main processor 15 writes a "request" byte on bus 103e with either bit 6 or bit 7 at a "0" level, for a read or write transfer, the D input of the flip-flop 262 goes to a logic "1" level. Accordingly, the flip-flop 262, when clocked with the WRITE signal from the main processor 15, generates a MOD ID signal at its Q output.

Referring now to FIG. 9, there is shown a schematic block diagram of the timing circuit 168 which supplies a clock signal both to the satellite output module 30 of FIGS. 1 and 2 and to the microprocessor 148. Turning now to FIG. 9, at the heart of the clock circuit 168 is a clock generator and driver circuit 280 whose internal clock frequency is established at 15 MHz by way of a 15 MHz crystal 281 coupled across the XTAL 1 and the XTAL 2 inputs of the clock generator circuit 280. The clock generator circuit 280 has its clock output (CLK OUT) coupled to the clock input (CLK) of the microprocessor 148 so that the microprocessor 148 receives a clock signal from the clock circuit which is of a frequency (5 MH$_z$), that is ⅓ of the clock generator circuit 280 internal clock frequency of 15 MHz. In addition to the clock output (CLK OUT), the clock generator circuit 280 is also provided with a peripheral clock output (PCLK OUT) at which the clock generator generates a clock signal of a frequency (2.5 MHz) which is ½ of the frequency of the clock signal produced at the clock output (CLK OUT). The 2.5 MHz clock signal at the PCLK OUT serves as a base from which the clock signal for the satellite output module 30 of FIGS. 1 and 2 is derived. The RDY output of the clock generator circuit 280 is coupled to the RDY input of the microprocessor 148 to indicate to the microprocessor 148 when a "wait state", that is to say more time is needed to access the secondary bus 68 on the back plane 48. In this way the clock generator 280 sychronizes the microprocessor 148.

In order to assure that sufficient time is available for the satellite output module 30 to read the satellite move set data block 80 of FIG. 2 from the master controller module, the microprocessor 148 is placed in a wait state immediately after the satellite move data block is latched into the data buffer 190 for transmission along the data bus 192 of the secondary bus 68 for transmission to the satellite output module 30. To this end, there is provided a one shot multivibrator 285 whose invert input is coupled to the address demultiplexer 195 to receive the logic "0" level DATA PORT CS (the data buffer 190 chip enable) signal which is also supplied to the CS (chip enable) input of the data buffer 190 to enable the data buffer 190 to put data along the data bus 192 of the secondary bus 68 of FIG. 2. The noninvert input of the one shot multivibrator 290 is coupled via a pull-up resistor 286 to the power supply. In response to the data port CS signal at its invert input, the one shot multivibrator 285 produces an output signal at its Q output which is of an 18.2 microsecond duration.

The output signal of the one shot multivibrator 285 is supplied to the set (S) input of a flip-flop 287 whose J input is coupled to the output of a OR gate 288. The OR gate 288 has one of its inputs coupled to the IO/$\overline{\text{M}}$ output of the microprocessor 148.

The remaining input of the OR gate 288 is coupled either to the A$_{14}$ address pin of the microprocessor 148 or to circuit ground depending on whether or not a wait state is desired when the PROM 166 is to be accessed and the address line A$_{14}$ has a logic "1" level. Flip-flop 287 has its K input coupled to circuit ground and its $\overline{\text{Q}}$ output coupled to the RDY 1 input of the clock circuit generator 280. Normally, the IO/$\overline{\text{M}}$ output of the microprocessor remains at a logic "0" level until commencement of an external interrupt or an access of the back plane 48. Thus, the output of the OR gate 288 remains at a logic "0" level, and thus the $\overline{\text{Q}}$ of flip-flop 287 output remains at a logic "1" level. With the $\overline{\text{Q}}$ output of the flip-flop 287 at a logic "1" level during intervals other than when microprocessor 148 is commencing an external interrupt or back plane access operation, the RDY 1 input of the clock circuit generator 280 remains unaffected. However, when an external interrupt occurs, changing the IO/$\overline{\text{M}}$ line to a logic "1" level or when the one shot multivibrator 285 is triggered in response to the DATA PORT CS signal at its invert input, the set input of the flip-flop 287 is driven to a logic "0" level to drive the flip-flop $\overline{\text{Q}}$ output to a logic "0" state and hence the RDY input of the clock circuit generator 280 to a logic "0" level to inhibit the clock generator circuit so that no clock pulses are supplied to the microprocessor.

During a WRITE operation, which is commenced by the microprocessor 148 to write the satellite move set data block to the satellite output module 30, the DATA PORT CS signal causes the beginning of an 18.2 microsecond wait state and the signal at the satellite $\overline{\text{WR}}$ output goes low. To ensure that the $\overline{\text{WR}}$ signal is supplied to the satellite output module 30 for a sufficient interval to enable the satellite output module 30 to read the data latched into the data buffer 190, the $\overline{\text{WR}}$ signal from the microprocessor 148 is supplied via a gate 289 to the noninvert input of a one shot multivibrator 290. The invert input of the multivibrator 290 is coupled to the address demultiplexer 195 to receive the DATA PORT CS signal. Thus, in response to a logic "0" level $\overline{\text{WR}}$ signal from the microprocessor 148 and a logic "0" the DATA PORT CS signal from the address demultiplexer 195, the one short multivibrator 290 supplies a 7.4 microsecond signal at its $\overline{\text{Q}}$ output to the satellite output module as the $\overline{\text{SAT}}$ $\overline{\text{WR}}$ (Satellite Write Signal).

Still referring to FIG. 9, to generate the satellite output module clock signal (SAT CK), the peripheral clock (PCLK) output of the clock generator circuit 280 is coupled to the clock (CK) input of a flip-flop 294 whose D input is coupled to the $\overline{\text{Q}}$ output of the flip-flop 294. With the flip-flop D input coupled to the flip-flop $\overline{\text{Q}}$ output, the flip-flop 294 produces a signal at its Q output at a frequency half the frequency of the clock signal at the clock input. Thus, when the 2.5 MHz output signal at the PCLK output of the clock generator 280 is impressed upon the clock input of the flip-flop 294, a 1.25 MHz clock signal is present at the flip-flop Q output. The 1.25 MHz frequency signal produced at the Q output of flip-flop 294 is supplied to the first counter input (CTRO) of a programmable counter 298. The counter 298 has its data inputs D$_0$–D$_7$ coupled to the D$_0$–D$_7$ data outputs of the data buffer 154 via data bus 170 so as to be supplied from the data buffer 154 with the data previously latched from the microprocessor 148 into the data buffer 154. Counter 298 has its chip select (CS) input coupled to the address demultiplexer 195 and when enabled by a chip select signal from the address demultiplexer 195 (as occurs when the counter 298 is addressed), the counter decrements the data latched into the counter from the data buffer in accordance with the clock signal provided from the flip-flop 294 to deliver an output signal at the first counter output (CTR0) of 500 Hz. It is this 2 millisecond output signal produced at the counter output of counter 298 which serves as the clock signal for the satelite output module 30 to interrupt the satelite output module. The first output (CTR0) of the counter 298 is also coupled to the clock input of a flip-flop 300 whose Q output is coupled to the interrupt (INT) input of the microprocessor 148. The D flip-flop input is coupled to the power supply so that the flip-flop 300 produces a signal at its Q output in response to the counter signal impressed at the flip-flop clock input, thereby causing the flip-flop 300 to provide an interrupt signal to the microprocessor interrupt input in response to the satelite output module clock signal produced by the counter 298.

To enable the master controller module to read the status and position data from the satellite output module, the read ($\overline{RD}$) input of microprocessor 148 is coupled via a gate 301 to the satellite output module via the secondary bus 684 of FIG. 2.

In addition to providing the $\overline{SAT\ WR}$ signal and the satellite clock signal, the clock timer circuit 168 of FIG. 8 also generates other control signals to assure proper handshaking with the satellite output module 30. To this end, the clock circuit 168 of FIG. 8 includes an output port latch 305 whose data input lines $D_0$–$D_7$ are coupled via bus 170 to the output of the data buffer 154 so as to be supplied from the data buffer with a control word previously latched into the data buffer from the microprocessor 148. The output port latch 305 is enabled with a chip select signal from the address demultiplexer 195 in response to the output port latch 305 address being latched into the address latch 156 from the microprocessor 148. When enabled, the output port latch outputs the address strobe signal $\overline{ADDR\ STRB}$ to the satellite along the secondary bus 68 of the back plane 48 of FIG. 1 to latch the address sent by the master controller module 28. In addition to generating the address strobe signal, the output port latch 305 also generates an interrupt reset signal INT FF RES when the appropriate control word is latched to the port from the data buffer 154 to provide a signal to the CLR input to the flip-flop 300 to reset the flip-flop. The latch 305 also generates a set of counter gate signals (CTR0, CTR1 and CTR2) to control the counter 86 of the satellite output module 30 of FIG. 2. Further the latch 305 generates a SYNC start signal and a MASTER STOP signal, to synchronize the satellite output module and to effect a master stop, respectively.

SATELLITE OUTPUT MODULE 30

Turning now to FIG. 10, there is shown, in block form, the schematic details of the satellite output module 30. As will be recalled from the previous discussion of satellite output module 30 provided with respect to FIG. 2, the satellite module 30 includes a processor 84. In the presently preferred satellite embodiment of FIG. 10 processor 84 takes the form of a microprocessor 330. The microprocessor 330 has its address and data bus line $AD_0$–$AD_7$ coupled to the address input of an address latch 335 via bus 336. The output lines $A_0$–$A_7$ of the address latch 335 are coupled via an address bus 377 to the $A_0$–$A_7$ address line input of a programmable read-only memory (PROM) 340. Microprocessor 330 has each of its higher order address lines $A_8$–$A_{11}$ coupled via bus 341 to the higher order address inputs $A_8$–$A_{11}$ of the programmable read-only memory (PROM) 340. The programmable read-only memory 340 stores the operating program for microprocessor 330 and is addressed by the microprocessor 330 by latching the low order address bits into the address latch 335 for transmission to the PROM 340 along bus 336 and by providing high order address bits directly to the PROM 340 along lines $A_8$–$A_{11}$. When addressed, the PROM 340 puts the contents of the just addressed memory location on the lines $D_0$–$D_7$ of data bus 336 to the address and data lines $AD_0$–$AD_7$ of the microprocessor 330.

Referring back to FIG. 2 for a moment it will be recalled that the satellite 30 has a jog forward switch 90a, a jog reverse switch 90b and a stop switch 90c coupled thereto. The user effects a jog forward, a jog backward and a stop, respectively, by closing a corresponding one of switches 90a, 90b and 90c, respectively. Turning once again to FIG. 10, each of the switches 90a, 90b and 90c is coupled to the input of a separate one of optical isolators 345a, 345b and 345c. The output of each optical isolators 345a, 345b and 345c is coupled to the first input of a separate one of exclusive OR (XOR) gates 348a, 348b and 348c, respectively. Each of the XOR gates 348a, 348b and 348c has its output coupled to a separate one of three inputs to the microprocessor 330. Exclusive OR gate 348c also has its output coupled to the interrupt (INT) input of the microprocessor 330 so that upon closure of the stop switch 90c, the microprocessor receives an interrupt signal, causing the microprocessor to stop execution of the then active program and initiate execution of an interrupt routine to cause the stepping motor to be halted.

The remaining input of each of the XOR gates 348a, 348b and 348c is coupled to the terminal of the power supply and is also coupled to the power supply through a separate one of the pull-up resistors 349a, 349b, and 349c. Each remaining XOR gate input is also coupled via a separate one of switches 350a, 350b and 350c to circuit ground. The purpose of providing switches 350a, 350b and 350c between the second input of each of the exclusive OR gates 348a, 348b and 348c and circuit ground is to enable the input logic state of each of the switches 90a, 90b and 90c to be set at a low TRUE or a high TRUE State depending upon whether switches 350a, 350b and 350c are open or closed, respectively.

Still referring to FIG. 10, the satellite module 30 includes a random access memory (RAM) 355 whose $D_0$–$D_7$ data lines are coupled via a data bus 358 to the data line $D_0$–$D_7$ of a data buffer 360. The data lines of data buffer 360 ($D_0$–$D_7$) are coupled via data bus 336 to the address and bus lines $AD_0$–$AD_7$ of the microprocessor 330. The address lines $A_0$–$A_7$ of the random access memory 355 are coupled via an address bus 362 to the address output lines of an address multiplexer 364. Address multiplexer 364 has its address line input $A_0$–$A_7$ coupled to the address bus 337 to receive the address latched into the address latch 335 by the microprocessor 330. To read data into, or to write data from the random access memory 355, the microprocessor 330 latches the appropriate address into the address latch 335 for transmission to the address multiplexer 364 which addresses the desired memory location of random access memory 355. In response, the random access memory 355 puts the data stored at the specified memory location on the data bus 358 for transmission via data bus 358 to the data buffer 360 which, in turn, passes the data on to data bus 336 for transmission to the microprocessor 330.

The RAM 355 may also be written to or read by the master controller module 28 of FIGS. 1, 2 and 7 and to this end, the data lines $D_0$–$D_7$ of the random access memory 355 are also each coupled to the input data lines of a data buffer 365. The output data lines of the data buffer 365 are coupled to the lines $D_0$–$D_7$ of the secondary bus 68 of the back plane 48 of the interface rack 16 of FIG. 1.

To enable the RAM 355 to be addressed by the master controller module 28 so that data may be written from the master module to the RAM 355 or written from the RAM 355 to the master controller module 28, the satellite module 30 is provided with a hex D-type flip-flop 370 whose six D inputs are each coupled to the 6 highest lines $D_1$–$D_7$ of the secondary bus 68. The first three outputs of the flip-flop 370 are each coupled to the first input of a separate one of exclusive OR gates 374a, 374b and 374c, respectively. The three remaining outputs of the latch 370 are each coupled via an address bus 378 to a separate one of the $A_5$–$A_7$ address inputs of the address multiplexer 364. Each of the exclusive OR gates 374a, 374b and 374c has its remaining input coupled both to the power supply via a separate one of pull up resistors 375a, 375b and 375c, respectively, and to circuit ground via a separate one of switches 376a, 376b and 376c, respectively. As with each of switches 350a, 350b, and 350c, the switches 376a, 376b and 376c are provided for selecting either a positive or negative logic state for the address data supplied to the D-type flip-flops 370 along the data lines $D_0$–$D_7$ of the primary bus 68.

The output of each of the exclusive OR gates 374a, 374b and 374c, is coupled to the D input of a flip-flop 380, the D flip-flop input also being coupled via resistor 381 to the power supply. The $\overline{Q}$ output of the flip-flop 380 is coupled to the enable input of both the address multiplexer 364 and to the data buffer 365 to enable both the address multiplexer 364 and the data buffer 365 when the D input of the flip-flop 380 is driven to a logic "1" level by any one of the exclusive OR gates 374a–374c at the time the flip-flop 380 is clocked.

The flip-flop 380 is clocked in response to a signal from the output of a NOT gate 382 whose input is supplied with the address strobe $(\overline{\text{ADDR STRB}})$ signal from the master controller module 28 via the primary bus 68. The NOT gate 382 also has its output coupled to the first input of a two input NAND gate 384 whose output is coupled to the clock input of the hex D-type flip-flop 370. The remaining input of NAND gate 384 is coupled to the output of a NOT gate 386 whose input is supplied with the satellite write signal $(\overline{\text{SAT WRITE}})$ supplied from the master module 28 of FIG. 6 via the secondary bus 68. The hex D-type latch 370 is thus clocked in response to both the occurrence of the address strobe signal $(\overline{\text{ADDR STRB}})$ and the satellite write signal $(\overline{\text{SAT WRITE}})$ but is not clocked when either signal is generated.

With transmission of the $\overline{\text{SAT WRITE}}$ signal to the Satellite Module 30 of FIG. 10, the master controller module 28 puts the address of the memory location of RAM 355 to be accessed on the data lines $D_0$–$D_7$ of the secondary bus 68. The presence of a logical "1" level signal at the D input of the flip-flop 380 causes the flip-flop, when clocked in response to $\overline{\text{ADDR STRB}}$ signal, to provide a logic "0" signal at its $\overline{Q}$ output to enable both the data buffer 365 and the address multiplexer 364.

When the address multiplexer 364 is enabled, the address multiplexer 364 puts the address lines $A_5$–$A_7$ latched in the flip-flop 370 on bus 362 to RAM 355. The logic state of the three highest order address bits output to the RAM 355 from the address multiplexer 364 correspond to the logic state of the signals of the line $A_5$–$A_7$ of bus 378 which couples the three highest input address lines of the address multiplexer 364 to the highest D output of the hex D-type flip-flop 370. The four lowest order bits of the address which address multiplexer 364 puts on the address bus 362 to the RAM 355 each correspond to the logic state of the lines $A_0$–$A_4$ of the bus 390 connecting the four lower order address line inputs of the multiplexer 364 to the output of a counter 392. The counter 392 comprises a count-up counter which is clocked in response to the output signal of a NOT gate 394 whose input is supplied with the output of an AND gate 396. The AND gate 396 has one of its two inputs coupled to the secondary bus 68 to receive the satellite read $(\overline{\text{SAT RD}})$ supplied from the NOT gate 301 of the master controller module along the secondary bus 68.

Still referring to FIG. 10, the other of the inputs of AND gate 396 is coupled to the output of a NAND gate 400 which is supplied at each of its two inputs with the address strobe signal $(\overline{\text{ADDR STRB}})$ signal and the output of the signal of the NOT gate 386. Each time the $\overline{\text{SAT RD}}$ signal or the $\overline{\text{SAT WRITE}}$ goes to a logic "0" state, then the AND gate 396 provides a logic "1" signal to the gate 304 which, in turn, provides a logic "0" signal to the clock input of the counter 392 to increment the counter count to allow the next address in the RAM 355 to be latched into the address multiplexer 364. The counter 392 is reset whenever the $\overline{\text{ADDR STRB}}$ signal is a logic "0" level.

Turning back to FIG. 2 for a moment, it will be recalled that the satellite module 30 includes a counter 86 which as described previously, generates the pulses that are supplied to the stepping motor translator 13a which in turn excites the stepping motor 13 accordingly. In the presently preferred embodiment of the satellite module 30 of FIG. 10, the counter 86 takes the form of a programmable interval timer 410 which has three internal counters (not shown). The programmable interval timer 410 has its two counter select inputs coupled to the lines $A_0$ and $A_1$ of the address bus 337. The microprocessor 330 selects which of the three internal counters of the programmable interval counter 410 is to be operated upon by latching an address into the address latch 335 whose lowest order two bits correspond to the binary two bit address of a selected one of the three counters of the programmable interval counter. The data inputs $D_0$–$D_7$ of the counter 410 are coupled to the data bus 336. By putting the desired value on bus 336, the microprocessor 330 can load the selected one of the three internal counters of the programmable interval timer 410 with the value which is to be decremented by the counter 410 to generate the pulse train that is supplied to the stepping motor translator 13a of FIG. 2.

Still referring to FIG. 10, the programmable interval timer 410 has its chip select input coupled to the output of a NOT gate 415 whose input is coupled both to the gate input (EN) of the data buffer 360 and to a ram select (RAM SEL) line 411 which is driven by the microprocessor 330. When the programmable interval timer 410 is to be loaded, the microprocessor 330 outputs a logic "1" on the RAM SEL line 411 to effectively disable the data buffer 360 and to enable the interval timer 410 so that the data put by the microprocessor on data bus 342 for the interval timer 410 does not reach the RAM 355.

The output of the programmable interval timer 410 is coupled to the first input of a two input NAND 420 gate whose remaining input is coupled via a line 421 referred to as the UPCOUNT DISABLE line, to a port of the microprocessor 330. When the interval timer 410 times out, the interval timer 410 provides an output signal at a logic "1" level to the input of the NAND gate 420. Normally, the microprocessor 330 maintains the UPCOUNT DISABLE line 421 at a logic "1" level so that the NAND gate 420 maintains a logic "1" level output signal in response to a logic "1" level output signal produced by the interval timer 410. However, by putting a logic "0" level signal on the UPCOUNT DISABLE line 421, the microprocessor 330 effectively disables the interval timer 410 since the presence of a logic "0" signal at either of two inputs of the NAND gate 420 causes the NAND gate to output a logic "0" level signal.

The programmable interval timer 410 has its first two gate disable inputs (GATE 0 DIS, GATE 1 DIS) coupled to the output of a NOT gate 425 whose input is coupled to the output of the exclusive OR gate 348c. Thus, when the stop switch 90c is closed, then a logic "1" level signal is present on the output of the OR gate 348c, causing the NOT gate 425 to place a logic "0" level signal on the GATE 0 DIS and GATE 1 DIS inputs of the programmable interval counter 410 to interrupt and disable the counter.

Still referring to FIG. 10, the satellite output module 30 is provided with 5 light emitting diodes (LED's) 426a–426e. Each of the LED's 426a–426e is mounted on the front panel of the satellite output module 30 of FIG. 1 so as to be exposed to the operator. Turning back to FIG. 10, each of the LED's 426a–426e has its anode coupled via a pull up resistor 427 to the power supply. The cathode of LED 426a is coupled via a buffer gate 428a to the microprocessor 330 to be driven thereby. The LED 426b has its cathode coupled via a buffer 428b to the output of gate 420. Each of the LED's 426c–426e has its cathode coupled via a separate one of buffers 428c–428e, respectively, to the output of a separate one of XOR gates 348c, 438b and 348a, respectively. The LED 426a is normally off but should a satellite output module fault be incurred, then the LED 426a is rendered conductive. The LED 426b is normally on or flashes while the satellite output module 30 is supplying pulses to the stepping motor translator 13a of FIG. 2. A stop, jog forward, or jog reverse condition is indicated when a corresponding one of LED's 426c, 426d and 426e is energized.

Still referring to FIG. 10, the microprocessor 330 of the satellite output module 30 generates a number of individual output signals which serve as the chip select signals to the various components coupled to the respective data buses to prevent a conflict between components.

The microprocessors 100 (FIG. 7) and 330 (FIG. 10) each comprise an INTEL model 8039 microprocessor whereas the microprocessor 148 (FIGS. 7–9) comprises an Intel model 8088 microprocessor. The instruction set for each type of microprocessor is known in the art and may be found in the Intel 1981 Component Data Catalog. From the known microprocessor instruction set, those skilled in the art can prepare the necessary programs in accordance with the functional operation of the master controller module 28 and the satellite output module 30 as indicated in the flow chart diagrams of FIGS. 11–22 and 23–44b, respectively.

DESCRIPTION OF THE MASTER MODULE 28 FIRMWARE AND THE SATELLITE MODULE 30 FIRMWARE

The operation of both the master controller module 28 of FIGS. 1, 2, and 7–9 and the operation of the satellite Module 30 of FIGS. 1, 2, and 10 may best be understood by reference to the flow chart description of the master controller module firmware illustrated in FIGS. 11–22 and by reference to the satellite output Module firmware illustrated in flow chart form in FIGS. 23–44b.

BASIC SCAN PROGRAM

Figure 11:
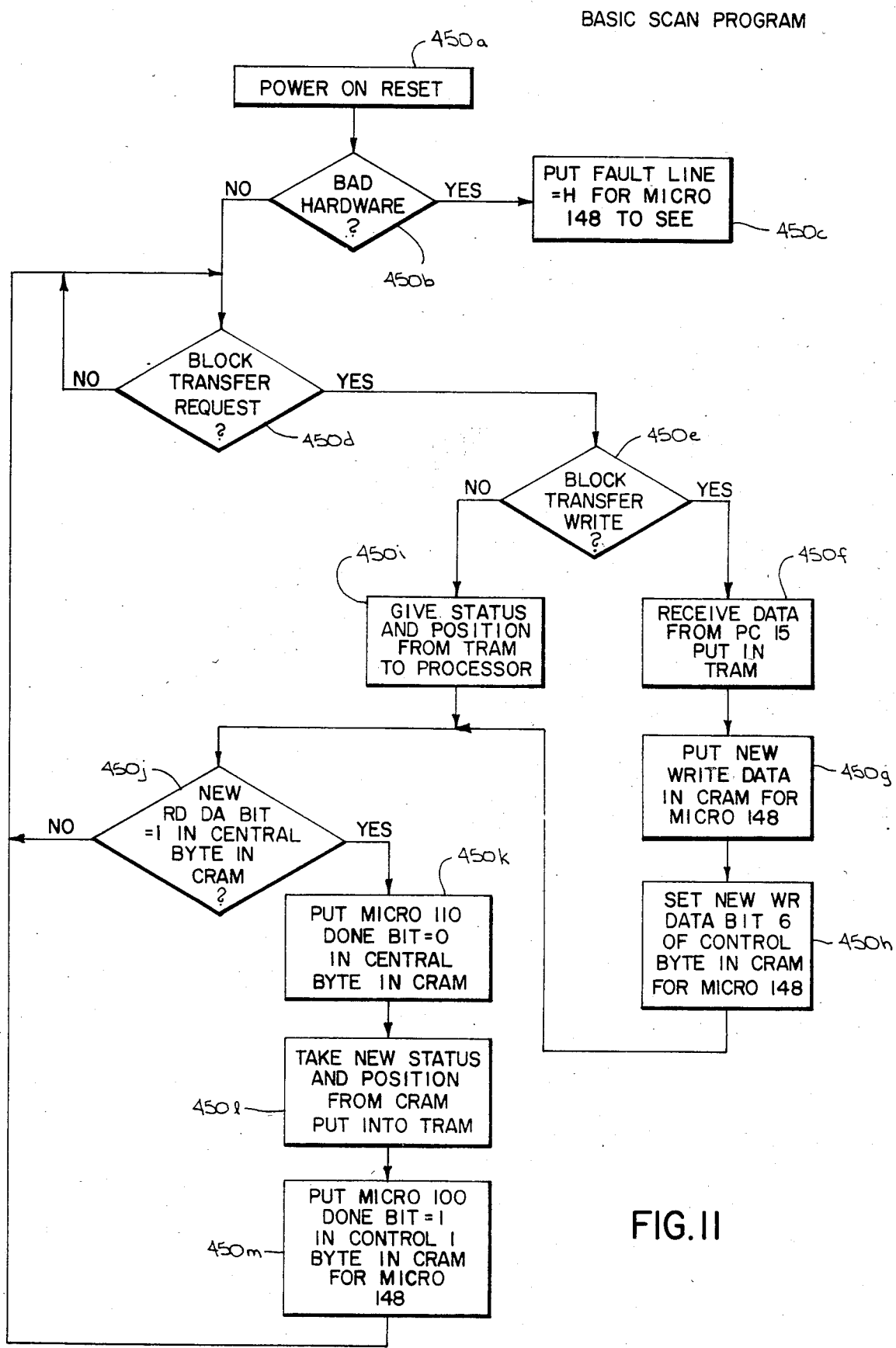
FIG. 11 is a flow chart representation of the BASIC SCAN program executed by the communication processor of the master controller module of FIG. 7.

Turning now to FIG. 11, there is shown a flow chart representation of the BASIC SCAN program embodied within the programmable read only memory 125 of FIG. 7 and is executed by the microprocessor 100 (which embodies the function of the communications processor 74 of FIG. 2) to control the communication of data between the master controller module 28 and the processing unit 15 of FIGS. 1 and 2 in a local rack system.

Execution of the BASIC SCAN routine is begun (Step 450a) with the microprocessor 100 resetting all of its internal registers and flags following a power up. Thereafter, the microprocessor 100 examines whether any of the other components ("hardware") of the master controller module is inoperative (Step 450b). Upon determination of inoperative "hardware", program execution branches to Step 450c during which the microprocessor 100 indicates the occurrence of a fault by setting a line, known as the fault line, to a logic "high" or "1" level for the microprocessor 148 to see. Once the fault line has been set to a logic "1" level, execution of the BASIC SCAN routine of FIG. 11 is halted, thus halting operation of the master controller module.

If no "hardware" fault exists, then program execution branches to Step 450d rather than 450c as previously described. During execution of Step 450d the microprocessor 100 ascertains whether the processor unit 15 of FIG. 1 has requested a block transfer (B.T.) of data, either to write a move data block 64 to the master controller module 28 or to read a status date block 67 from the master controller module 28. Execution of Step 450d is repeated for so long as no data transfer request is received from the processor unit 15.

Once a block data transfer request has been received, then program execution branches to Step 450e during which the microprocessor 100 ascertains whether data is to be written from the processor unit 15 of FIG. 1 or, to be read into the processor unit 15 of FIG. 1. Should the data transfer request detected during Step 450d be a WRITE request, then program execution branches from Step 450e to Step 450f during which the data from the processor unit 15 of FIG. 1 is put into the temporary random access memory 128 of FIG. 7. Next, the data previously entered into the temporary random access memory 128 of FIG. 7 is put into the CRAM 135 to make the data available to the microprocessor 148 of FIG. 7 (Step 450g).

Still referring to FIG. 11, following execution of Step 450g, bit 6 of the first control byte (control byte #1)

stored in the CRAM 135, as illustrated in FIG. 7b, is set to a "1" to reflect the receipt of new data in the CRAM 135 (Step 450h). For this reason, the bit 6 of the first control byte in the CRAM 135 is designated as the NEW WR (new write) data bit.

If, during execution of Step 450e, the data request is found not to be not a WRITE request but rather a READ request, then program execution branches to Step 450i rather than Step 450f as previously described. During execution of Step 450i, the status and position information previously stored in the temporary random access memory 128 is transmitted to the processor unit 15 of FIG. 1. Following execution of either Step 450i or Step 450h, depending on whether a WRITE or READ request has been received, then the microprocessor 100 proceeds to execute Step 450j and examine whether a bit, designated as the new read (NEW RD) data bit, in the first control byte in the CRAM 135 has been set. In practice, the NEW RD data bit in the first control byte in the CRAM 135 is set by the microprocessor 148 to indicate to microprocessor 100 that more status and position information, in the form of the status data block 67, has been prepared for the processor unit 15 of FIG. 1.

Upon finding the NEW RD data bit set, the microprocessor 100 then executes Step 450k to set a bit, known as the DONE bit, in the first control byte in the CRAM 135 to a logic "0" condition. This is done to designate to microprocessor 148 that microprocessor 100 will be taking the new status and position data from CRAM 135 and that such data should not be overwritten by microprocessor 148 if the microprocessor 148 enters the CRAM 135 before the microprocessor 100 has finished taking the data from the CRAM 135 and has set the done bit. Thereafter, the new status and position information from the CRAM 135 of FIG. 7 is put into the temporary random access memory 128 (Step 450l) so that a new status data block 67 of FIG. 6 may be sent to the processor unit 15 of FIG. 1 upon subsequent execution of the BASIC SCAN program. Thereafter, the DONE bit of the first control byte in the CRAM 135 is set to a logic "1" level to reflect that the new status and position data has been obtained from the common random access memory 135 and has been put into the temporary random access memory 128 (Step 450m). Upon execution of Step 450m, program execution branches back to Step 450d and those following it.

SCAN LOOP PROGRAM

Turning now to FIGS. 12–22 there is shown, in flow chart form, the SCAN LOOP program and the various subroutines which are executed by the microprocessor 148 of FIG. 7 to process the move data block 64 of FIG. 4 to yield the satellite move set data block 80 of FIG. 2. In operation, the microprocessor 148 continuously executes program designated as the SCAN LOOP program which is illustrated in flow chart form in FIG. 12. During execution of the SCAN LOOP program, the microprocessor 148 does the following: (a) gets each move data block 64 of FIG. 4 entered into the CRAM 135 by the microprocessor 100 of FIG. 7, (b) processes the move data block 64 to yield the satellite data move set data block 80 for transmission to a satellite output module such as the satellite output module 30 of FIGS. 1, 2 and 10, and (c) updates the previous stepping motor status and position information to make the data available to the processing unit 15 of FIG. 1.

Figure 12:
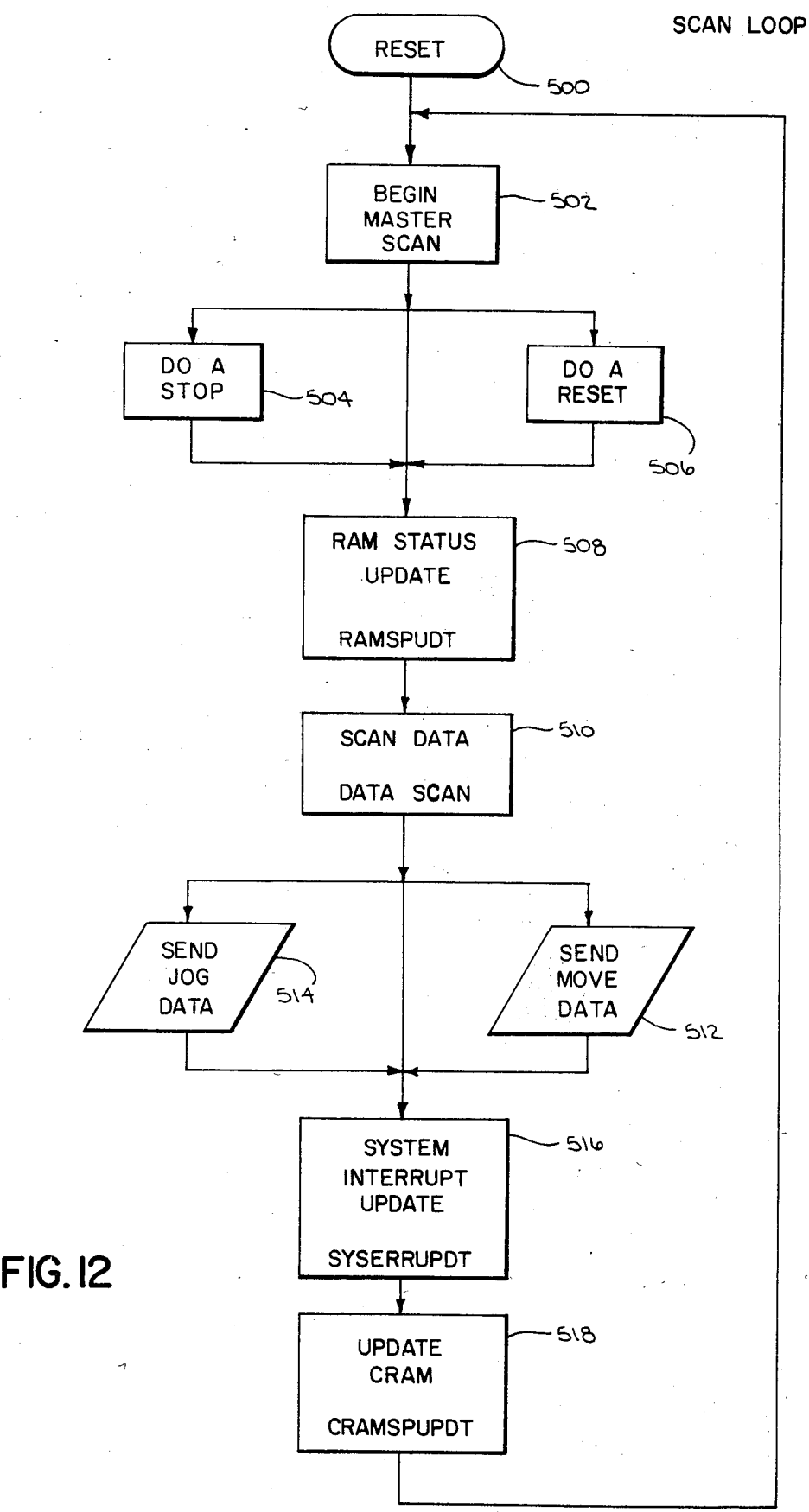
FIG. 12 is a flow chart representation of the SCAN LOOP program which is continuously executed by the arithmetic processor of the master controller module of FIG. 7 to generate the satellite move set data block and to send the satellite move set data block to each satellite output module to control its associated stepping motor.

Turning now to FIG. 12, which is a simplified flow chart representation of the SCAN LOOP program, upon "power-up" of the master Module 30 of FIGS. 1, 2 and 7 to 9, the microprocessor 148 of FIGS. 7 and 9 initiates execution of the SCAN LOOP program by first executing a reset routine (Step 500) during which the microprocessor 148 resets all internal registers and counters, as well as resetting the counter 298 of the timing circuit 168 of FIG. 9. Still referring to FIG. 11, following execution of the reset routine (Step 500) the microprocessor 148 proceeds to execute the begin master scan routine (Step 502) which will hereinafter be referred to as the BEGMSCAN routine. During execution of the BEGMSCAN routine, which is described in greater detail with respect to FIGS. 13a and 13b, the microprocessor 148 first scans the primary bus 68 of the mother-board back plane 48 of interface rack 16 of FIG. 1 to determine the status of the I/O reset line which although not shown is one of the lines 66 of the primary bus. Thereafter, the microprocessor 148 performs a programming check to determine whether or not any programming errors and particularly whether any fatal programming errors exist which would inhibit successful control of the stepping motor 13 of FIG. 1. Should no programming errors exist, then the microprocessor 148 moves the move set block data previously entered in the CRAM 135 by the microprocessor 148 into a work or storage area to allow the microprocessor 148 to subsequently process the move data block 64 of FIG. 4 to yield the satellite move set data block 80 of FIG. 2 for the satellite output module 30.

Once the microprocessor 148 has completed execution of the BEGMSCAN routine then program execution may follow one of three separate paths depending on whether or not a stop or a reset command was embodied within the move data block 64 received from the processing unit 15 of FIG. 1. Should the move data block 64 previously loaded during the BEGMSCAN routine contain a stop command, then the microprocessor 148 causes a stop command to be sent to the satellite output module 30 (Step 504). Instead of requesting a stop, the move data block 64 loaded by the microprocessor 100 may contain a reset command rather than a stop command. If the data loaded by the microprocessor 148 during the BEGMSCAN routine contains a reset command, then, following execution of the BEGMSCAN routine, the microprocessor sends a reset command (Step 506) to the Satellite Module to reset the Satellite Module.

Following transmission of either a stop command (Step 504) or a reset command (Step 506) or following execution the BEGMSCAN routine (Step 502) when no stop command or reset command is present in the previously loaded move data block, then the microprocessor 148 proceeds to update the stepping motor status and position data. To update the stepping motor status and position data, the microprocessor 148 executes (Step 508) a ram status position update (RAMSPUPDT) subroutine described hereinafter with respect to FIG. 14. During execution of the RAMSPUPDT routine, the microprocessor 148 gets the latest stepping motor status and position data from the satellite output module 30 of FIGS. 1, 2 and 10 and then updates the RAM 162 of FIG. 7 to reflect the latest stepping motor status and position data. Upon completion of the RAMSPUPDT subroutine, the microprocessor 148 then scans the previously loaded move data block containing the user stepping motor move profile parameters and processes the data (step 510) to yield the satellite move set data block 80 of FIG. 2 which enables the satellite output module 30 to control the stepping motor 13 to achieve the move profile. The scanning and processing of the previously loaded move data block 64 is accomplished by the microprocessor 148 during (Step 510) execution of DATA SCAN routine described hereinafter with respect to FIG. 15.

Still referring to FIG. 12, if, in executing the DATA SCAN routine (Step 510), the move data block 64 is found to contain a stepping motor move then, the satellite move set data block 80 is processed and sent to the satellite output module 30 to accomplish the desired stepping motor move (Step 511). If the move data block 64 scanned during the DATA SCAN routine (Step 510) contains jog data, then the jog data is processed and sent to the satellite output module 30 (Step 514).

Following the sending of the satellite move set data block (Step 512) or sending of the jog data (Step 514) or, following execution of the DATA SCAN routine (Step 510) when no jog or satellite move set data block is to be sent, then the microprocessor 148 updates all of its internal flags as well as the status and position information in the random access memory cram 135 of FIG. 7 (Step 516) to reflect the most recent communication with the satellite. To accomplish this system update, the microprocessor executes a system error update (SYSERRUPDT) routine which is described in greater detail hereinafter with respect to FIG. 20.

Once the microprocessor has executed the SYSERRUPDT routine, the microprocessor 148 updates the common random access memory 135 with the most recent status and position of the stepping motor (Step 518). The updating of the common random access memory 135 is accomplished by executing the CRAMSPUPDT routine described hereinafter with respect to FIG. 22. Upon completion of execution of the CRAMSPUPDT routine to update the common random access memory 135, program execution branches back to step 502 to recommence by execution of the BEGMSCAN routine and the steps following it. For so long as the master controller module 28 is powered from the power supply following the reset routine (Step 500), the microprocessor 148 of the master controller module 28 continuously executes the steps of the SCAN LOOP program to successively load and process each move data block 64 received from the processor unit 15 to provide each of the three satellite output modules with the satellite move set data block data to enable the satellite output module to control the stepping motor to achieve the stepping motor move profile.

BEGMSCAN

Figure 13B:
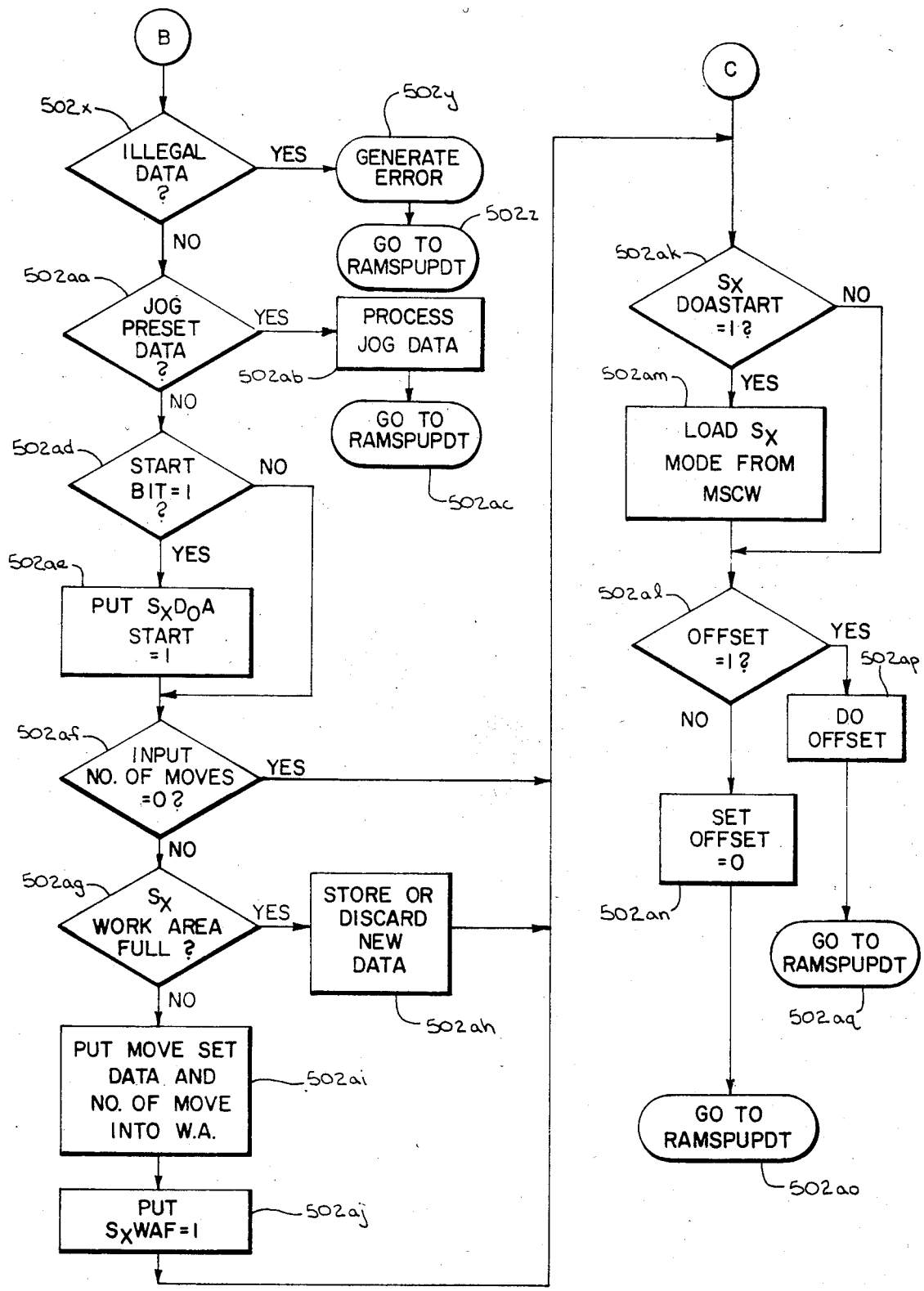

Turning now to FIGS. 13a and 13b, there is shown a flow chart representation which depicts the details of the BEGMSCAN routine which is executed by the microprocessor 148 during the SCAN LOOP program. Referring now to FIG. 13a, the BEGMSCAN routine is begun (Step 502a) during execution of Step 502 in the SCAN LOOP program of FIG. 11. Still referring to FIG. 13a, in the BEGMSCAN routine, the microprocessor 148 first checks the status of the I/O reset line. Normally, while the processor unit 15 of FIGS. 1 and 2 is in a non-reset condition, the I/O reset line remains at a logic "0" level. Thus, when the status of the I/O reset line is examined during Step 502b, the line is usually found to be at a logic "0" level so that the microprocessor proceeds to Step 502c during which time the microprocessor checks the status of the I/O reset flag, that is to say, the microprocessor 148 checks the status of a memory bit (IORESON), whose logic state represents the status of the I/O reset flag. Usually, when the I/O reset line is at a logic "0" level, the I/O reset flag is not set, that is to say, the logic state of the IORESON bit is at a logic "0" level so that the microprocessor 148 then proceeds to Step 502d during which time the microprocessor 148 puts the logic state of the IORESON bit to a logic "0" condition. Should, however, the IORESON bit be at a logic "1" level, then the microprocessor proceeds to Step 502e to wait for a period of 10 milliseconds, the time period of each period stepping motor acceleration or deceleration interval before proceeding to Step 502d to disable the I/O reset flag by setting the IORESON bit equal to a logic "0" level.

If the microprocessor 148 finds the I/O reset line to be at a logic "1" level when its status is checked during execution of Step 502b, then the microprocessor proceeds to Step 502f during which the microprocessor sets the I/O reset flag by putting the IORESON bit equal to a logic "1" state. All of the other microprocessor flags are cleared as well as all data except the position information from the satellite output module indicative of the stepping motor position. As will become better understood following a detailed description of the DATA SCAN routine, the setting of the I/O reset flag prevents the microprocessor 148 from processing the previously transmitted move data block.

Following execution of Step 502d or following the execution of Step 502f should the I/O reset line be at a logic "1" level when checked during the execution of Step 502b, the microprocessor 148 then proceeds to check the microprocessor 100 to determine whether or not any communication faults have occurred (Step 502g). The occurrence of a communication faults results in the microprocessor 148 setting the LED 193a of FIG. 7. If a fault with the satellite output module 30 was previously detected and stored, then microprocessor 148 sets L.E.D. 193b of FIG. 7. Should no communication fault exist, representing the normal state of affairs, l.e.d. 193c of FIG. 7 is then set.

Thereafter, the microprocessor 148 executes Step 502h during which the microprocessor sets the satellite start command bit (SXDOASTART) equal to a logic "0" and also sets the satellite override command bit (SXOVRD) equal to a logic "0" for each of the satellites so that a previous start command is not retained, thereby preventing a stepping motor move at an undesired time. Since the master controller module 28 can control up to three satellite output modules, the satellite then in communication with the master module is identified as $S_x$ where x is 1, 2 or 3. Also, during execution of Step 502h, the microprocessor sets the satellite output module stop reset bit (STOPRES) equal to a logic "0" so that a jump from any part of the BEGMSCAN routine can be made without any adverse effect.

Next, the microprocessor 148 checks to see if the CRAM 135 is available to be accessed (Step 502i). In other words, the microprocessor 148 checks to see whether or not the CRAM 135 is presently being accessed by the microprocessor 100 as occurs when the microprocessor 100 is loading the CRAM 135 with the move data block 64 previously entered into TRAM 128 from the processor unit 15 of FIG. 1. If the CRAM 135 of FIG. 6 is available for access by the microprocessor 148, then microprocessor 148 accesses the CRAM 135.

After accessing the CRAM 135, the microprocessor 148 then checks to see whether or not the data that has been entered into the CRAM 135 is in fact new (Step 502*j*) by checking the new WR DATA bit in the CRAM 135. The absence of a new move data block 64, as represented by the NEW WR DATA bit being at a logic "0", causes the microprocessor 148 to branch to Step 502*k* during which the microprocessor 148 checks the CRAM 135 and PROM 166 to see that each is operating properly. Following Step 502*k*, the microprocessor 148 jumps (Step 502*l*) to the RAMSPUPDT routine of FIG. 14.

Still referring to FIG. 13*a*, when there is a new move data block 64, the microprocessor 148 causes the new move data block 64 to be put into a memory area, designated as the satellite work area (SWA), of the CRAM 135 (Step 502*m*). The microprocessor 148 then proceeds to check for any errors in data by comparing the check sum value of the move data block to the check sum value stored in memory (Step 502*n*). Should an error occur, then the microprocessor branches to Step 502*o* to record the error in RAM 162 and adjusts the status information contained within the status data block 67 of FIG. 2. After execution of Step 502*o* the microprocessor 148 jumps (Step 502*p*) to the RAMPSPUPDT routine of FIG. 14.

When no data error is found during Step 502*n* of FIG. 13*a* the microprocessor 148 branches to Step 502*q* during which the microprocessor 148 checks to see which satellite output modules are present. It should be remembered that the move set control word (MSCW) at the beginning of each move data block, such as the move data block 64 of FIG. 4, has two bits (bits 11 and 12) which specify the address of the satellite output module (axis) to be controlled by the data or commands or both in the move data block 64 of FIG. 4. The absence of the satellite output module associated with the axis whose address is specified in the MSCW of the move data block 64 causes the microprocessor 148 to set a particular satellite program error flag (Step 502*r*) by putting the satellite program error bit (S*x*PROGE) equal to logic "1" (Step 502*r*). Thereafter, the microprocessor jumps (Step 502*s*) to the RAMSPUPDT routine of FIG. 14.

Usually, the axis address specified by the axis address bits (bits 11 and 12) of the move set control word (MSCW) identifies a present satellite so that execution of Step 502*q* is followed by Step 502*t* rather than Step 502*r*. During execution of Step 502*t*, the microprocessor 148 calculates the number of moves specified by the move set data block by checking to see how many move blocks are present. The maximum number of moves that may be specified by each move data block 64 is 10, although a lesser number of moves may be specified.

Once the microprocessor 148 has calculated the number of moves and stored the number in RAM 162 (Step 502*t*), then the microprocessor 148 checks to see whether or not preset data is included in the move data block and whether a jog has been specified (Step 502*u*). If a jog or preset has been specified in the move data block 64, then the microprocessor 148 sets the appropriate flags in RAM 162 (Step 502*v*). Once it has been determined that no jog or preset has been specified, or if a jog or preset has been specified, the appropriate bits have been set, then the microprocessor 148 executes branch B to Step 502*x* of FIG. 13*b*. During Step 502*x*, the microprocessor 148 checks for any illegal move combinations as may occur if the move data block 64 contains a jog move and that axis has been synchronized to other axes. The presence of an illegal move combination causes the microprocessor 148 to generate an error condition (step 502*y*) after which the appropriate flags are set in RAM 162. Execution of the BEGMSCAN routine is terminated and the microprocessor 148 (Step 502*z*) continues to the RAMSPUPDT routine of FIG. 14. Once the microprocessor 148 has determined that no illegal data commands have been entered, the microprocessor 148 proceeds to Step 502*aa* to determined whether or not any jog or preset data is present. The presence of jog or preset data causes the microprocessor to execute Step 502*ab* during which the microprocessor partially processes the jog or preset data before continuing on (Step 502*ac*) to the RAMSPUPDT routine of FIG. 14.

The lack of any jog or preset data causes the microprocessor 148 to branch to Step 502*ad* rather than to Step 502*ab* as previously described. During execution of Step 502*ad*, the microprocessor 148 checks the status of the move start bit, that is to say, the microprocessor 148 checks to see whether the move start bit is at a logic "1" or a logic "0" level. The setting of the move start bit to a logic "1" signifies that a move is to occur immediately whereas the contrary condition signifies that a move is to occur at a later time. A determination that the move start bit is set when examined during execution of Step 502*ad* causes the program execution to branch to Step 502*ae* during which time the microprocessor 148 sets the a start command flag by putting the corresponding satellite start command bit (SXDOASTART) bit equal to a logic "1".

Following execution of Step 502*ae*, or following execution of Step 502*ad* if the microprocessor 148 as found the start bit to be unset, then the microprocessor 148 branches to Step 502*af* during which time the microprocessor 148 compares the number of moves previously calculated during Step 502*o* to the value zero. If the number of moves is equal to zero, then branch C is executed to a later described step. Otherwise, program execution proceeds to Step 502*ag* during which step the microprocessor examines the satellite work area memory portion of RAM 162 to determine if this area is full. As will be seen hereinafter, the satellite work area is loaded with the move data block during a later step of the BEGMSCAN routine.

If the satellite work area is full, indicating that data had been already moved into the work area in an earlier cycle of the routine, then the microprocessor 148 checks to see if the new move data block is of the same move set number as what has been previously loaded (Step 502*ah*) before proceeding to branch C. The new data is stored or discarded accordingly. A determination that the satellite work area is not full causes the microprocessor 148 to branch to Step 502*ai* during which the microprocessor 148 moves the move set data into the satellite work area. At the same time, the number of moves previously calculated during Step 502*t* is also moved into the work area.

Thereafter, the microprocessor sets a flag, referred to as the satellite work area flag (Step 502*aj*) to designate that the satellite work area has now been filled with the move data block. The setting of the satellite work area flag is accomplished by having the microprocessor put a bit, referred to as a satellite work area bit (S*x*WAF) equal to a logic "1" to designate that the particular area of RAM 162 set aside for a satellite S*x* is filled by virtue of having been previously loaded with data.

After the $S_xWAF$ bit has been set, then the microprocessor 148 follows Branch C to Step 502ak to examine the bit SXDOASTART to determine whether or not the bit is set to a logic "1" level.

If the SXDOASTART bit is at a logic "1" condition, reflecting the fact that the start bit of the move set control word of the move set block is at a logic "1" condition, then the microprocessor 148 loads the satellite mode bit (bits 1 and 2) of the move set control word of FIG. 4 into memory (Step 502am) so that the microprocessor will be apprised of the type of desired positioning profile of the stepping motor. As will be recalled from Table I, the particular bit combination of bits 1 and 2 of the move set control word of FIG. 4 determines whether a continuous mode, independent mode or single step mode has been specified. After Step 502am, the microprocessor 148 proceeds to step 502al and to examine the offset bit (bit 13 of the MSCW).

If, upon examination of the offset bit, the bit is found to be at a logic "0", then the offset flag bit (SXOFF-SET) is set to a "0" (Step 502an). Thereafter, the microprocessor 148 continues (Step 502ao) to the RAMP-SPUPDT routine. Otherwise, if the offset bit is found to be a logic "1", then program execution branches to step 502ap. During execution of Step 502ap, the microprocessor 148 performs the offset on the move data specified by the move set bit in the move set control word if specified move data is present. Otherwise no action takes place. Upon completion of Step 502ap, program execution branches (Step 502aq) to the RAMSPUPDT routine.

RAMSPUPDT

Figure 14:
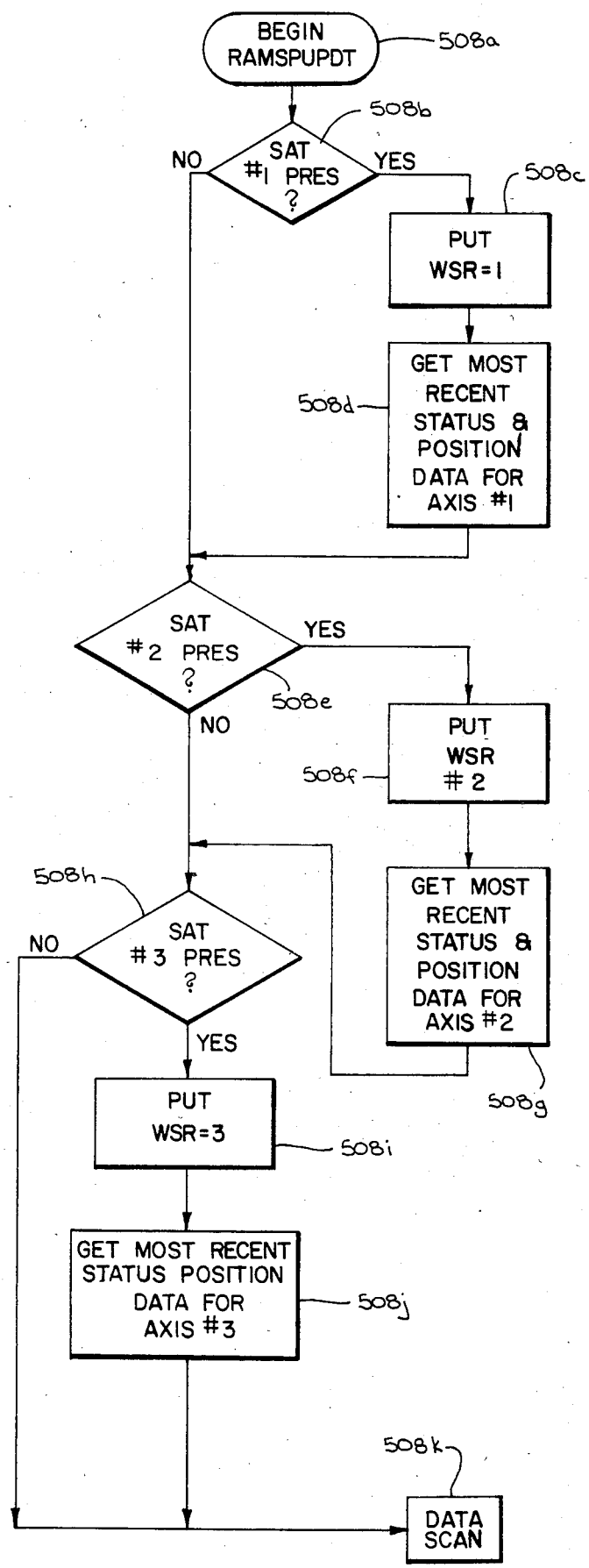
FIG. 14 is a flow chart representation of the subroutine RAMSPUPDT which is executed to update the stepping motor status and position data obtained from the satellite output module.

Turning to FIG. 14, execution of the RAMSPUPDT routine is begun when the routine entered (Step 508a) following a stop command (Step 504 of FIG. 12) a reset command (Step 506 of FIG. 12) or following the BEGMSCAN routine. Thereafter, the microprocessor 148 senses whether the first satellite output module ($S_1$) is physically present (Step 508b). Upon finding the satellite $S_1$ to be phsyically present, the microprocessor 148 writes the binary equivalent (01) of a $1_{10}$ into the WSR (which satellite register) of RAM 162 of FIG. 7a (Step 508c). After a binary 01 has been written into the WSR, the microprocessor then reads the satellite output module $S_1$ to obtain the most recent status and position data (Step 508d). Following execution of Step 508d, or following execution of Step 508b if the satellite output module $S_1$ is not physically present, the microprocessor 148 then proceeds to Step 508e and examines whether or not the second satellite output module ($S_2$) is present. A determination that the satellite output module $S_2$ is present causes the microprocessor 148 to proceed to Step 508f during the execution of which the microprocessor puts the binary value 010 ($2_{10}$) in the WSR. Thereafter, the microprocessor 148 gets the most recent status and position information from the satellite output module $S_2$ (Step 508g).

Following the execution of Step 508g, or following execution of Step 508e if the satellite output module $S_2$ is not found to be physically present, the microprocessor 148 then looks for the third satellite output module $S_3$ (Step 508h). If the satellite output module $S_3$ is found present, then the microprocessor 148 proceeds to Step 508i and puts a binary 0.11 ($3_{10}$) in the WSR. Thereafter, the microprocessor 148 obtains the most recent status and position data from the satellite output module $S_3$ (Step 508j). Upon completion of Step 508j, or following the execution of Sep 508h if the satellite output module $S_3$ is not found to be present, then the microprocessor 148 continues on to the data scan (DATA SCAN) (Step 508k) routine during which the microprocessor 148 scans the move data block 64 and processes the data to yield the satellite move set data block 80 which is supplied to the designated satellite output module to control its associated stepper motor accordingly.

DATASCAN

Turning now to FIG. 15, there is shown a flow chart representation of the DATA SCAN routine executed by the microprocessor 148 to scan and process the move data block 64 data to produce the satellite move set data block 80 supplied to the designated satellite modules. Immediately after beginning execution of the DATA SCAN routine (Step 510a), the microprocessor 148 checks the status of the IORESON bit (Step 510b). As will be recalled, the status of the IORESON bit mirrors the status of the I/O reset line of the primary bus 66 of FIGS. 2–9. The I/O reset line is normally at a logic "0" level, but goes to a logic "1" level during a reset interval. Thus, the IORESON bit is likewise normally at a logic "0" level. Accordingly, when the status of the IORESON bit is examined during the execution of Step 510b, the microprocessor 148 typically finds the IORESON bit at a logic "0" condition and proceeds to Step 510c. During the execution of Step 510c the microprocessor 148 checks to see if the satellite output module $S_1$ is present. If so, the microprocessor then puts a "1" to the WSR (Step 510d). Thereafter, the microprocessor 148 executes Step 510e during which the microprocessor 148 calls the subroutine SELECT SCAN of FIG. 16 to scan the move data block 64. Following the execution of Step 510e, or following the execution of Step 510c when satellite output module $S_1$ is not found to be present, the microprocessor 148 then proceeds to Step 510f to determine whether the satellite output module $S_2$ is present. If satellite output module $S_2$ is present, the microprocessor 148 then puts a binary 10 ($2_{10}$) to the WSR (Step 510g). Thereafter the SELECT SCAN routine is called to scan the move data block for the satellite output module $S_2$ (Step 510h).

Following execution of the SELECT SCAN routine (Step 510h) or following execution of Step 510f is satellite output module $S_2$ if not present, the microprocessor 148 proceeds to Step 510i to examine whether the satellite output module $S_3$ is present. The presence of the satellite output module $S_3$ causes the microprocessor to branch from Step 510i to Step 510j and puts a binary 11 ($3_{10}$) to the WSR. Thereafter, the microprocessor 148 executes the SELECT SCAN routine (Step 510k) to scan and process the move data block for the satellite output module $S_3$.

Following execution of Step 510k or following execution of Step 510b if the IORESON bit was found to be at a logic "1" condition, the microprocessor 148 then accomplishes a system error update by branching to the system error update routine (SYSERRUPDT) (Step 510l) described hereinafter with respect to FIG. 20.

SELECT SCAN

Referring now to FIG. 16 there is shown a flow chart illustration of the SELECT SCAN subroutine which is executed by the microprocessor 148 during each of Steps 510e, 510h and 510k of the DATA SCAN routine of FIG. 14. Execution of the SELECT SCAN routine begins (Step 511a) following a call made during the execution of each of the Steps 510e, 510h or 510k of the DATA SCAN subroutine of FIG. 15. Thereafter, the microprocessor executes Step 511b during which the microprocessor 148 checks for a user status system fault by examining the SYS FAULT bit in the status block 67. Upon occurrence of a system status fault, the SYS FAULT bit is set to a logic "1" condition. The presence of a logic "1" level SYS FAULT bit causes the microprocessor 148 to return to the DATA SCAN subroutine (step 510e) following execution of Step 511b to inhibit the further scanning and processing of the move data block.

The presence of a logic "0" SYS FAULT bit in the status block 67 causes the microprocessor 148 to branch to Step 511d following execution of Step 511b rather than returning to the DATA SCAN routine. During execution of Step 511d, the microprocessor 148 obtains the value of the base address pointer which indicates the relative memory address within the RAM 165 associated with the first word of the working area for the satellite output module $S_x$. Rather than reference the memory location of the move data block for each satellite output module by its absolute address, an indirect addressing scheme is utilized. A base pointer is employed to indicate the first address of the first data word in the move data block for the first satellite output module. The base pointer is then advanced to indicate each successive data word associated with the first satellite output module $S_1$. When the WSR is altered to designate the satellite output module $S_2$ or $S_3$, then the base pointer automatically designates the address for the first data word for the satellite output module designated by the WSR. As before, the base pointer advances to indicate the next incremental address of the next data word associated with the then-designated satellite output module. Since the data words of the move data block for each satellite output module are stored in consecutive address locations within the RAM 165, the need for extensive address manipulation is avoided.

Following execution of Step 511d, the microprocessor 148 then checks whether a jog or initialization preset has been done (Step 511e) by calling for the jog and preset flag bits. Thereafter the microprocessor 148 tests the bit DIDAJP (Step 511f). If the DIDAJP bit is set equal to "1" signifying the jog or preset has been done, then the microprocessor 148 ceases execution of the SELECT SCAN routine and returns (Step 511c) to the DATA SCAN routine of FIG. 15.

The presence of a logic "0" level DIDAJP bit, signifying that a jog or initialization preset was not done, causes the microprocessor 148 to branch to Step 511g during which the microprocessor 148 determines whether a hard or soft jog has been started. A hard jog is started by actuation of one of switches 90a or 90b whereas a soft jog is started by appropriately setting either the jog reverse or jog forward bit (bit 14 or 15), respectively, of the move set control word (MSCW) of FIG. 4. The start of a hard or soft jog causes a return to the DATA SCAN routine (Step 511c). Otherwise, the microprocessor proceeds to Step 511h during which the microprocessor 148 examines the status of a flag bit (SX MODE LOADED) whose logic State indicates whether more set data has been processed and ready for execution. If the SX MODE LOADED bit is equal to a logic "0", then no data is sent to the satellite output module and the microprocessor 148 returns (Step 511c) to the DATA SCAN routine. Otherwise, the SX MODE byte in RAM 162 is examined (Step 511i) to determine whether or not the move set mode is single step. As will be recalled from the description of the move set control word graphically represented in FIG. 4, the first bit of the two mode select bits (bit 1) of the move set control word is set at a logic "0" level when a continuous and independent mode positioning profile for the stepping motor is commanded. In contrast, the first of the mode select bits (bit 1) of the move set control word is set at a logic "1" level for a single step mode. Thus, by examining the status of the SX MODE byte, the microprocessor 148 knows whether the positioning profile is of single step mode or not.

A determination that the commanded positioning profile type is a single step mode causes the program control to branch to Step 511j during which the microprocessor 148 calls the single step data scan (SSDASCAN) routine to scan and process the single step move set block data to yield the satellite move set data block to enable the satellite to control the stepping motor to achieve the stepping motor move profile. Should the SX MODE byte indicate that the move profile type is either a continuous or independent mode, then program execution branches to Step 511k during which step, the microprocessor calls the continuous data scan routine (CONT DATA SCAN). The continuous data scan routine is similar in many respects to the SSDASCAN routine so that the CONT DATA SCAN routine will not be described. Following execution of SSDASCAN routine (Step 511j) or execution of the CONT DATA SCAN routine (Step 511k) the microprocessor 148 returns to executing the DATA SCAN routine (Step 511c).

SSDASCAN

Figure 17A:
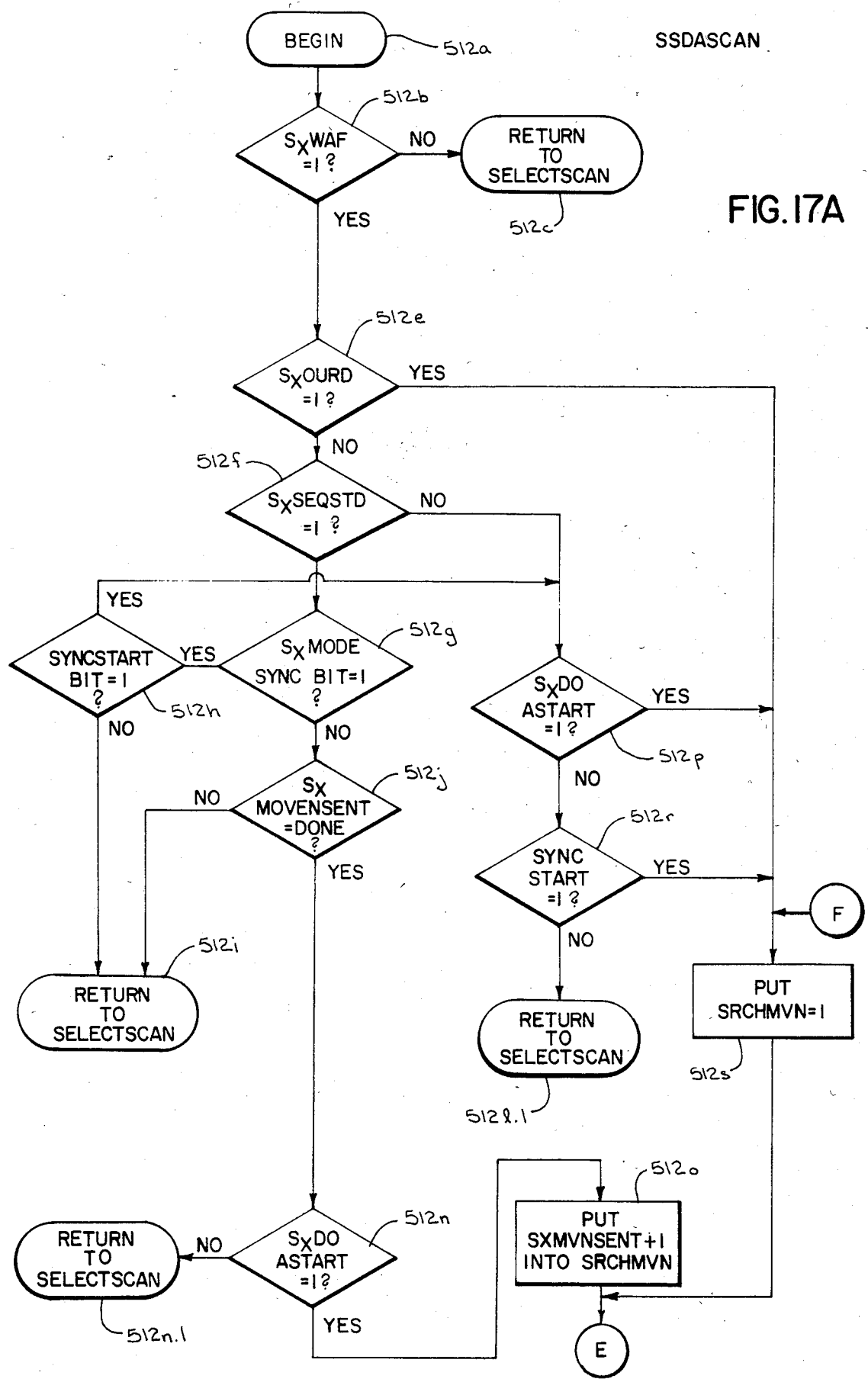
FIGS. 17a and 17b comprise flow chart representation of the subroutine SSDASCAN which is executed during the SELECT SCAN routine of FIG. 16 to perform a data scan of the data of a single mode stepping motor move profile.
Figure 17B:
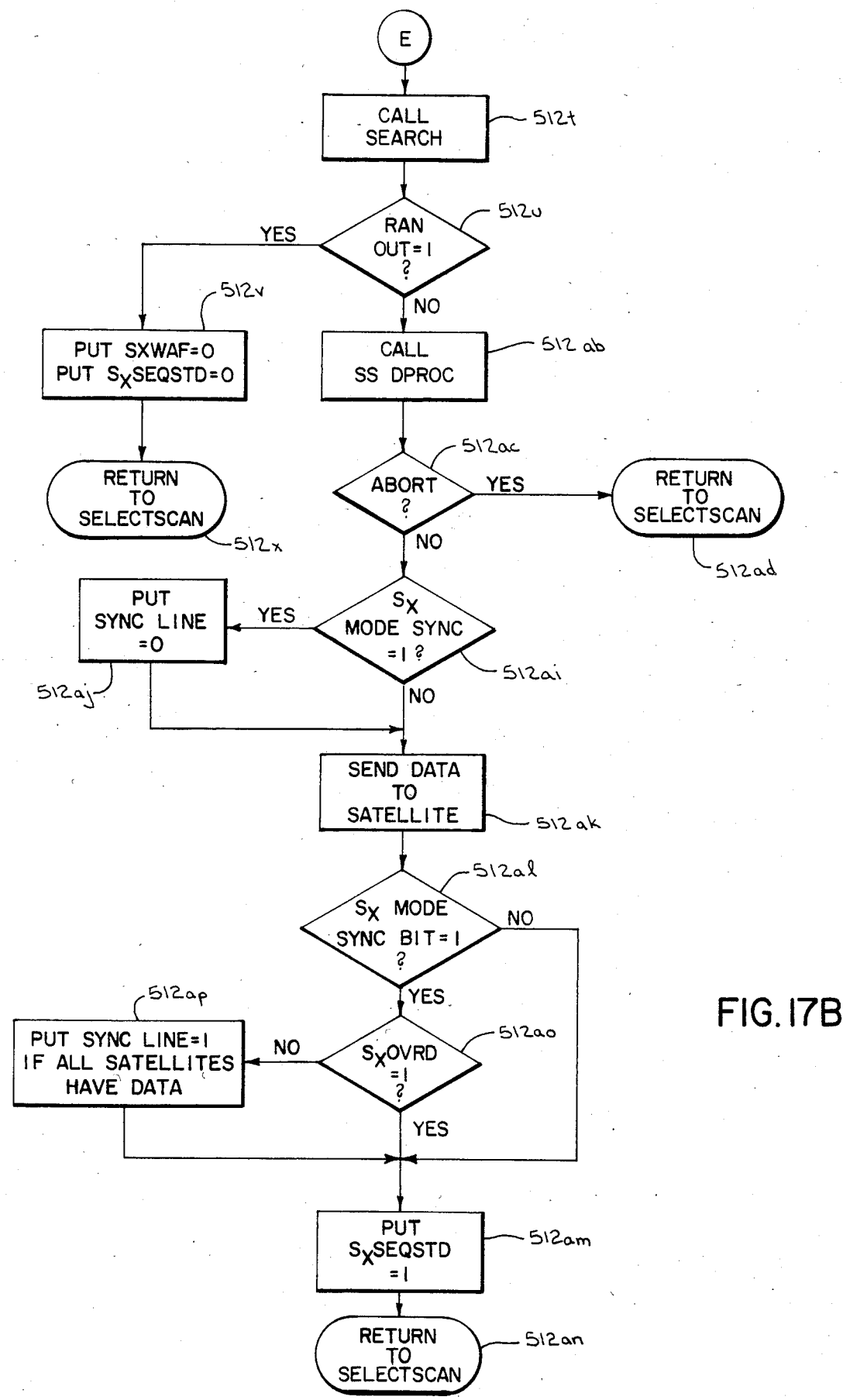

FIGS. 17a and 17b illustrate a flow chart representation of the single step data scan program (SSDASCAN) which is executed by the microprocessor 148 during the SELECT SCAN routine of FIG. 16. Turning now to FIG. 17a, execution of the SSDASCAN is begun (Step 512a) in response to a call made during execution of Step 511j of the SELECT SCAN routine (FIG. 16). Following execution of Step 512a, the microprocessor 148 checks the $S_x$WAF bit (Step 512b). Should the satellite work area not be full, as occurs when the move data block has not yet been transferred, then the $S_x$WAF bit is at a logic "0" level. As a consequence of the $S_x$WAF bit being at logic "0", then the microprocessor 148 returns (Step 512e) to the SELECT SCAN program of FIG. 16. Otherwise, with the satellite work area full and the $S_x$WAF bit set to a logic "1", the microprocessor 148 then determines whether an override has been commanded by examining the SX OVRD bit. When the SX OVRD bit is set equal to a logic "1" (indicating that an override has been commanded), program execution branches to step 512s.

If however, the override bit SX OVRD was found to be at a logic "0" level when examined during Step 512e, then the microprocessor 148 proceeds to Step 512f to check whether the move sequence has started by examining the move sequence started bit (SXSEQSTD) to see whether the bit is at a logic "1" level. When the SXSEQSTD bit is at a logic "1" level, the microprocessor 148 proceeds to Step 512g during the execution of which the microprocessor examines the SX MODE SYNC bit to determine whether the stepping motor controlled by the satellite output module $S_x$ is to execute a move profile in synchronization with a move profile commanded by one or both of the other satellite modules. Upon determination that the SX MODE SYNC bit is a logic "1", the microprocessor 148 then tests a bit, known as the SYNC START bit to determine if the next synchronized move is ready to be sent to all axes when the SSDASCAN routine is entered for each axis. (Step 512h) A determination that the SYNC START bit is a logic "1" cause program execution to branch to step 512p. Otherwise, the microprocessor 148 returns (Step 512i) to the SELECT SCAN routine during which the SSDASCAN routine was called.

When the SX MODE SYNC Bit is found to be at a logic "0" level during execution of the Step 512g, then the microprocessor 148 proceeds to Step 512j rather than Step 512h as described previously. During execution of Step 512j the microprocessor checks memory location $S_x$MVNSENT containing the number of the move of the move data block last sent to determine whether or not it has been completed. If the last move has not been completed then the microprocessor 148 returns (Step 512) to the SELECT SCAN routine.

If the move last sent is done, then the microprocessor 148 proceeds to Step 512n to check whether the bit SXDOASTART is a logic "1" which would cause the microprocessor 148 to command an immediate start of the next move. The presence of a logic "1" SXDOASTART bit causes the microprocessor 148 to branch to Step 512o during which the microprocessor 148 puts the address of the next move data (SXMVSENT+1) to the address location SRCHMVN referencing the address of the next move data block to be processed buy the microprocessor 148. Otherwise if the bit SXDOASTART is a logic "0" then program execution returns (Step 512n.1) to the SELECT SCAN routine.

Following execution of Step 512f, when the bit SXSEQSTD is found to be at a logic "0" level, indicating that the move sequence has not yet started or following the execution of Step 512h if the SYNC START bit is a logic "1", the microprocessor 148 proceeds to Step 512p. During the execution of Step 512p, the microprocessor 148 checks the status of the bit SXDOASTART bit which, when set, designates that a move sequence is to be started immediately. When the SXDOASTART bit is found to be set during execution of Step 512p, the microprocessor 148 proceeds to Step 512s during which the microprocessor 148 puts the SRCHMVN register to a logic "1" to designate the first move is to be searched for.

The presence of a logic "0" SXDOASTART bit causes the microprocessor 148 to branch to Step 512r rather than to Step 512s as described previously. During the execution of Step 512r, the microprocessor 148 checks to see whether the synchronization start bit (SYNC START) is set, as is the case when the start of the move profile executed by each of the stepping motors is to be synchronized. If the SYNC START bit is not set, then, the microprocessor 148 returns (Step 512l.1) to the SELECT SCAN routine. Should the SYNC START bit be set, then the microprocessor 148 proceeds to Step 512s.

After the microprocessor 148 has completed execution of Step 512o, or following the execution of Step 512s, the microprocessor 148 then follows branch E to proceed to Step 512t (FIG. 13b) to search for the next move to be processed. Following execution of Step 512t, the microprocessor 148 checks whether the moves of move data block 64 have been exhausted by checking (Step 512u) to see whether the memory bit RAN OUT is set as will occur when the last move set data word is processed. A logic "1" level RAN OUT bit causes microprocessor 148 to put the SXWAF bit="0" and put the SXSEQSTD bit="0" before returning (Step 512x) to the SELECT SCAN routine.

Should the RAN OUT Bit be found at a logic "0" level, when examined during Step 512u, then the microprocessor 148 proceeds to Step 512ab during which the microprocessor 148 executes a subroutine referred to as a single step data process routine (SSDAPROCESS) to process thge move data block to yield the satellite move set data block supplied to the satellite output module $S_x$. The microprocessor 148 then checks whether it is necessary to abort the move (Step 512ac) because of data errors. If the move should be aborted, then the microprocessor 148 returns (Step 512ad) to the SELECT SCAN subroutine during which the SSDASCAN routine was called. Otherwise, if the move is not to be aborted, then the microprocessor 148 proceeds to Step 512ai rather than to Step 512ad, as previously described. During Step 512ai, the microprocessor 148 examines the SX MODE SYNC bit to determine whether the move profile for the then active satellite output module $S_x$ should be synchronized to the move profile of either of the other satellite modules controlled by the master controller module 28. The presence of a logic "1" level SX MODE SYNC bit causes the microprocessor 148 to branch to Step 512aj and put a logic "1" level on the synchronization (SYNC) line (not shown) of the secondary bus 68 of FIG. 2 to alert each of the other satellite output modules that synchronization with the then active satellite module $S_x$ is required. If the SX MODE SYNC bit is set to a logic "0", then, following step 512ai, the satellite move set data block is transmitted to the satellite output module 30 (step 512ak). Thereafter, the SX MODE SYNC bit is examined (step 512al). Should the bit be at a logic "0", indicating that the move is not to be synchronized, then program execution branches to step 512am and the SXSEQSTD bit is set to a logic "1" before returning (step 512an) to the SELECT SCAN routine. Otherwise, when the SX MODE SYNC bit is found set to a logic "1", then the microprocessor 148 proceeds to test the status of the SXOVRD bit (step 512ao). When the SXOVRD bit is found to be at a logic "1", program execution branches to step 512am. Otherwise, program execution branches to step 512ap and the SYNC line is put to a logic "1" if all satellites have data. Following step 512ap, program execution branches to step 512am.

SSDAPROCESS

Figure 18A:
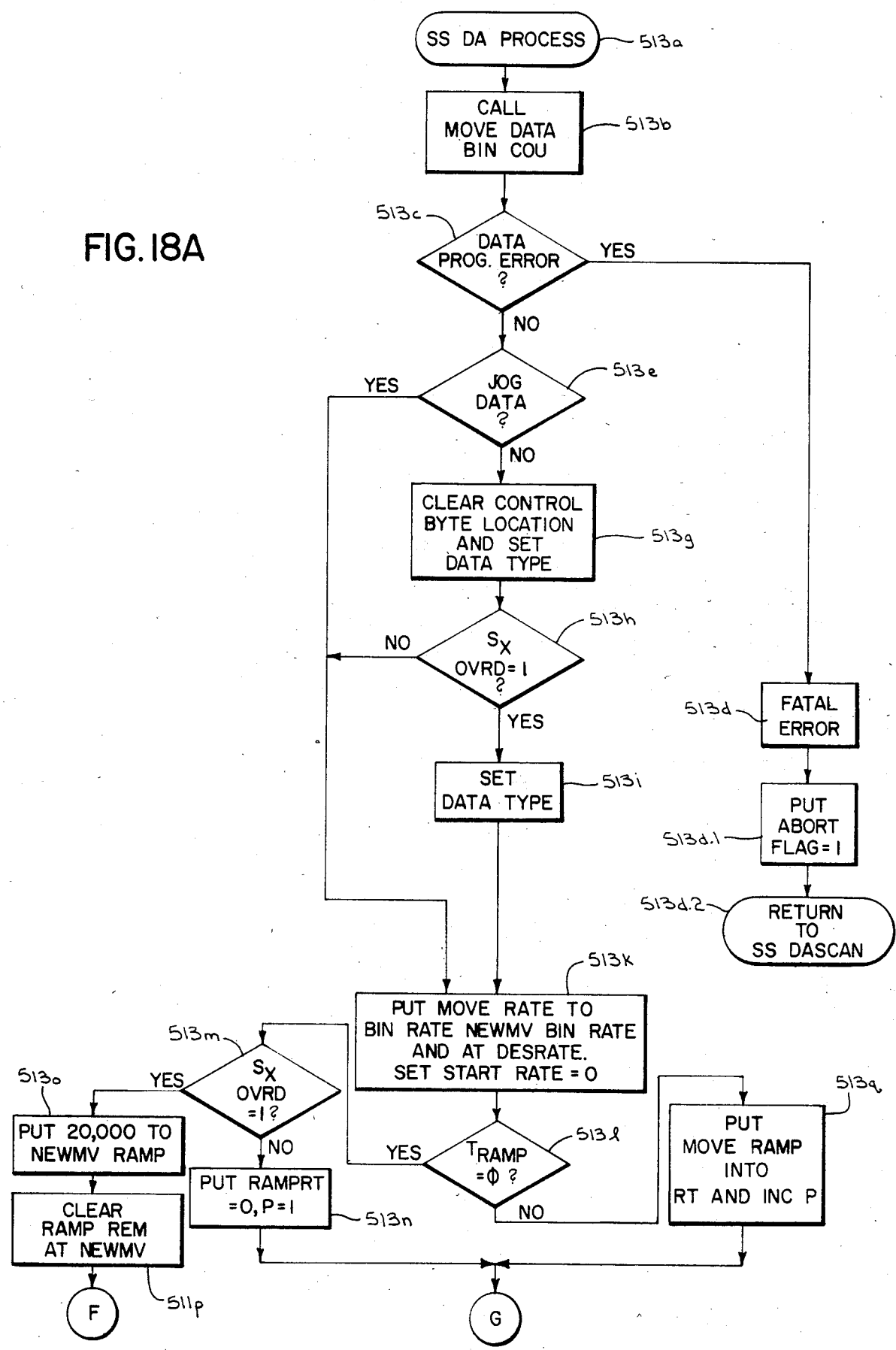
FIGS. 18a, 18b and 18c together comprise a flow chart representation of the SSDAPROCESS which is executed during the SSDASCAN to process the single mode stepping motor move profile data and calculate the stepping motor acceleration value and the stepping motor deceleration value in accordance with the stepping motor acceleration duration and deceleration duration, respectively.

As illustrated in FIGS. 18a, b and c, there is shown a flow chart representative of the single step data process (SSDAPROCESS) which is called during execution of the SSDASCAN routine previously described with respect to FIGS. 17a and 17b to process the moves of each move data block to yield the satellite move data block. It is during the SSDAPROCESS routine that the microprocessor 148 converts the user programmed acceleration and deceleration duration of each move to yield a corresponding acceleration and deceleration value so that a satellite output module, such as satellite output module 30 of FIGS. 1, 2 and 10, accelerates the stepping motor 13 to the steady state rate and decelerates the stepping motor from the steady state rate to a zero rate to reach the final position. To better understand the program steps of the SSDAPROCESS subroutine, a brief explanation of the underlying alogrithm implemented during execution of the SSDAPROCESS routine will be provided below.

Turning now to FIG. 19 there is shown a graphical representation of the output pulse rate versus time for a simple single step mode move profile. As shown in that figure, a single step mode move profile is begun by ramp up to a steady state rate ($R_{ss}$) and is ended by a deceleration to a zero rate. The final position is determined by the number of pulses that are supplied to the stepping motor during the move interval. Both the stepping motor ramp up to the steady state rate and the stepping motor deceleration from the steady state rate to a zero rate are accomplished by periodically increasing and decreasing, respectively, the pulse rate supplied to the stepping motor. In actuality, both the ramp up and the deceleration actually appear as a series of discreet steps rather than a continuous linear path as illustrated. During a ramp up, the change of pulse rate per interval is uniformly incremented each interval until the desired steady state rate is achieved. Conversely, during the deceleration interval, the change or pulse rate per interval is uniformly decremented until a 0 Hz rate is achieved. While the exact time at which the steady state rate is achieved during a ramp up is not crucial, the stepping motor must reach a 0 Hz rate at the desired final position in order to assure stepping motor positioning accuracy. Thus, the number of pulses supplied to the stepping motor during the deceleration interval is critical.

Referring now to FIG. 19, the number of pulses during the deceleration time interval (DECEL TIME) is given by $$\text{Number of DECEL pulses} = \frac{(\text{Rate})(\text{DECEL TIME})}{2} \quad (1)$$

Equation (1) is a perfectly linear integral. However, the satellite module 30 of FIG. 10 employs a digital counter in the form of counter 410 which generates the pulses supplied to the stepping motor translator 13a of FIG. 1 to excite the stepping motor 13. The number of deceleration intervals during which pulses are supplied to the stepping motor during a deceleration is given by:

$$\text{Number of DECEL intervals} = \frac{\text{DECEL TIME/INTERVAL PERIOD}}{} \quad (2)$$

The discreet change in the number of pulses per periodic interval gives rise to fractional pulses which must be executed at the end of the deceleration interval near zero rate which likely causes stepping motor positioning error. To overcome this problem, the following "perfect deceleration" algorithm is employed to determine the number of pulses to be output during each interval so that the stepping motor decelerates to achieve a final rate of 0 Hz at the final position. In practice, the counter 410 of the satellite output module 30 of FIG. 10 is reloaded every 10 milliseconds in order to produce the output pulse rate supplied to the stepping motor translator. Thus, the number of deceleration increments is given by:

$$\text{Number of deceleration increments} = \frac{\text{DECEL TIME}}{10 \text{ milliseconds}} \quad (3)$$

In order to decelerate from the stepping motor steady state (SSR) rate to 0 Hz, the change per increment must be:

$$\frac{\Delta Hz}{INC} = \text{RATE CHANGE/INCREMENT} = \frac{(SSR)}{\# INCS} \quad (4)$$

To achieve accurate stepping motor positioning, the total number of integer pulses to output during each increment and remainders must be calculated each increment so that fractional pulses can be accounted for over the entire deceleration. Referring now to FIG. 19, assuming a deceleration time interval of 50 milliseconds, thereby yielding 5 deceleration increments (#INCS=5) hereinafter identified as A, B, C, D, and E, the number of pulses during the decelerational interval A plus $A_1$ is given by:

$$A'' = (SSR)(TB) \quad (5)$$

where SSR is a steady state rate and TB is the time base which is typically 10 milliseconds. Likewise, the number of pulses in the interval $B+B_1$ is given by:

$$B'' = [SSR - ((1)SSR/\#increments)]TB \quad (6)$$

The number of pulses in the interval $C+C_1$ is given by:

$$C'' = [SSR - ((2)SSR/\#incs)]TB \quad (7)$$

The number of pulses in the interval $D+D_1$ is given by:

$$D'' = [SSR - ((3)SSR/\#incs)]TB \quad (8)$$

The number of pulses in the interval $E+E_1$ is given by:

$$E'' = [SSE - ((4)SSR/\#incs)]TB \quad (9)$$

By manipulating each of Equations (5) (6) (7) (8) and (9), the number of pulses in each of the intervals A, B, C, D, and E can be given as follows:

$$A = \tfrac{1}{2}(TB)SSR[2-(1/\#INCS)] \quad (10)$$

$$B = \tfrac{1}{2}(TB)SSR[2-(3/\#INCS)] \quad (11)$$

$$C = \tfrac{1}{2}(TB)SSR[2-(5/\#INCS)] \quad (12)$$

$$D = \tfrac{1}{2}(TB)SSR[2-(7/\#INCS)] \quad (13)$$

$$E = \tfrac{1}{2}(TB)SSR[2-(9/\#INCS)] \quad (14)$$

The number of pulses in the $i_{th}$ increment may be generally given by:

Number of pulses in the $i_{th}$ increment = (14)

$$\tfrac{1}{2} (TB) SSR [2 - (i_{th} \text{ ODD INTEGER})/\#INCS]$$

The actual equation utilized by the master controller module 28 and satellite output module 28 to calculate the number of pulses to be output is given by:

$$\text{No. of pulses output in } i_{th} \text{ interval} = \frac{(\# \text{ of pulses decel})(\#Incs - i)}{\left[(\#Incs)^2 - \sum_{n=0}^{n=(\#Incs-1)} n\right]} \quad (15)$$

Equation (15) does not account for the pulses in the $A_1$, $B_1$, ... etc. terms but has nevertheless been found satisfactory.

Equation 14 and 15 allow the number of pulses in each increment to be calculated without reference to the previously executed deceleration interval. If a fractional pulse remains, its value can be stored in a remainder register. When the accumulating remainder in the remainder register exceeds a specified value (described later) usually less than unity, then an additional pulse can be supplied to the stepping motor translator to account for the fraction remainder. To obtain the number of pulses for each subsequent interval, the rate change per increment ΔHz/INC derived from equation (2) is then subtracted from the present decel rate and is then loaded into, and output by the counter 410 of FIG. 10. When the remainder register overflows, then the present rate will be output until the end position for the increment is reached and the remainder pulse is output. In this way, a running total is kept of the number of pulses which must be outputted and is continually synchronized with the amount of real time which has elapsed.

Figure 18B:
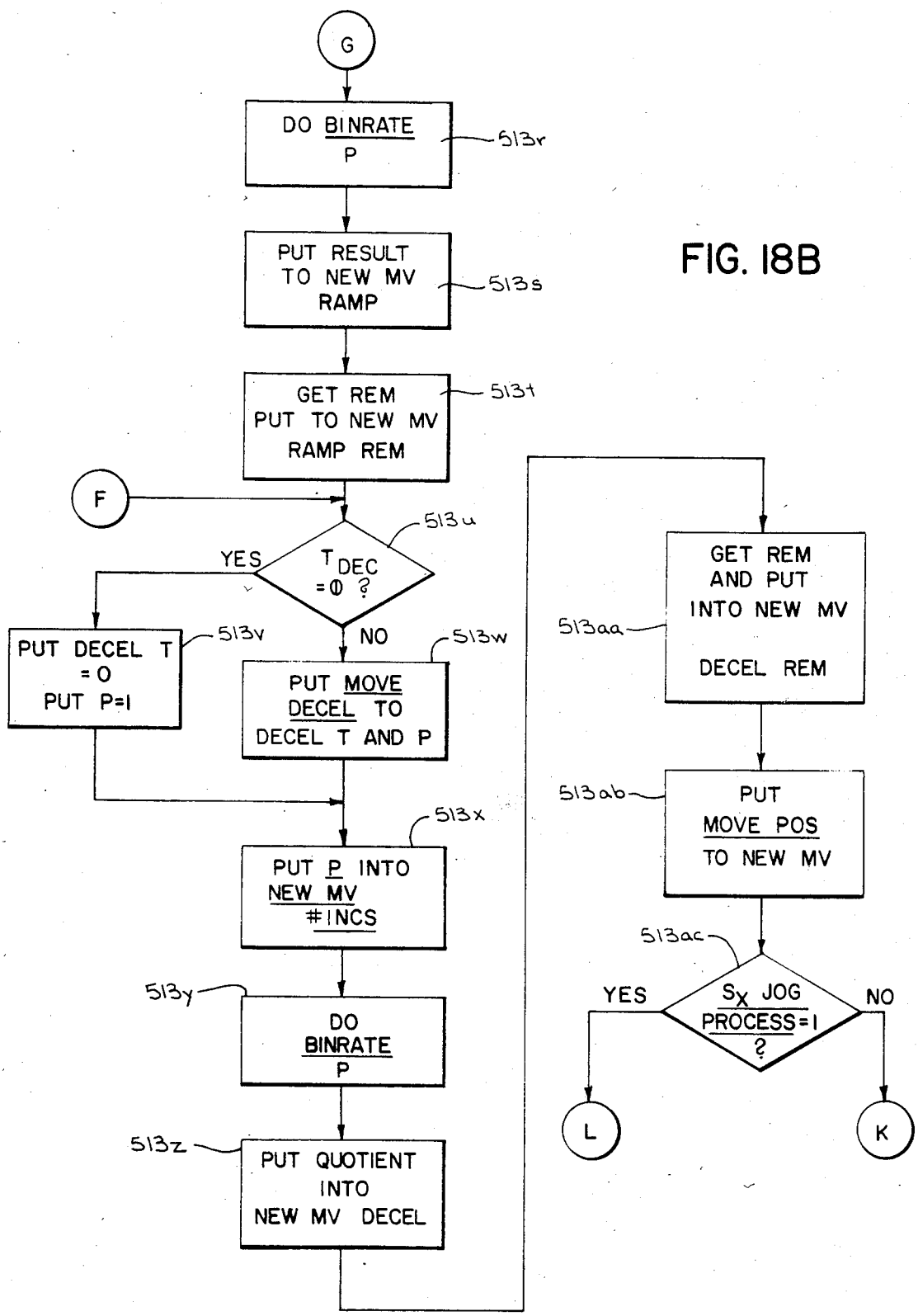
Figure 18C:
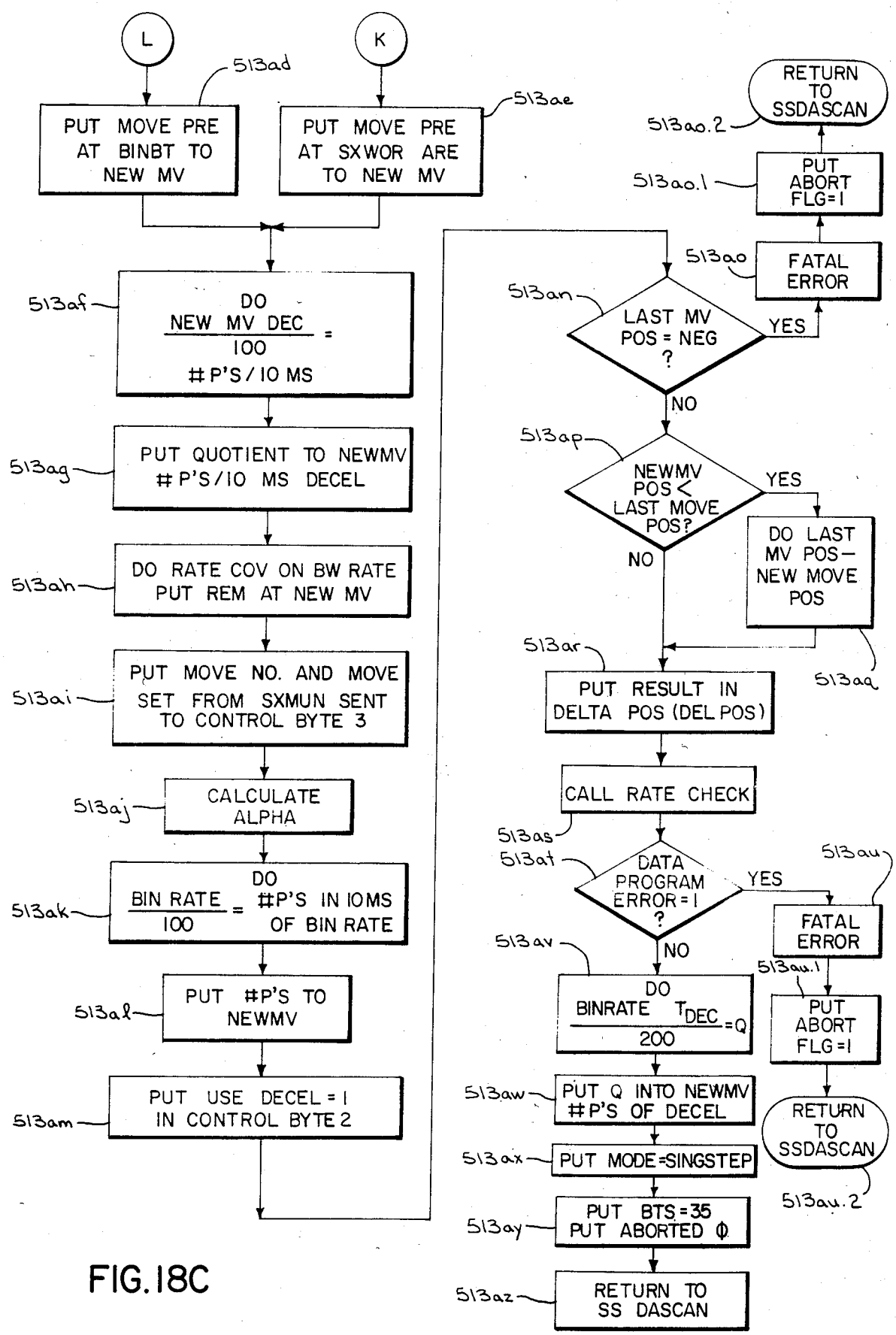

Having now provided a basic understanding of the perfect deceleration algorithm for which data is processed during the SSDAPROCESS subroutine, reference should now be had to FIGS. 18a–18c which illustrate in flow chart form, the particular steps of the SSDAPROCESS subroutine. Turning now to FIG. 18a, the SSDAPROCESS subroutine is begun (Step 513a) following a call for the routine made during the SSDASCAN routine. Following Step 513a, the microprocessor 148 then calls the move data binary conversion subroutine (MVDBIN) (not described) to convert the binary coded decimal data into binary values for later operation (Step 513b.) The microprocessor 148 then checks for a program error which would adversely affect control of the stepping motor (Step 513c). If a program error is detected during Step 513c, then the microprocessor 148 branches to Step 513d and alerts the user of a fatal error. Thereafter the ABORT flag is set (Step 513d.1) and then the microprocessor 148 returns (Step 513d.2) to the SSDASCAN routine.

Otherwise, when no fatal program error has been detected during the execution of Step 513c, the microprocessor 148 proceeds to Step 513e to check whether jog data is present. The presence of jog data causes the microprocessor to branch immediately to Step 513k.

If, however, the microprocessor determines that no jog data exists during Step 513e, then the microprocessor 148 proceeds to Step 513g rather than 513k as previously described. During execution of Step 513g, the microprocessor 148 clears the three control bytes in RAM 162 (WORDS 3–5 of FIG. 7b) as well as the mode word (WORD 4). Once the control byte locations are cleared, the first byte is set to reflect the data type for a single step mode move profile is represented by a "$4_{10}$". Thereafter, following execution of step 513g, the microprocessor 148 then proceeds to step 513h during which the microprocessor 148 examines the status of the SXOVRD bit to determine whether or not an override has been commanded. If an override has been commanded (SXOVRD is set to a logic "1"), then the microprocessor 148 proceeds to acknowledge the override command by setting an appropriate bit of the first control byte (Step 513i). Thereafter, the microprocessor proceeds to Step 513k as previously described.

During Step 513k the microprocessor 148 proceeds to put the steady state move rate to three separate memory locations hereinafter referenced as BINRATE, NEWMVBINRATE and DESRATE, which are all within the RAM 162 but are not illustrated in FIG. 7b. Also, a bit, designated as the start rate (START RATE) bit is set equal to a logic "0" to designate that the ramp is to start at a rate of zero Hz.

Following execution of Step 513k, the microprocessor 148 compares the ramp time specified by the current move of the move data block to the value zero (Step 513l). A zero ramp time value causes the microprocessor to proceed to Step 513m during which the microprocessor examines the SXOVRD bit. If the SXOVRD bit is not a logic "1", indicating that no override has been commanded, then a bit designated as the ramp time (RAMPT) is set equal to zero (Step 513n) to designate a zero ramp time. Also, the memory location in RAM 162 which stores the number of ramp 10 millisecond increments (P) is set equal to a binary "1". Thus, for a default zero ramp time value, the total number of ramp increments (which are typically each 10 milliseconds in duration) will be one.

Should, however, the SXOVRD bit be set to a logic "1" indicating an override condition, then the microprocessor 148 puts the value 20,000 (decimal) into the memory location storing the new move ramp rate (NEWMV RATE) (Step 513o). The value of 20,000 represents a maximum stepping motor rate of 20,000 Hz. Thereafter, the microprocessor 148 clears the memory location RAMP REM (WORDS 24–25 of RAM 162 of FIG. 7b), which stores the RAMP remainder value (Step 513p) before executing branch F which will be described hereinafter.

If, during execution of Step 513l, the microprocessor 148 determines the ramp time is not equal to zero then the microprocessor 148 proceeds to Step 513q and puts the contents of the memory location move ramp MOVERAMP, which stores the ramp time into the memory location RAMPT. Also, the microprocessor 148 puts the contents at the memory location MOVERAMP into the contents of the memory location where the quantity P, the number of ramp 10 millisecond increments is stored. The contents of the memory location P are then incremented since, during execution of the program embodied in the satellite firm ware (PROM 340 of FIG. 10), the value P is in essence decremented by 1. Following execution of Step 513q or following execution of Step 513n, the microprocessor 148 branches via branch G to Step 513r (FIG. 18b).

Turning now to FIG. 18b, during the execution of Step 513r, the microprocessor 148 divides the contents of the memory location BINRATE which stores the binary value of the rate by the contents of the memory location P which holds a value equal to the number of ramp 10 millisecond increments. The result or quotient, which represents the value ΔHz/inc, is then put into a memory location designated NEWMV RAMP (WORDS 7 and 8 of RAM 162 of FIG. 7b) whose contents represent the new move ramp value (Step 513s). Thereafter, the remainder from the division (the ramp remainder) is stored as word 11 of RAM 162 of FIG. 7b (Step 513t).

Following the execution of Step 513t or branching from branch F following the execution of Step 513p, the microprocessor 148 then proceeds to Step 513u and compares the deceleration interval $T_{DEC}$ of the move to the value zero. A zero value $T_{DEC}$ causes the microprocessor to branch to Step 513v during which the microprocessor 148 puts the value zero in the memory location DECELT which stores the deceleration time. Also, the microprocessor 148 puts the value 1 in the memory location P storing the number of deceleration increments. Otherwise, when the deceleration time value $T_{DEC}$ of the move is non zero, the microprocessor 148 proceeds to Step 513w instead of Step 513v and puts the binary value of the move deceleration time into the memory location DECELT which stores the deceleration time and to the memory location P storing the number of increments.

Following execution of either Step 513v or Step 513w, the value at the memory location P, representing the number of new move increments is then loaded into a memory location, designated as NEWMOV #INCREMENTS (WORDS 32-33 of RAM 162 of FIG. 7b) which stores the number of new move increments (Step 513x). Thereafter, the microprocessor performs a division, dividing the binary rate value previously calculated during the MVDATBIN routine (Step 513b) by the contents of the memory location P which stores the number of increments (Step 513y). Next, the microprocessor 148 puts the result or quotient into the memory location, NEWMOVDECEL (WORDS 12-13 of RAM 162 of FIG. 7b) (Step 513z).

Following Step 513z, the microprocessor 148 gets the remainder from the previous division and puts the value in the memory location NEWMOVE DECEL REM where the remainder values are accummulated (words 24-25 of RAM 162 of FIG. 7b) (Step 513aa). Thereafter, the user specified final move posiion is stored in RAM 162 at words 17-19 (FIG. 7b). (Step 513ab) As may now be appreciated, the portion of RAM 162 illustrated in FIG. 7b stores a new satellite move set block and thus is referred to as the NEW MOVE memory area. Next, the microprocessor examines the status of the satellite output module jog process bit (SX JOG-PROCESS) to verify whether jog data is presently being processed. The presence of a logic "1" level SX JOGPROCESS bit indicates that a jog is in process and causes the microprocessor 148 to follow branch L to Step 513ac of FIG. 18c, during which the microprocessor 148 puts the latest block transfer preset data stored at the memory location BINLBT to the memory location in RAM 162 (WORDS 21-23 of FIG. 7b). Otherwise, when the SX JOGPROCESS bit is at a logic "0" level indicating that a jog is not in process, the microprocessor 148 follows branch K to Step 513ad to move preset data stored in the work area memory location to the memory location NEW MOVE storing the NEW MOVE data.

Referring to FIG. 18c, following execution of Step 513ac or following execution of Step 513ad, depending on the status of the SX JOGPROCESS bit, the microprocessor 148 performs a division, dividing the deceleration time stored at the memory location NEWMVDE-CEL (WORDS 12-13 of RAM 162 of FIG. 7b) by 100 to yield the number of ramp 10 millisecond increments per 10 milliseconds which is the number of increments (Step 513af). Thereafter, the quotient that results from the division performed in Step 513af, is stored in as word 20 in RAM 162 of FIG. 7b as the number of pulses in the last 10 ms of decel (Step 513ag). Following Step 513ag, the subroutine RATCONV is called (Step 513ah) to convert the data in memory location BIN-RATE to a form usable by the counter 410 of FIG. 10. The resulting value is then stored as words 26 and 27 of RAM 162 of FIG. 7b.

Next, the move number and the address of the move number stored at the memory location $S_x$ MVNSENT, is put (Step 513ai) into the third control byte (word 5) in the RAM 162.

Thereafter, the microprocessor 148 executes Step 513aj and calculates the value $\alpha$ in accordance with the formula $$\alpha = (\#incs)^2 - \sum_{i=0}^{\#incs-1} i$$

to enable the number of pulses in the increment to be easily calculated by the satellite output module 30 in accordance with equation (15).

Thereafter, the microprocessor 148 proceeds to Step 513ak and performs a division, dividing the binary value of the move rate stored at the memory location BIN-RATE (words 9-10 of RAM 162 of FIG. 7b), by 100 to yield the number of pulses in a 10 millisecond interval at Steady State Rate. The results from the previous division is then put into word 20 in RAM 162 of FIG. 7b, (Step 513al).

Next, the use deceleration bit (USEDECEL) of the second of the control bytes (word 4 in RAM 162 of FIG. 7b) is set to a logic "1" (Step 513am) to tell the satellite output module 30 to perform a deceleration during this move. Thereafter, the last move position is examined to see whether it is positive or negative (Step 513an). A negative value for the last position is indicative of a fatal error causing program execution to branch to Step 513ao during which the microprocessor 148 alerts the user that a fatal error has occurred. The ABORT flag is then set (Step 512ao.1) before returning (Step 513ao.2) to the SSDASCAN routine.

Otherwise, when the last move position is positive, as is usually the case, the program execution branches to Step 513ap during which the position value (word 17-19 in RAM 162 of FIG. 7b) is compared to the position of the last move. When the position is less than the last move position, the last move position is subtracted frm the new move position (Step 513aa) to yield a quantity DELPOS and program execution branches to Step 513ar during which the microprocessor stores the results of the subtraction performed during Step 513aq in a memory location in RAM 162 (not shown in FIG. 7b) so that the number of pulses (DELPOS) for a total move will now be present in that memory location. If the new move position is greater than the last move position, then the microprocessor proceeds directly from Step 513ap to Step 513ar and stores the new move position in a memory location in RAM 162.

Next, the microprocessor checks to see whether the user program move is permissible by checking that enough pulses are present in the programmed move to allow for a ramp up, a deceleration down to a zero Hz rate and at least a 20 millisecond interval at which the stepping motor moves at the steady state rate which constitutes a minimum permissible move (Step 513as). The rate check is performed by performing the following calculation:

DELPOS $\geq \frac{1}{2}$ desrate (rampt + decelt) + $\frac{1}{2}$ (rampt)

(start rate) + desrate (20 ms)

where
  desrate is the value of the steady state rate stored at the memory location DESRATE, rampt is the value of the ramp/time stored at the memory location RAMPT, decelt is the memory location DECELT start rate is the start or initial rate. The initial rate for a move in the single step or independent move is zero by definition.

If the programmed number move has too few pulses, then the microprocessor sets the data program error bit (DATAPROGE) equal to a logic "1" condition to indicate an error. The data program error bit is then examined (Step 513at) following execution of Step 513as. A logic "1" level data program error (DATAPROGE) bit causes program execution to branch to Ste 513au and accordingly, the microprocessor 148 alerts the user of a fatal error. Thereafter, the ABORT flag is set (Step 513au.1) before returning to the SSDASCAN routine (Step 513au.2).

Otherwise, when the DATAPROGE bit is at a logic "0" level, program execution branches to Step 513av. During execution of Step 513av the microprocessor first performs a multiplication, multiplying the binary rate value stored at the memory location BINRATE by the deceleration time $T_{DEC}$. The product is then divided by $200_{10}$ to yield a value Q which represents the number of deceleration pulses during the user program deceleration time interval. following Step 511av, the value Q is then stored at word 14–16 in RAM 162 (FIG. 7b) (Step 513aw). Next, the first bit of the mode word (word 6 of RAM 162 of FIG. 7b) is set to indicate that a single step mode move profile will be accomplished. (Step 513ax). Following Step 513ax, the value 35 (decimal) is put into a memory location BTS (Bytes To Send) to indicate that the satellite move set data block contains 35 data bytes (33 data+2 sum bytes). The absolute address for each of bytes 1–33 of the satellite move set data block for each of the satellite output modules $S_1$, $S_2$ and $S_3$ are not stored. Since the bytes of each satellite move set data block for each of satellite output modules $S_1$, $S_2$ and $S_3$, are found in their own memory blocks, an address pointer need only be adjusted to point to the first byte in RAM 162 associated with any satellite move set data block for the associated satellite output module. Once set, the pointer is then incremented the appropriate number of times to point at the desired data byte.

Still referring to FIG. 18c, following execution of Step 513ay the microprocessor 148 returns (Step 513az) to the SSDASCAN routine since all of the necessary calculations to achieve a single mode move profile has been performed.

SYSERRUPTD

Figure 20:
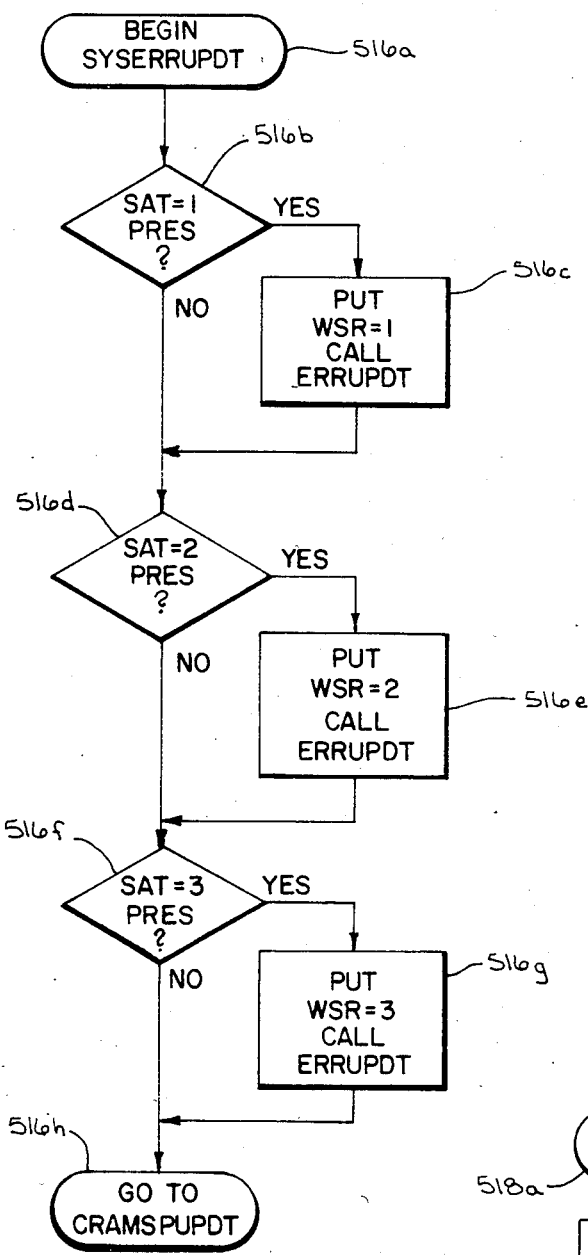
FIG. 20 is a flow chart representation of the SYSERRUPDT routine which is executed to initiate an update of the master controller module to reflect the most recent communication between the master controller module and a satellite output module such as the satellite output module of FIGS. 1, 2 and 10.

Turning now to FIG. 20, there is shown a block diagram of the system error update subroutine (SYSERRUPTD). Execution of the SYSERRUPTD is begun (Step 516a) and thereafter, the microprocessor 148 detects whether the first satellite output module $S_1$ is present (Step 516b). If the satellite output module $S_1$ is present, the value "1" in binary is written into the WSR memory location of RAM 162 that the satellite output module $S_1$ is present. (Step 516c). Also, during this step, the error update (ERRUPDT) routine is called. A further description of the ERRUPDT routine will be provided with respect to FIG. 20. Following the execution of Step 516c or following the execution of Step 516b if the satellite output module $S_1$ is not present, the microprocessor 148 detects whether the satellite output module $S_2$ is present (Step 516d). When the satellite output module $S_2$ is found to be present, the microprocessor 148 proceeds to Step 516e and writes the binary equivalent to a decimal 2 into the WSR memory location of RAM 162 and then calls the error update (ERRUPDT) routine.

Following the execution of Step 516e or the execution of Step 511d of the satellite output module $S_2$ is not present, program execution branches to Step 516f during which the microprocessor 148 detects the presence of the satellite output module $S_3$. Upon finding the satellite output module $S_3$ to be present, the microprocessor 148 puts the binary equivalent of a decimal 3 into the WSR and then calls the ERRUPDT routine. When execution of Step 516g is completed, or if following the execution of Step 516f the satellite output module $S_3$ is not present, the microprocessor 148 branches to the CRAMSPUPDT routine of FIG. 22 (Step 516h).

ERRUPDT

Figure 21:
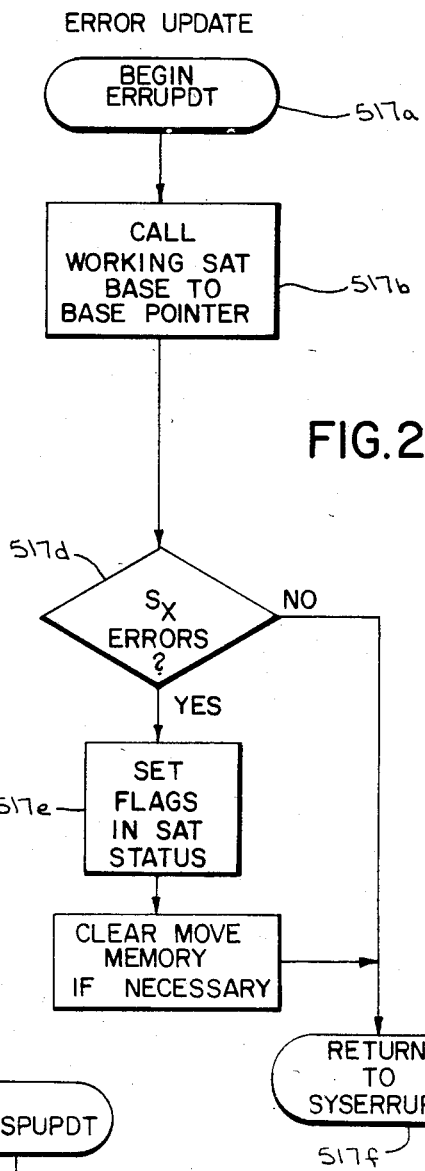
FIG. 21 is a flow chart representation of the ERRUPDT routine which is executed during the SYSERRUPDT routine of FIG. 20 to ascertain whether any satellite errors have occurred.

Turning now to FIG. 21, there is shown a flow chart representation of the ERRUPDT routine. The ERRUPDT routine is begun (Step 517a) in response to a call made (one of Steps 516c, 516e or 516g of FIG. 19) during the SYSERRUPDT. Thereafter, the microprocessor 148 gets the base address of the satellite output module $S_x$ (the value of x being set by the value in the WSR memory location) to enable the microprocessor 148 to access the locations in memory indicating the status of the various flags of the satellite output $S_x$ modules (Step 517b). The microprocessor 148 next checks for the occurrence of errors, such as a programming error or a communication error (517d). Upon detection of an error, the appropriate flag is set (Step 517e) and the memory locations storing the move is cleared if necessary (Step 517e.1) before the microprocessor 148 returns (Step 517f) to the SYSERRUPDT routine. Should no errors be detected during execution of Step 517d, then the microprocessor returns to the SYSERRUPDT routine (Step 517f) directly.

CRAMSPUPDT

Figure 22:
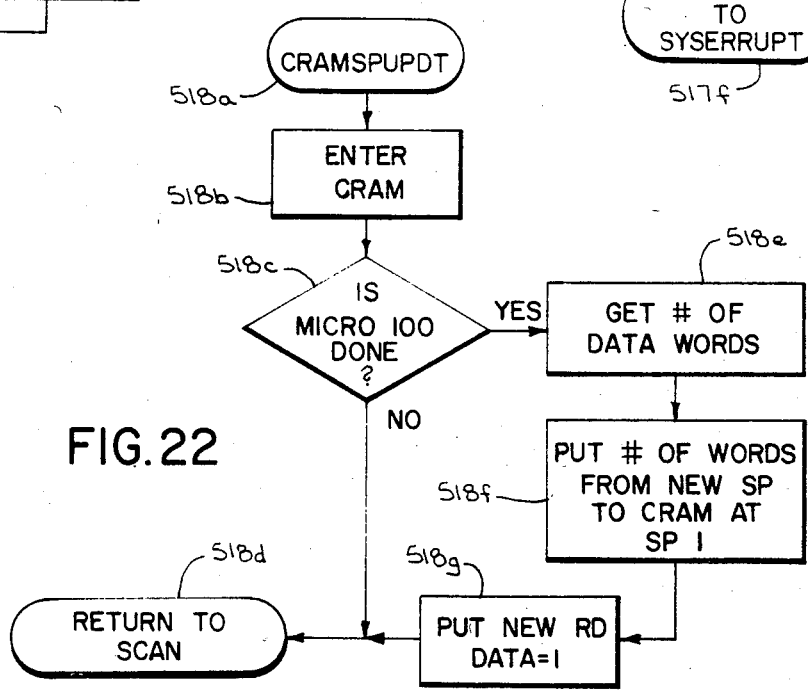
FIG. 22 is a flow chart representation of the CRAMSPUPDT routine which is executed to update the master controller module common random access memory with the most recent stepping motor status and position data.

FIG. 22 illustrates the common random access memory system update routine (CRAMSPUPDT) which represents Step 518 of the SCAN LOOP program of FIG. 12. Execution of the CRAMSPUPDT is begun (Step 518a) following the SYSERRUPDT routine of FIG. 20. Thereafter, the microprocessor 148 proceeds to enter the common random access memory 135 by requesting access with the CRAM AVAIL (cram available) line 182 of FIG. 7. Next, the microprocessor 148 determines whether the microprocessor 100 has completed reading data from the common random access memory (Step 518c). If the microprocessor 100 has not finished reading data from the common random access memory 135, then the microprocessor 148 returns (Step 518d) to the SCAN LOOP program of FIG. 12. Otherwise, upon finding that the microprocessor 100 is done reading the common random access memory 135, then the microprocessor 148 gets the number of data words (Step 518e) from the random access memory (RAM) 162. The status and position data words are typically stored in the portion of the RAM 162 which is graphically mapped in FIG. 7a. Next, the microprocessor 148 puts the number of data words from the RAM 162 to the common random access memory 135 at a memory location $SP_1$ which is set aside to hold the status and position information for transmission to the main processor 15 of FIGS. 1 and 2 (Step 518r). Following Step 518g, the microprocessor 148 puts the NEW READ DATA bit equal to "1" (Step 518g) to signify that new data has been written into the common random access memory 135 for the microprocessor 100 to take and send to the main processor 15 of FIG. 1. Thereafter, program execution returns (Step 518d) to the SCAN LOOP program of FIG. 12.

SATELLITE MODULE FIRMWARE

FIGS. 23-44b illustrate, in flow chart form, the programs embodied within the programmable read only memory (PROM) 340 of FIG. 10 which are executed by the microprocessor 330 of FIG. 10 to control the counter 410 of FIG. 10 to cause the counter to provide the output pulse train to the stepping motor translator 13a of FIG. 2.

SAT SCAN

Figures 23, 24:
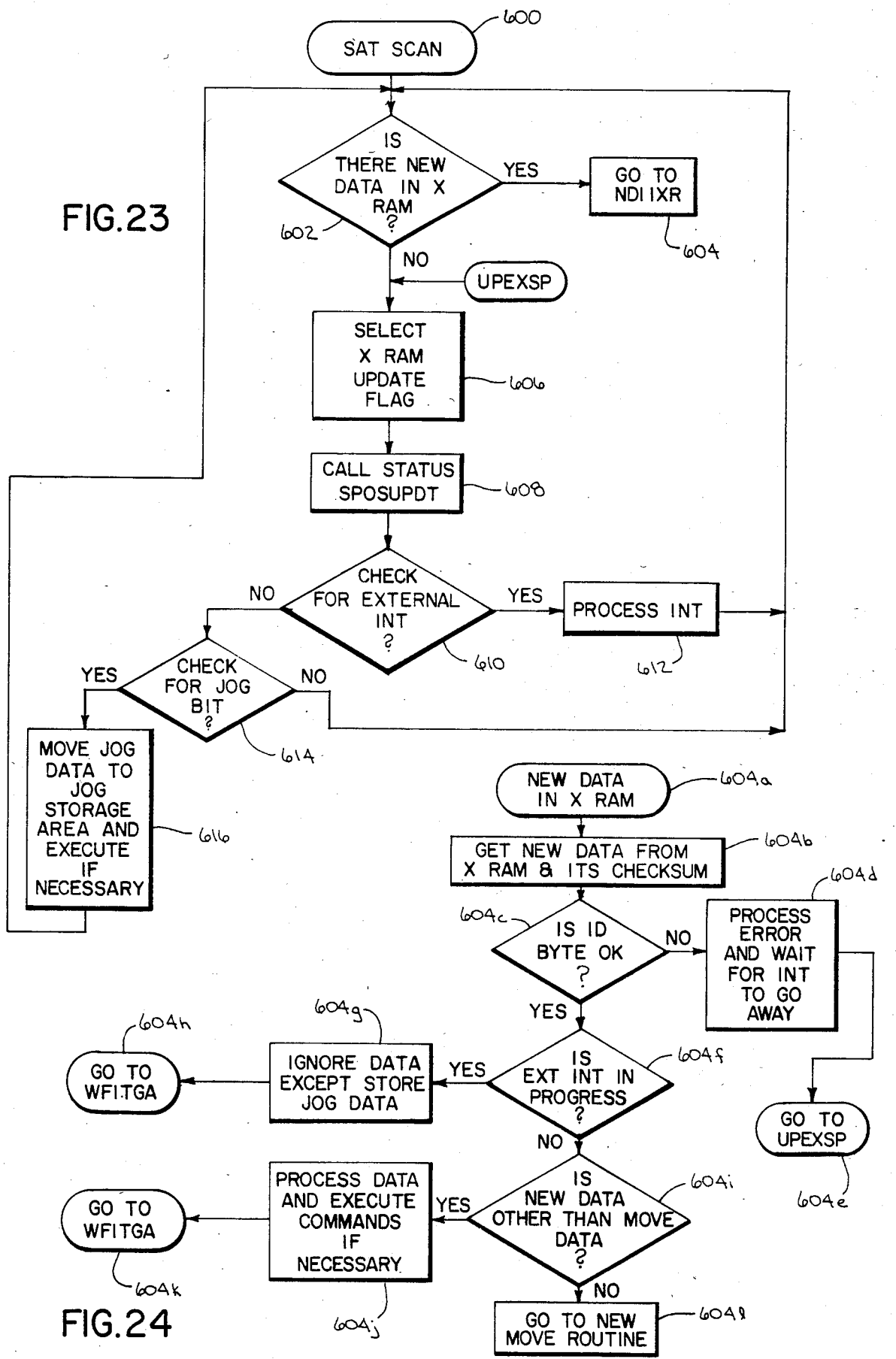
FIG. 23 is a flow chart representation of the SAT SCAN program which is continuously executed by the satellite output module of FIGS. 1, 2 and 10 to process the satellite move set data block supplied from the master controller module to control the stepping motor so that the stepping motor achieves a move profile in accordance with the stepping motor move profile parameters.
FIG. 24 is a flow chart representation of the NDIIXR subroutine which is executed during the SATELLITE SCAN program of FIG. 23 to read new satellite move set data block from the master controller module.

Turning now to FIG. 23, there is shown a flow chart representation of functional logic flow of the SAT SCAN PROGRAM which is continuously executed by the microprocessor 330 to control the operation of the satellite output module 30. In actually the SAT SCAN program typically includes one or more jumps to different subroutines and a corresponding return. Upon "power up" of the satellite output module 30, the microprocessor 330 executes a reset routine to reset its registers and flags (Step 600). Following execution of Step 600, the microprocessor 330 looks for new data in the random access memory 355 (Step 602). The random access memory 355 of FIG. 10 is referred to as the XRAM or external random memory as the random access memory 355 serves to store the data received from the master controller module 28 along the secondary bus 68 of FIG. 9 for transfer to the microprocessor 330. The presence of new data in the XRAM causes the microprocessor 330 to branch a subroutine new data in XRAM (NDIIXR) (Step 604) to process the data. The subroutine NDIIXR will be described in greater detail with respect to FIG. 23. Following execution of Step 604, or following execution of Step 602 if no new data has been entered in the XRAM, program execution branches to Step 606 during which the XRAM is selected or enabled. Also, the status position indicator is set to identify the address of the memory location in the XRAM holding the status position information and thereafter, a flag, referred to as the update flag, is set to designate that the status position is undergoing an update as will be described, later, Step 606 is branched to from the block UEXSP. Following execution of Step 606, the position update SPOSUPDT subroutine is called (Step 608) to update the status position by placing the most current status and position of the stepping motor 13 in the address location in the XRAM indicated by the status position indicator.

Next, the microprocessor 330 checks to determine whether an external interrupt has occurred (Step 610). If an external interrupt has occurred, as will be the case when a hard stop, a master stop or an I/O reset has been commanded, then the microprocessor 330 processes the interrupt (Step 612) by setting the appropriate internal flag within the microprocessor 330 to designate the nature of the interrupt and then the microprocessor 330 takes the appropriate stop, ramp or decel action on the present output if the output is active. This action is later referred to as an "error action". Following execution of Step 612, the microprocessor resumes execution of Step 602 and those following it.

If however, no external interrupt has occurred, then the microprocessor branches to Step 614 rather than to Step 612 as previously described. During execution of Step 614, the microprocessor 330 examines the JOG bit which is set when jog data has been received. The absence of a jog bit, that is to say the jog bit has been found not to be set, causes the microprocessor 330 to branch back to Step 602 and resume execution of the SAT SCAN program. If however the jog bit has been set to indicate that jog data has been received, the microprocessor proceeds to Step 616 first before proceeding to Step 602. During execution of Step 616, the microprocessor 330 processes the jog data, by first verifying the jog move is of the appropriate length and then proceeds to get the jog data and process the jog data as if the jog data were move data. A better understanding of how the move data (and jog data) is processed will be had upon further description of the satellite output module firmware. When execution of Step 616 is completed, program execution branches to the Step 602. Execution of the SAT SCAN program occurs continuously until the satellite module 30 of FIG. 10 is interrupted as occurs in response to an interrupt signal received from the master controller module 28 of FIGS. 1-2 and 7-9.

NDIIXR

Turning now to FIG. 24, there is shown a flow chart representation of the subroutine NDIIXR. Execution of the NDIIXR is begun (Step 604a) in response to a BRANCH made during execution of the SAT SCAN PROGRAM of FIG. 22. Still referring to FIG. 23, following execution of Step 604a, program execution branches to Step 604b during which the microprocessor 330 gets the data from the XRAM and examines the check sum byte associated with the data to verify its accuracy. The satellite identification byte associated with the new data is then examined (Step 604c) to determine whether the data has been sent to the correct satellite, and should the ID byte be incorrect, then an error bit is set (Step 604d) to designate an error, the "error action" is then commenced and then program execution is halted to wait for the next interrupt before returning (Step 604e) to the SAT SCAN PROGRAM of FIG. 23.

Upon detection of a correct identification byte, program execution branches to Step 604f during which the microprocessor 330 ascertains if an external interrupt is in progress. Should an external interrupt be in progress, then the microprocessor 330 ignores all data except jog data and the jog data is then stored (Step 604g) before returning to the SCAN LOOP program of FIG. 21 (Step 604h) via the WFITGA routine of FIG. 28.

The absence of an external interrupt causes the program execution to branch to Step 604i rather than Step 604g as previously described. During execution of Step 604i, the microprocessor examines the nature of the data previously obtained during Step 604b to verify whether the data is other than move data. The presence of data other than move data causes program execution to branch to Step 604j during which the data is processed and if necessary is executed (Step 604k) before returning (Step 604k) to the SAT SCAN program of FIG. 23 via the WFITGA routine of FIG. 28. Otherwise, when the data is move data, the microprocessor 330 calls a program routine NEWMOV to process the new move data (Step 604l).

NEWMOV

Figure 25:
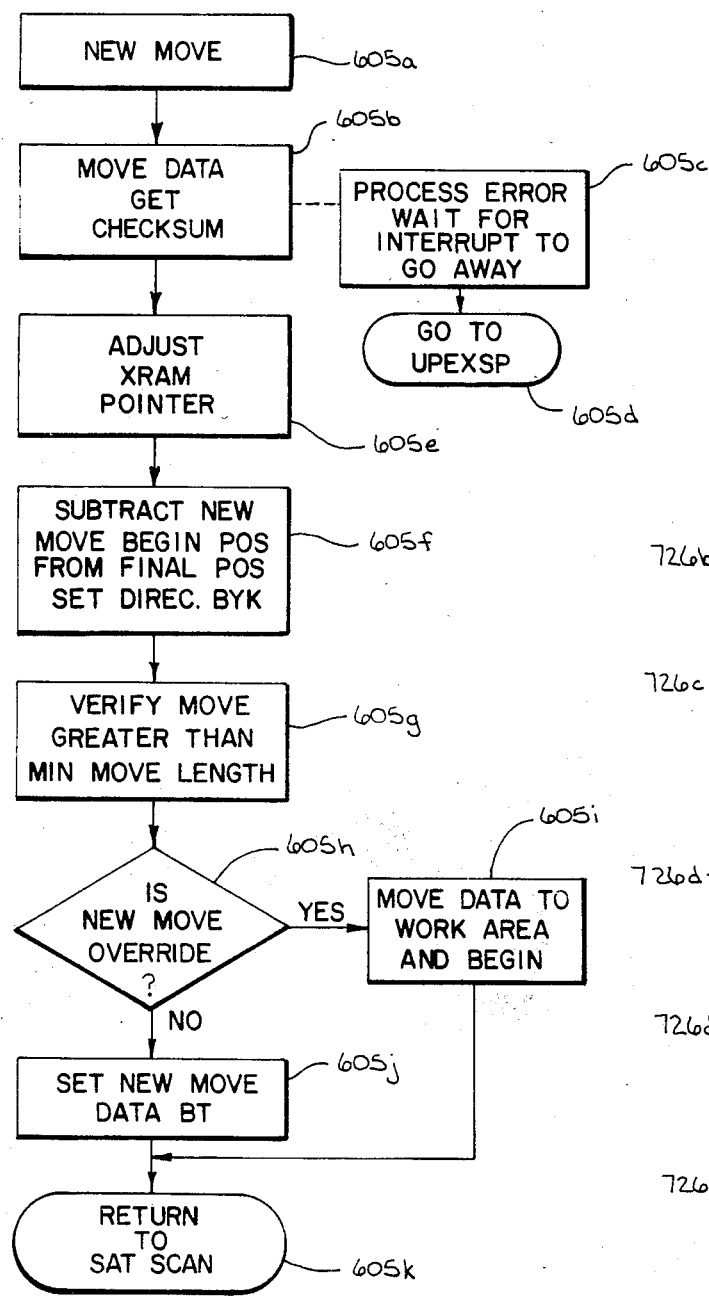
FIG. 25 is a flow chart representation of the NEW MOV routine which is executed during the SATELLITE SCAN program of FIG. 23 to initiate a new stepping motor move.

Turning now to FIG. 25, there is shown a flow chart representation of the NEWMOV routine. Execution of the NEWMOV routine is begun (Step 605a) in response to a branch made during execution of the NDIIXR routine of FIG. 24 and thereafter, program execution branches to Step 605b. During execution of Step 605b, the microprocessor 330 gets the data from the XRAM and does a check sum to verify that the data has been correctly received. Should the data not be correct, then a system error has occurred and accordingly, the microprocessor 330 first indicates a system error, (Step 605c) then processes the error by taking the "error action" and waits for the interrupt to go away before returning (Step 605d) to the SAT SCAN program of FIG. 23. Otherwise, when the check sum indicates the data is correct, then program execution branches to Step 605e. During the execution of Step 605e, the XRAM pointer is adjusted to indicate that the area is again available to receive data from the master controller module 28. Following execution of Step 605e, the microprocessor 330 then subtracts the new move beginning position from the new move final position and a direction bit is set at a logic "0" or a logic "1" depending on whether the result is positive or negative (signifying a forward or reverse direction move).

Next, the move length is verified to assure that the move is greater than the minimum permissible move length of 20 milliseconds (Step 605g). Thereafter, the new move is checked to determine whether the new move is an override or not (Step 605h). Should the new move be an override, then the new move data is moved from the move data table in microprocessor 330 internal memory to a work area in the microprocessor 330 memory and then the first point of "fast scan" (described below) is calculated before the first rate is calculated and converted into binary (Step 605i). The move is then executed before returning (Step 605j) to the SAT SCAN program of FIG. 23.

If the new move is not an override, then the new move data bit is set to indicate a new move and the move start delay bit is set equal to a logic "0" (Step 605k) before returning to the SAT SCAN program (Step 605j).

To understand the significance of the point of "fast scan" previously calculated during Step 605j with respect to the override data, reference should be had to FIG. 26 which is a graphical representation of the stepping motor rate versus position for a single step mode move profile. As described previously, the microprocessor 330 loads the counter 410 of FIG. 10 every 10 milliseconds to provide the output pulse rate for stepping motor translator 13a. To ensure that deceleration occurs at the appropriate interval so that the stepping motor can be decelerated to a 0 Hz final rate to reach the final position, the microprocessor 330 must know at least 10 milliseconds in advance of when the deceleration is to begin (point of deceleration) to assure that the stepping motor rate can be decremented at the proper interval. The point of "decel fast scan" is defined as the position of the stepping motor at a time interval 10 milliseconds prior to when deceleration is to begin. Thus, when the stepping motor reaches the point of "decel fast scan", the microprocessor knows that the next value to be loaded in counter 410 of FIG. 10 will be the value which initiates stepping motor deceleration. The point of "final position fast scan" is a point which is 10 milliseconds from the time when the stepping motor is to reach the final position. As will be better understood, once the point of final position fast scan is reached, the microprocessor 330 does nothing but continuously check if the final position was reached.

INT

Figure 27:
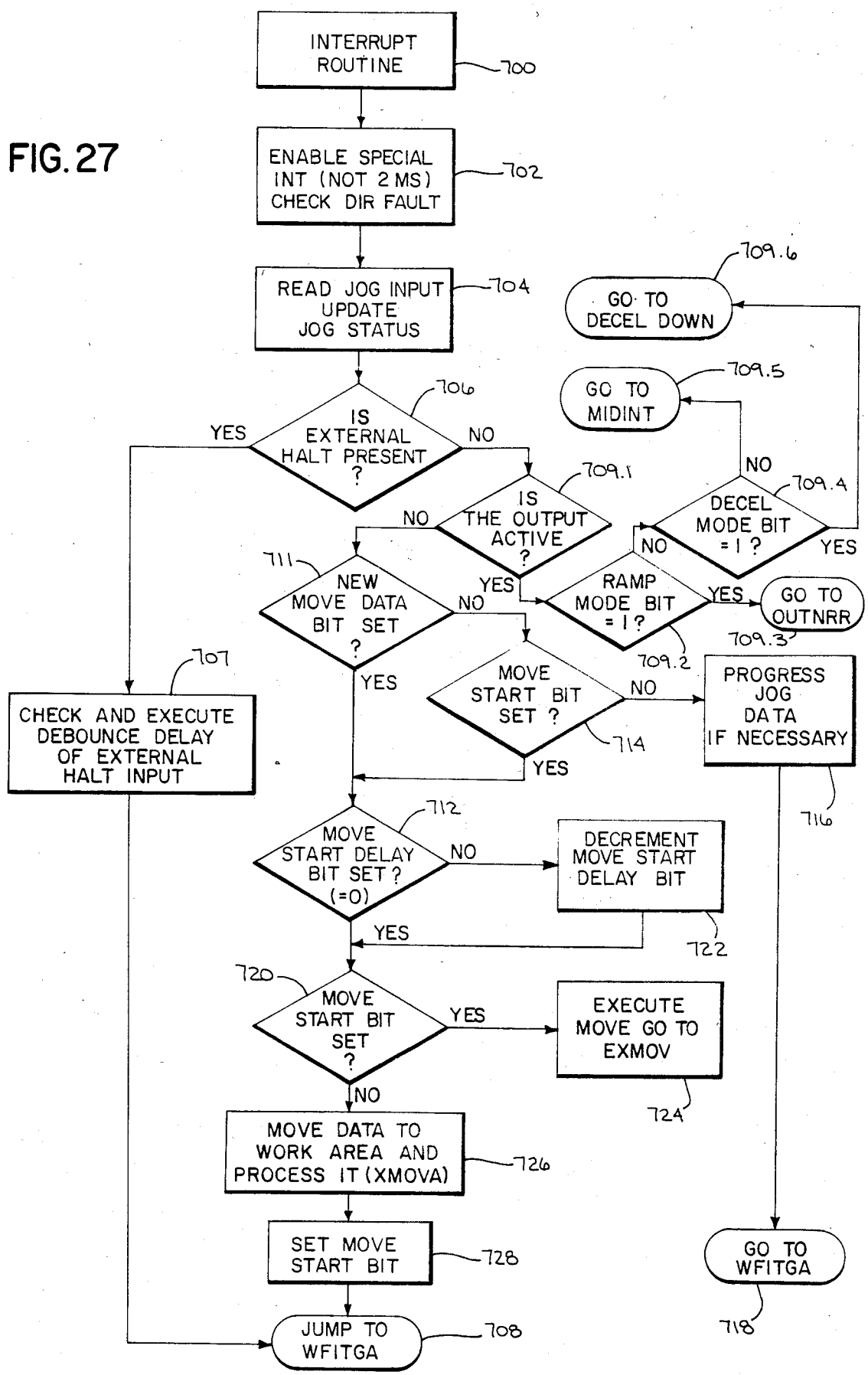
FIG. 27 is a flow chart representation of the interrupt (INT) routine which is executed by the data processor of the satellite output module in response to an interrupt received from the master controller module.

As previously discussed, the microprocessor executes the SAT SCAN program of FIG. 23 until receipt of an interrupt by the master module 28 of FIGS. 1, 2, and 7-9. Upon receipt of an interrupt, the microprocessor 330 executes an interrupt (INT) routine which is illustrated in flow chart form of FIG. 27. Turning now to FIG. 27, the interrupt routine is begun (Step 700) following receipt of an interrupt signal by the satellite output module 30 from the master controller module 28. Following Step 700, the microprocessor 330 enables itself to respond to special interrupts due to a hardware stop, a master stop and a I/O reset but disables itself to respond to subsequent interrupts from the master controller module 28 (Step 702). Thereafter, the jog input data from the switches 90a or 90b of FIG. 2 is read and debounced, and then the jog status is updated (Step 704). Next, the microprocessor 330 ascertains whether an external halt is present (Step 706). When an external halt is present, the microprocessor checks and decrements the debounce delay associated with the I/O reset, the hard stop reset, and the master stop reset (Step 707) before proceeding to wait for the interrupt to go away by jumping to the WFITGA routine (Step 709) which will be described hereinafter.

If no external halt is present, then the microprocessor proceeds to examine whether the output is "active", that is to say, whether a move is currently in progress (step 709.1) If the output is active, then the microprocessor 330 proceeds to check the RAMP MODE bit (Step 709.2). If the bit is set, then program execution branches to the OUTNRR routine (Step 709.3) otherwise, the microprocessor 330 proceeds to examine the decel mode bit (step 709.4) If the decel mode bit is not set (indicating that a decel is not required) then program execution jumps (step 709.5) to the MIDINT routine. Otherwise, if the decel mode bit is set to a logic "1", then program execution branches to the DECELR DOWN routine of FIGS. 44 and 44a to accomplish the deceleration (Step 709.6). When the output is not active, or when there is an external halt, then the status of the new move data bit is examined (step 711). If the new move data bit is set, then the microprocessor 330 proceeds directly to Step 712. Otherwise, the microprocessor 330 proceeds to Step 714 during which the microprocessor 330 examines the status of the move start bit. If the move start bit is found to be set to a logic "1", then the microprocessor 330 proceeds to Step 712. Otherwise, the microprocessor 330 proceeds to Step 716 and processes any jog data before returning (Step 718) to the SAT SCAN program of FIG. 23 via the WFITGA routine of FIG. 28.

Upon execution of Step 712, the microprocessor 330 examines the move start delay bit. A logic "0" level move start delay bit causes program execution to branch to Step 720. However, should the move start delay bit be set at a logic "1" level then the microprocessor 330 proceeds to Step 722 and decrements the move start delay bit by 1 before proceeding to Step 720.

Upon execution of Step 720, the microprocessor 330 examines the move start bit. Should the move start bit be set to logic "1", indicating that the move is to start immediately, the microprocessor 330 proceeds to Step 724 and begins execution of the move by branching to the EXMOV routine described with respect to FIG. 32. Eventually, the microprocessor 330 returns to the SAT SCAN program after the move has begun. When the move start bit is found not to be set when examined during Step 720, program execution branches to Step 726 rather than Step 724 as previously described. During the execution of Step 726, the subroutine XMOVA is called to move data into the work area within the internal random access memory of the microprocessor 330 for processing. Of particular importance is that the point of "decel fast scan" and the DECEL MODE bit is cleared at this time. The XMOVA routine will be described hereinafter with respect to FIG. 29. Following execution of Step 726, the move bit is set to a logic "1" (Step 728) so that during subsequent execution of the interrupt routine, the next move will be executed. Following execution of Step 728, the microprocessor proceeds to Step 710 to jump to the routine WFITGA of FIG. 28 and wait for the interrupt to go away.

WFITGA

Turning now to FIG. 28, there is shown a flow chart representation of the subroutine WFITGA. Execution of the WFITGA routine is begun (Step 710a) and immediately thereafter, the status of the satellite clock line of the secondary bus 68 of FIG. 10 is examined to detect whether the line has gone to a logic "0" condition (Step 710b) as occurs every two milliseconds. A determination that the clock line is at a logic "0" state causes reexecution of Step 710b until such time as the clock line is at a logic "1" state to assure that the satellite output module is syncrhonized to the master controller module 28 of FIGS. 1, 2, and 7-9.

Following determination that the clock line of the secondary bus 68 of FIG. 9 is at a logic "1" condition, then program execution branches to Step 710c and the XRAM is selected or enabled. Thereafter, a word or byte designated as the watch dog or master time byte, and the check sum byte are retrieved from the XRAM and examined. As described previously, the check sum byte is the byte whose value corresponds to the sum of the data read from the XRAM so that the validity of the data can be verified upon comparison of the check sum byte with the sum of the bits of the data byte. The watch dog or master timer byte is a byte whose value is set during each execution of the interrupt routine of FIG. 27. As will become better understood following a complete description of the WFITGA routine, the watch dog timer byte is decremented by 1 during each execution of the WFITGA routine. The value of the watch dog time out byte is set so that if the interrupt routine is executed every 10 milliseconds, as is normally the case, then the value of the watch dog timer byte should never reach 0 even though the byte is decremented during each execution of the WFITGA routine. When the watch dog timer byte is examined and found to be a logic "0", indicating that the interrupt routine has not been executed within the 10 millisecond interval as is normally the case, then an error has occurred and accordingly, the microprocessor 330 alerts the master module of the error then, stops the output and waits for the power on reset (Step 710e).

Unless the watch dog time out byte is found to be "0" when examined during Step 710d, program execution branches to Step 710g during which the check sum byte is rewritten and the watch dog time out byte is decremented by 1 and rewritten. Next, the microprocessor 330 determines whether the status position in the XRAM was being updated when the 2 millisecond interrupt had occurred (Step 710h). If the XRAM was undergoing an update when the 2 millisecond interrupt was received, the data stack is set, that is to say, the status position update is completed to assure that the proper value has been stored in the XRAM for subsequent transmission to the master controller module 28 (Step 710i). Otherwise, the absence of a status position update occurring when the 2 millisecond interrupt was received causes program execution to return (Step 710j) to the SAT SCAN program of FIG. 23.

XMOVA

Figure 29:
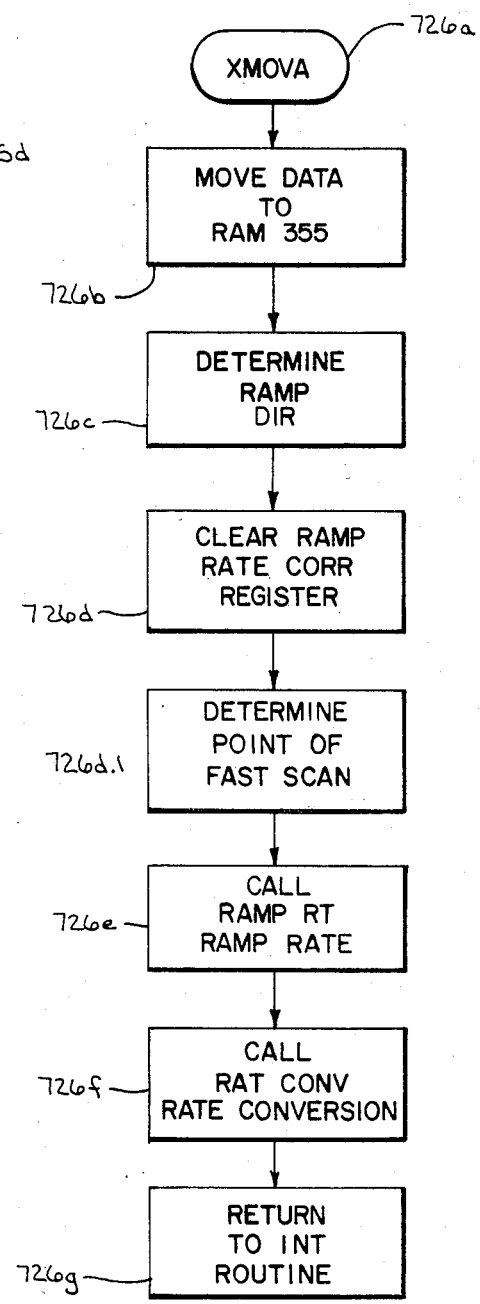
FIG. 29 is a flow chart representation of the subroutine XMOVA which is executed during the interrupt routine of FIG. 27 to move the satellite move set data block into the data processor memory.
Figure 31:
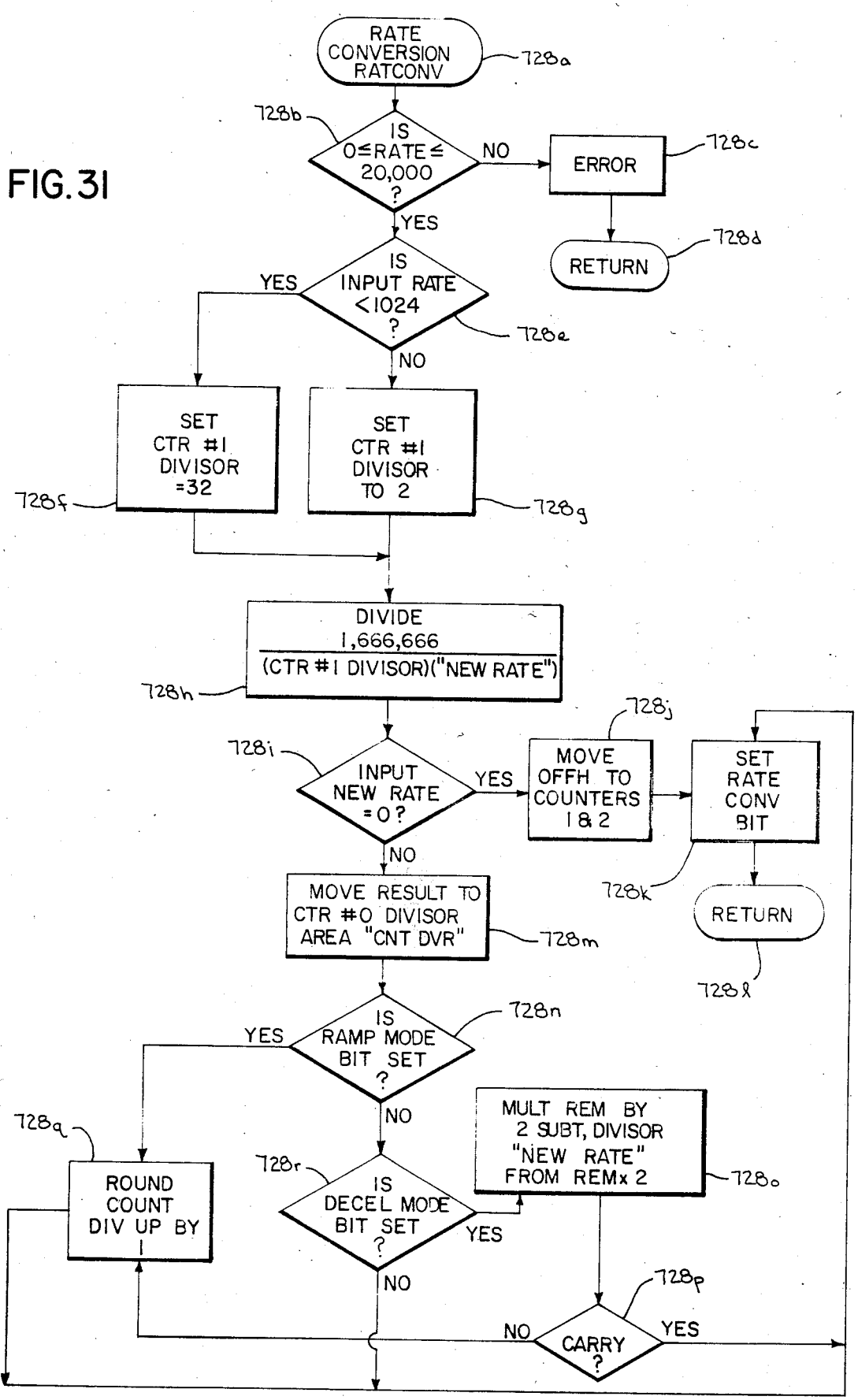
FIG. 31 is a flow chart representation of the RATCONV routine which is executed during the XMOVA routine of FIG. 29 to convert a previously calculated rate value into a rate value usable by the counter of the satellite output module.

The XMOVA routine which is executed in response to a call made during Step 726 of the interrupt routine is illustrated in flow chart form of FIG. 29. The XMOVA routine is begun (Step 726a) following a call made during the execution of Step 726 of the interrupt (INT) routine of FIG. 27. Following execution of Step 726a, data is moved into the work area of the internal RAM within the microprocessor 330 (Step 726b). Next, the ramp direction is determined by comparing the most current ramp value to the previous ramp value (Step 726c). Thereafter, the register of the microprocessor 330 which stores the accumulation correction value of the ramp (the fractional pulse value) is cleared (Step 726d) and the point of "decel fast scan" or "final position fast scan" is determined depending on the status of the USE DECEL bit. Following execution of Step 726d, then the subroutine RAMPRT of FIG. 30 is called (Step 726e) to calculate the first ramp value value. Once the RAMPRT routine is completed, then the routine RATCNV of FIG. 31 is called to convert the calculated ramp value into a form suitable for counter 410. After execution of Step 726f, program execution branches to Step 726g causing a return to the interrupt (INT) routine of FIG. 27.

RAMPRT

Turning now to FIG. 30, there is shown a flow chart representation of the RAMPRT subroutine which is executed during the XMOVA subroutine of FIG. 29 to calculate the beginning ramp rate. Turning now to FIG. 30, execution of the RAMPRT routine is begun (Step 727) following a call made during execution of Step 726e of the XMOVA routine of FIG. 28. Thereafter, the status of the ramp down mode control bit is examined (Step 727b). As will be recalled, during execution of Step 726c of the XMOVA routine of FIG. 28, the ramp direction is determined. Depending on whether the ramp is up or down, a bit, referred to as the ramp down mode control bit, is set or not set accordingly. Following a determination of the status of the ramp down mode control bit during execution of Step 727b, the microprocessor 330 then proceeds to adjust the current ramp value by the 2 byte ramp value expressed in terms of a rate change per increment ($\Delta Hz/INC$) as calculated by equation (4) by either adding the ramp value to the current rate if the down mode control bit is not set or by subtracting the 2 byte ramp value from the current rate when the ramp down mode control bit is set (Step 727c).

Next, the subroutine RAMPRIC is executed (Step 727d). As will become better understood following a detailed description of the RAMPRIC routine provided with respect to FIG. 42, the RAMPRIC routine, adjusts for the fractional remainder of the rate provided by the master controller module 28 in the form of the remainder value (words 24 and 25 stored in RAM 162). The microprocessor 330 adds the remainder to an accumulated value. Upon overflow, the input value to the counter 410, determined upon executuion of the RATCONV routine of FIG. 31, is incremented to achieve precise stepping motor positioning in accordance with the "perfect" deceleration algorithm" described previously with respect to FIG. 19.

Upon completion of execution of the RAMPRIC routine, program execution branches to Step 727e during which the new rate, previously adjusted during execution of the RAMPRIC routine, is compared to the maximum possible stepping motor rate of 20,000. If the new rate exceeds 20,000 or is less than 0, a carry is generated. Thereafter, the microprocessor 330 checks (Step 727f) to see if a carry was previously generated during Step 727e. If a carry was generated, then program execution branches to Step 727g and the final rate or steady state rate is substituted for the new rate value upon execution of the rate convert routine (RATCNV) which, as described hereinafter, establishes the divisor values for counter 410. Following execution of Step 727g, program execution branches to Step 727h during which the bit known as the final ramp done bit is set to signify that the microprocessor 330 has completed the calculations associated with determining the last ramp value. Following execution of Step 727h, the microprocessor proceeds to Step 727i.

The absence of a carry during Step 727f causes microprocessor 330 program execution to branch from Step 727f to Step 727j rather than Step 727h, as previously described. Upon execution of Step 727j, the microprocessor 330 tests whether the new rate is greater than the final rate. If the new rate is greater than the final rate, then the ramp up has been finished and program execution branches to Step 727g. Otherwise, if the new rate is less than the final rate, then program execution branches to Step 727k and the new rate is converted to a binary value by moving the value into a location (rate convert) where it is processed during the RATCONV routine, and program execution branches to Step 727i during which the rate conversion bit is set. Upon completion of execution of Step 727i, the microprocessor 330 returns (Step 727) to execution of the XMOVA routine of FIG. 29.

RATCONV

Turning now to FIG. 31 there is shown a flow chart representation of the subroutine RATCONV which, as previously describef, establishes the divisors for the counter 410 of FIG. 10 to enable accurate stepping motor resolution. As previously described, the counter 410 is loaded by the microprocessor 330 and is reloaded every 10 milliseconds to produce the output pulses supplied to the stepping motor translator to achieve stepping motor positioning. In practice, the counter 410 is a divide by N counter which is comprised of three internal counters #0, #1, and #2. Counter #2 simply monitors the numer of pulses produced and has no part in producing the output pulse train supplied to the stepping motor translator 13a of FIG. 2. The counter 410 produces an output frequency equal to 1/N of the input frequency where N is the product of the divisors $N_0$ and $N_1$, of each counters #0, and #1. In order to assure that the output pulse produced by the counter 410 allow the stepping motor to achieve sufficient resolution, it is necessary to adjust one of the divisors, chosen here to be $N_1$. When the input frequency value to be divided down by the counter 410 is very high, a small divisor, typically $N_1=2$, is sufficient to obtain good stepping motor resolution. However, when the input frequency to be divided down by the counter 410 is small, typically less than 1024, a small divisor will not yield sufficient resolution to achieve accurate stepping motor positioning. Thus, it is necessary to increase the counter divisor ($N_1$) when the input frequency to the counter is low. As will be appreciated following complete description of the RATCONV routine, it is during the RATCONV routine that the counter divisor $N_1$ is set depending on the rate.

Execution of the RATCONV routine is begun (Step 728a) following a call made during execution of the Step 726f of the XMOVA routine of FIG. 28. Thereafter, the ramp rate is checked to see whether the value is between 0 and 20,000. Should the value be outside the normal range of 0 to 20,000, then an error has occurred and accordingly, the microprocessor 330 alerts the master controller module 28 of the errors (Step 728c) then takes the "error action" before it returns to the SAT SCAN program (Step 728d). A determination that the rate is within the normal range of 0–20,000 causes the microprocessor 330 to branch to Step 728e during the execution of which, the microprocessor 330 examines the value calculated for the input rate during execution of Step 513k of the subroutine SSDAPROCESS of FIG. 18a. If it is less than 1024, indicating that the rate is a low rate requiring a high counter divisor to obtain the desired stepping motor resolution, then program execution branches to Step 728f during which the microprocessor 330 sets the divisor $N_1$ for the internal counter #1 equal to 32 and sets the dividend for this counter equal to the ratio of 1,666,666/NEWRAT. The counter #0 dividend is the input frequency to the Counter 410 of 1,666,666 and the divisor of counter #0 is set to NEWRAT.

Should the value be greater than 1024, signifying a relatively high stepping motor rate, then program execution branches to Step 728g, rather than 728f. During Step 728g, the divisor $N_1$ for counter #1 is set to 2 and the dividend for counter #1 is set to 1,666,666/NEWRAT. The divisor for counter #0 is set to the new rate value and dividend is set equal to the ratio 1,666,666.

Following either Step 728f or 728g, depending on the value of $N_1$, the microprocessor 330 performs a division, dividing the value 1,666,666/counter #1 divisor by the new rate value (NEWRAT) to calculate the counter #2 divisor. The dividend for counter #2 will be the number to output to the counter #0 register.

To prevent error which would be caused by a division by zero if zero were loaded into the counter #0 register, the new rate value (NEW RAT) is then examined (Step 728i) to determine whether the new rate value is equal to zero. A zero new rate value causes program execution to branch to Step 728j during which the value $OFF_8$ is moved into each of the counters #1 and 2, and thereafter, the rate convert bit is set (Step 728k) before returning (Step 728l) to the XMOVA routine of FIG. 28. Should the new rate previously calculated during the division of Step 728h be greater than zero, when examined during Step 728i, then program execution branches to Step 728m rather than Step 728j and the result of the quotient or result of the division performed during execution of Step 727h is moved into divisor $N_0$ for the counter #0 of counter 410.

Thereafter, the micoprocessor 330 determines whether or not the ramp mode has been completed by examining the status of the ramp mode bit which is set when the ramp is completed (Step 728n). Should the ramp mode bit be set, when examined during execution of Step 728n, then program execution branches to Step 728q during which the counter #0 divisor is rounded up. After execution of Step 728q, program execution branches to Step 728k.

Upon finding the ramp mode bit not set, program execution branches to Step 728r during which the status of the decel mode bit is examined. When the decel mode bit is set, program execution branches to Step 728o during which the remainder is multiplied by $2_{10}$ and the value NEWRAT is subtracted from the product. Otherwise, program execution branches to Step 728k and the rate convert bit is set before returning (Step 728) to the SCAN LOOP program. Following Step 728o, the microprocessor 330 checks for a carry (Step 728p). Upon a carry, program execution branches to Step 728k, the absence of a carry causes program execution to branch to Step 728q and the divisor $N_0$ of the counter # of counter 410 of FIG. 10 is rounded up to the nearest whole numer by incrementing the rounded divisor value by 1 before proceeding to Step 728k and those following it.

EXMOV

Figures 32, 40:
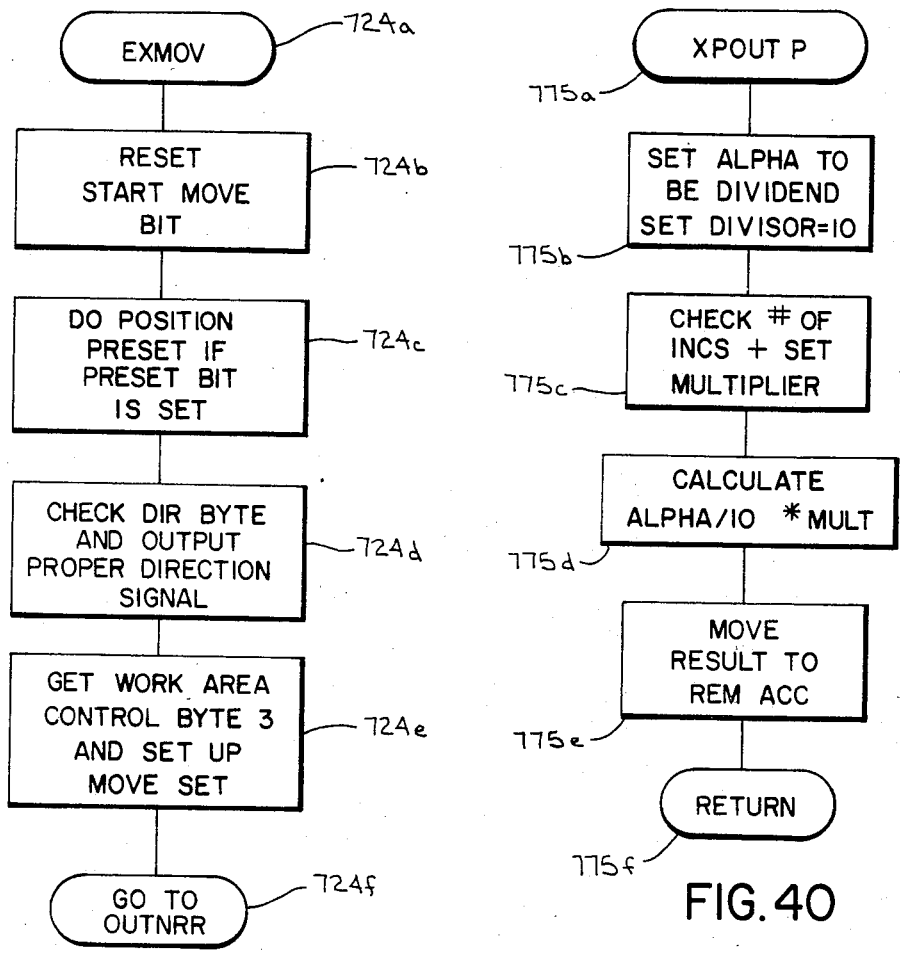
FIG. 32 is a flow chart representation of the EXMOV routine which is executed during the interrupt routine of FIG. 27 to execute a stepping motor move.
FIG. 40 is a flow chart representation of the XPOUTP routine which is executed during the MIDINT routine of FIG. 33 to initialize the point where the extra deceleration pulse is to be output during the deceleration interval.

Turning now to FIG. 32, there is shown a flow chart representation of the EXMOV subroutine which, when executed in response to a call made during the subroutine Interrupt routine of FIG. 27, initiates the actual move. Execution of the EXMOV routine of FIG. 32 is begun (Step 724a) in response to a call made during execution of the interrupt INT routine of FIG. 27. Thereafter, the move start bit is reset (Step 724b) so that subsequent execution of the EXMOV routine only occurs if the move start bit had been set during execution of the previous routines. Next, the preset bit is examined and if the bit is set, then a preset is accomplished (Step 724c). Following Step 724c, program execution branches to Step 724d during which the status of the direction byte is checked and depending on whether a forward or reverse direction move is stipulated, the appropriate output signal is sent to the output circuitry (not shown) driving the stepper motor translator 13a of FIG. 2. Next, the first control byte is obtained and a move data block is set up or prepared for the first move (Step 724e). Following Step 724e, program execution branches (Step 724f) to the subroutine OUTNRR of FIG. 38.

MIDINT

Figure 33:
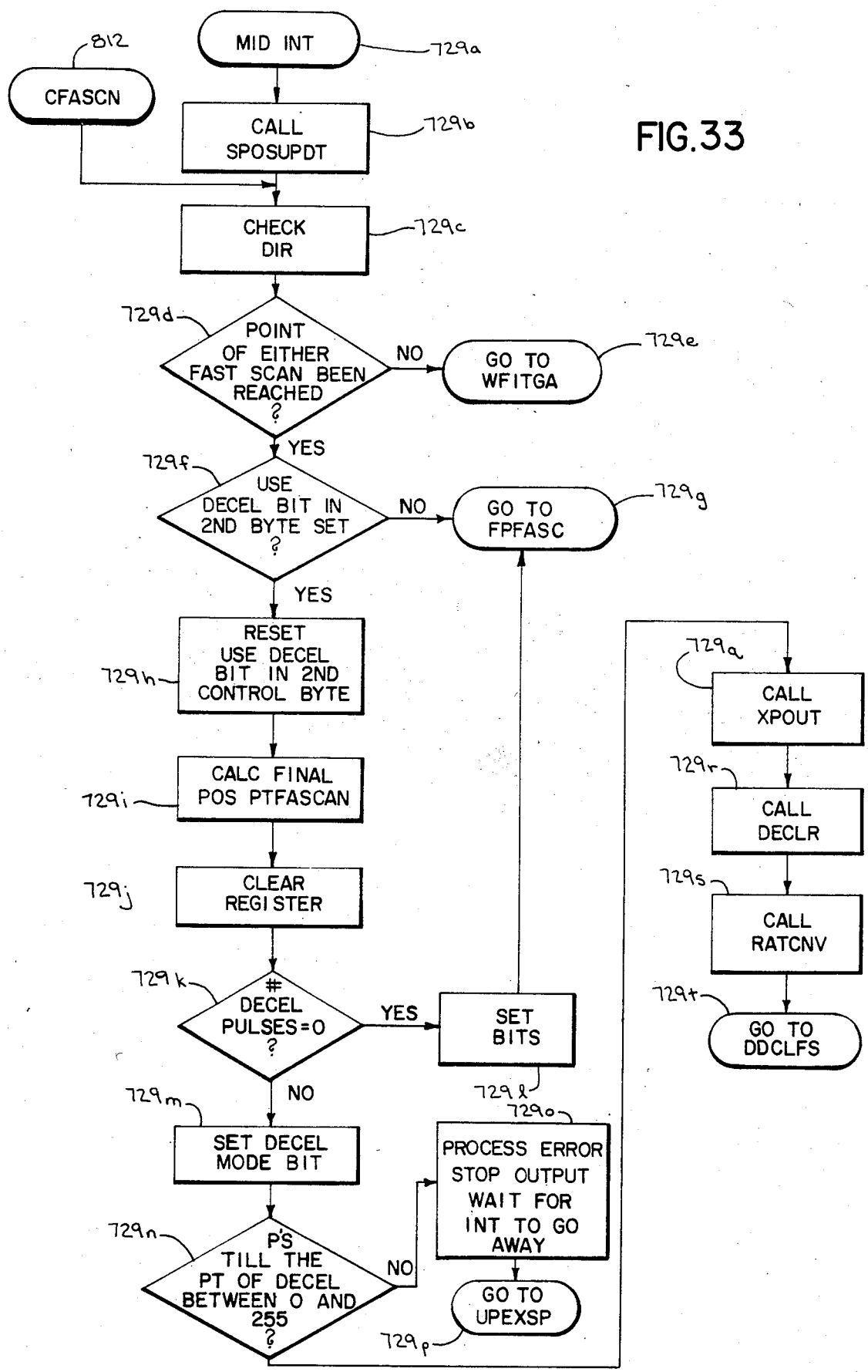
FIG. 33 is a flow chart representation of the MIDINT routine which is executed during the EXMOV routine of FIG. 32 to initiate a move.

Turning now to FIG. 33, there is shown a flow chart representation of the subroutine MIDINT which as described previously causes the counter 410 of FIG. 10 to be loaded to produce the output pulse train supplied to the stepping motor translator 13a of FIG. 2. Execution of the MIDINT subroutine is commenced (Step 729a) following a call made during execution of the OUTNRR routine of FIG. 38. Thereafter, the subroutine SPOSUPDT is called (Step 725b) to perform a position update of the stepping motor status and position. The subroutine SPOSUPDT will be described hereinafter with respect to FIG. 34. Upon completion of execution of Step 729b, the current direction of the stepping motor is checked to ascertain whether the stepping motor is moving at a forward or reverse direction (Step 729c). Thereafter, the microprocessor 330 determines whether the point of decel or final position fast scan has been reached (Step 729d) by ascertaining whether the algebraic difference between the current position and the position of the point of fast scan is negative. If neither point of fast scan has not been reached, (the difference between the current position and the point of fast scan is greater than zero) then the microprocessor 330 branches to the WFITGA routine (Step 729e) to wait for the interrupt to go away.

Should the microprocessor determine, during the execution of Step 729d, that the point of decal or final position fast scan has been reached, then the microprocessor checks if the USE DECEL BIT had been set originally in the 2nd control byte in the RAM 162 of FIG. 7b to determine whether a deceleration to a zero rate, or merely a ramp down, is to be completed. Upon finding the USE DECEL BIT unset, the microprocessor proceeds to go to the FPFASC (final point of fast scan) routine (Step 729g) since the final position of the point of fast scan has been reached. The subroutine FPFASC will be described hereinafter with respect to FIG. 36.

Otherwise, if the USE DECEL BIT is set, then program execution branches to Step 729h rather than Step 729g. Additionally, if the use DECEL BIT is set, then the point of fast scan that was reached was the point of decel fast scan and not final position fast scan. Upon execution of Step 729h, the USE DECEL BIT is reset. Then, the point of final position fast scan is calculated (Step 729i) by subtracting the number of pulses in the last 10 millisecond deceleration interval from the final position.

Next, the register which stores the ramp/deceleration rate correction accumulated remainder is cleared (Step 729j). Thereafter, the microprocessor 330 ascertains whether the number of decel pulses equals zero (Step 729k). Should the number of decel pulses equal zero, indicating that the decel is completed, then the final decel bit is set to reflect such a condition (Step 729l) before proceeding to go to the FPFASC routine (Step 729g).

When the number of decel pulses is greater than zero, then the decel mode bit is set to reflect that a deceleration is required (Step 729m). Thereafter, the microprocessor 330 examines the number of deceleration pulses remaining until the point where deceleration will begin to determine whether the number of pulses is within the range of 0 to 255 pulses (Step 729n). Should the number of pulses be outside of this range, then an error has occurred, and the microprocessor 330 executes an error routine (Step 729o) to stop the output, disable the satellite output module then wait for the interrupt to go away before entering the SCAN LOOP routine at the UPEXSP block (Step 729p).

Otherwise, when the number of pulses is within the range of 0 to 255 pulses, program execution branches to Step 729q rather than Step 729o. Upon execution of Step 729q, the subroutine XPOUT (described hereinafter with respect to FIG. 40) is called to determine in what interval an accumulated "extra" pulse is to be output in accordance with the "perfect integral" algorithm. Thereafter, the subroutine DECELR is called (Step 729r) to calculate the deceleration. This subroutine will be described in greater detail with respect to FIG. 41. Following execution of Step 729r, the subroutine RATCONV of FIG. 31 is called (Step 729s) to convert the first deceleration value to a form usable by the counter 410. Finally, upon completion of execution of RATCONV routine, a jump to the DDCLFS routine of FIG. 45 is effected (Step 725t). The DDCLFS routine, which comprises a portion of the routine DECLR DOWN of FIGS. 44a and 44b, causes the pulses to be output to the stepping motor 13 of FIG. 1 until a specified position (point of decel) has been obtained.

SPOSUPDT

Figures 34, 35, 42:
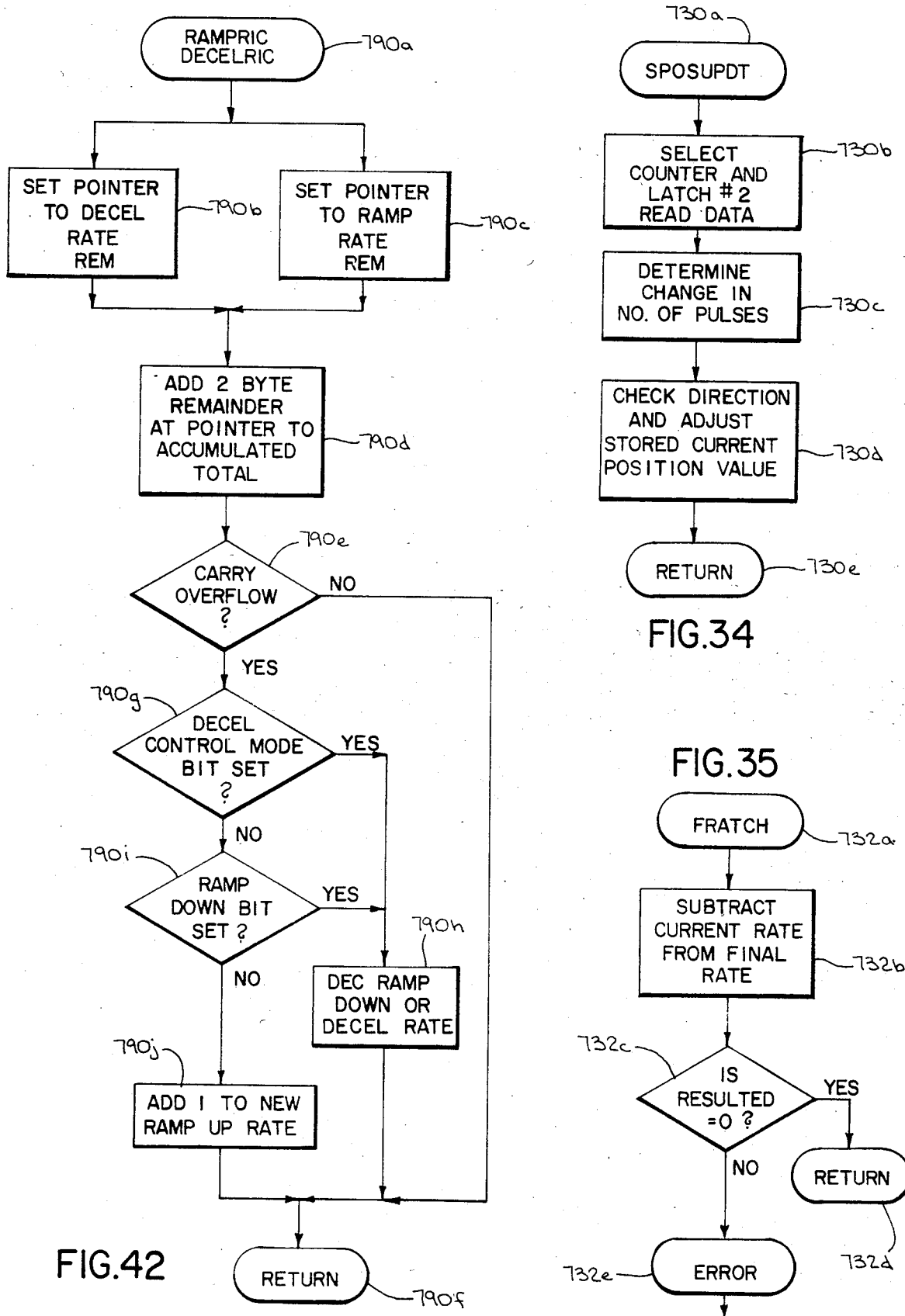
FIG. 34 is a flow chart representation of the SPOSPUDT routine which is executed during the MIDINT routine of FIG. 33 to perform a position update.
FIG. 35 is a flow chart representation of the FRATCH routine which is executed during the EXMOV routine of FIG. 32 to determine whether the final rate has been reached.
FIG. 42 is a flow chart representation of the DECELRIC routine which is executed both during the DECLR routine of FIG. 41 and during the RAMPRT routine of FIG. 30 to adjust the deceleration value and the ramp.

Turning now to FIG. 34, there is shown a block diagram of the SPOSUPDT routine (Position update) which is executed during the MIDINT routine of FIG. 33 to update the position of the stepping motor stored in memory. Execution of the SPOSUPDT routine is begun (Step 730a) following a call made during execution of Step 725b of the MIDINT routine of FIG. 33. Still referring to FIG. 34, following execution of Step 730a, the microprocessor 330 then selects or enables its internal counter #2 of Counter 410 which stores the count indicative of the stepping motor position and then latches that count to enable it to be read (Step 730b). Thereafter, the microprocessor 330 determines the change in the number of pulses between the previous position count and the most recent count and stores its value in memory (Step 730c). Next, the microprocessor 330 checks the direction of the move and adjusts the pulse count accordingly by subtracting the number of pulses from the current position if the move is a reverse direction move or by incrementing the number of pulses to the current position if the move is in a forward direction (Step 730d). Upon completion of execution of Step 730d, the microprocessor returns to the MIDINT interrupt (Step 730e).

FRATCH

Referring to FIG. 35, there is shown a block diagram of the FRATCH routine (final rate achieved) which is executed during the EXMOV routine of FIG. 32. The FRATCH routine is begun (Step 732a) in response to a call made during execution of Step 724n of the EXMOV routine of FIG. 32. Thereafter, the microprocessor 330 subtracts the current rate from the final rate (Step 732b). A comparison is then made (Step 732c) to determine if the difference between the current rate and the final rate is zero. If so, the microprocessor then returns (Step 732d) since the final rate has been reached. A determination that the result is unequal to zero is indicative of an error and accordingly, the microprocessor 330 proceeds to Step 732e to alert the master module of the error and take the "error action" before returning (Step 732f) to the SAT SCAN program of FIG. 22.

FPFASC

FIG. 36 illustrates, in flow chart form, the subroutine FPFASC which calculates the final position point of fast scan. Execution of the FPFASC routine is begun (Step 740a) in response to a call made during execution of the Step 725g of the MIDINT routine of FIG. 33. Still referring to FIG. 36, following execution of Step 740a, microprocessor 330 then proceeds to Step 740e during which the microprocessor 330 ascertains the number of pulses required to accomplish the last 10ms of the move (Step 740e). Thereafter, the microprocessor ascertains whether the number of pulses previously calculated during Step 740e are within the range of 0-255 pulses (Step 740f). A determination that the number of pulses of the last move is less than 0 or greater than 255 represents an error condition causing program execution to branch to Step 740f.1 during which the microprocessor 330 alerts the master controller module 28 of an error then takes the "error action" and waits for the interrupt to go away before entering (Step 740f.2) the SAT SCAN program at the UPEXSP block. Should the number of pulses be within the range of 0-255, as is normally the case, then program execution proceeds to Step 740g rather than Step 740c. Upon execution of Step 740g, the address of the counter 410 is latched to enable the count value to be loaded into counter #2 of counter 410. Thereafter, the microprocessor 330 checks whether the number of pulses to the end of the move is zero. If so, then the move has been completed and the microprocessor goes to the ENDMOV routine (Step 740i). Otherwise, the move has not been completed and the microprocessor calls for the subroutine FASCAN (Step 740j) which monitors the number of pulses produced until the number of pulses to the end of the move equals zero.

ENDMOV

The ENDMOV routine which is executed upon the end of the move is illustrated in flow chart form in FIG. 37. Turning now to the figure, execution of the ENDMOV routine is begun (Step 745a) at the end of FPFASC routine of FIG. 36. Thereafter, the mode byte of the satellite move set data block of FIG. 7b is retrieved (Step 745b) and is then examined to determine whether the present move is a continuous dependent move as illustrated in FIG. 3c that is not the end of sequence (Step 745c). If the move is not of this type but rather a single step move then program execution branches to Step 745d during which the microprocessor clears the register storing the current rate, stops the output and also clears the ramp deceleration mode control bit which had been previously set to designate the occurrence of a ramp or decel interval before stopping the output. Next, the subroutine SPOSUPDT is called (Step 745e) to perform a position update. Thereafter, the microprocessor 330 determines if the current move is the last move by checking whether the current move end of the sequence bit is set or if the move is a single step move. In either case, a done status bit will be set and thereafter and the microprocessor 330 proceeds to Step 745g to jump the WFITGA routine (Step 745h) to wait for the interrupt to go away.

Upon finding that the fourth control byte indicates a continuous move that is not the end of the sequence when examined during Step 745c, the microprocessor 330 proceeds to set Step 745l and performs a position update by calling the SPOSUPDT routine described previously. Next, the program execution branches to Step 745m during which the microprocessor 330 loads the next move into working memory and prepares it for execution as the present move is coming to an end, thus requiring the next move to begin. Following execution of Step 745m, the routine OUTNRR is executed (Step 745o) to output the new rate to the counter and begin the ramp of the next move if one is programmed.

OUTNRR

Turning now to FIG. 38, there is shown a flow chart representative of the subroutine OUTNRR which outputs the new ramp rate. Execution of the subroutine OUTNRR is commenced (Step 750a) following Step 745o of the ENDMOV routine of FIG. 37. Thereafter, the rate convert bit is examined (Step 750b) to determine whether a rate conversion has been performed to render the output rate usable to the counter 410. If no rate conversion has been performed, then program execution branches to Step 750c and the RATCONV routine is called to perform the rate conversion after which program execution branches to the MIDINT routine (Step 750c.1). Otherwise, program execution branches from Step 750b to Step 750d and the rate convert bit is cleared before proceeding to Step 750e. During execution of Step 750e, the microprocessor 330 determines whether the ramp down to zero is required by examining the ramp down to zero bit. Upon finding the ramp down to 0 bit set, the microprocessor proceeds to Step 750f and does the following:

1. The output is stopped.
2. The ramp/deceleration mode control bit and the new move data bits are cleared.
3. The rate converted bit is cleared and the ramp down to zero bit is cleared.
4. The done status bit is set.

Upon completion of Step 750f, the WFITGA routine is entered (Step 750g).

If, during execution of Step 750e, the ramp down to zero bit is found not to be set, then program execution branches to Step 750h and the subroutine OUTRAT of FIG. 39 is called to output the new rate. Thereafter, the microprocessor 330 checks whether the final ramp is completed by checking the status of the final ramp/decel bit (Step 750i). Upon finding the final ramp down/decel bit set, the microprocessor 330 branches to Step 750j and calls the subroutine FRATCH to check that the final rate has been reached. Thereafter, program execution branches to Step 750k during which the register holding the final integration correction factor is cleared and the ramp deceleration mode control bit is also reset (Step 750k) before proceeding to jump to the MIDINT routine (Step 750l). Upon finding the final ramp/decel bit unset during execution of Step 750i, program execution thereafter branches to Step 750m and the 10 millisecond ramp/decel count which is decremented during each 2 millisecond interval is reinitialized. Upon completing of Step 750m, program execution branches to Step 750l and the subroutine MIDINT is entered.

OUTRAT

The OUTRAT routine which outputs the new rate to the counter is illustrated in flow chart form in FIG. 39. Execution of the OUTRAT routine begins (Step 770a) in response to a call made during execution of Step 750h of the OUTNRR routine of FIG. 38. Thereafter, the new rate value (NEW RAT) is moved into the memory location CTRATE which holds the current rate so that the new rate now becomes the current rate (Step 770b). Next, the counter 410 is enabled or selected and the counter divisor for each of the two internal counters #0 and #1 of the counter 410 is moved to the respective internal counters (Step 770c). Following execution of Step 770c, the microprocessor 330 processes any external interrupts which occurred before loading of the counters of counter 410 before returning (Step 770f) to the OUTNRR routine of FIG. 38.

XPOUTP

Figure 44:
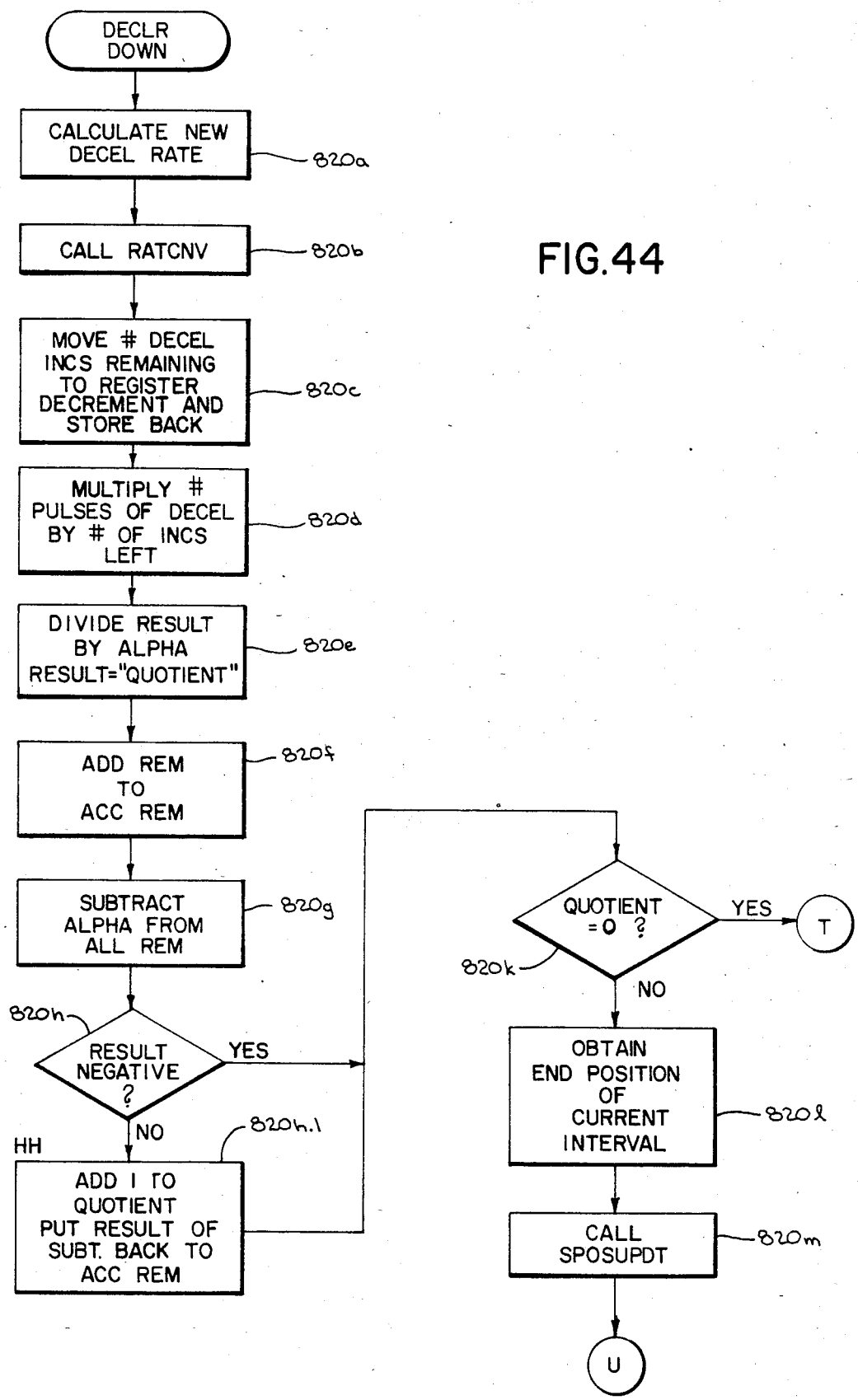
FIGS. 44 and 44a are flow chart representations of the DECLR down routine.
Figure 44A:
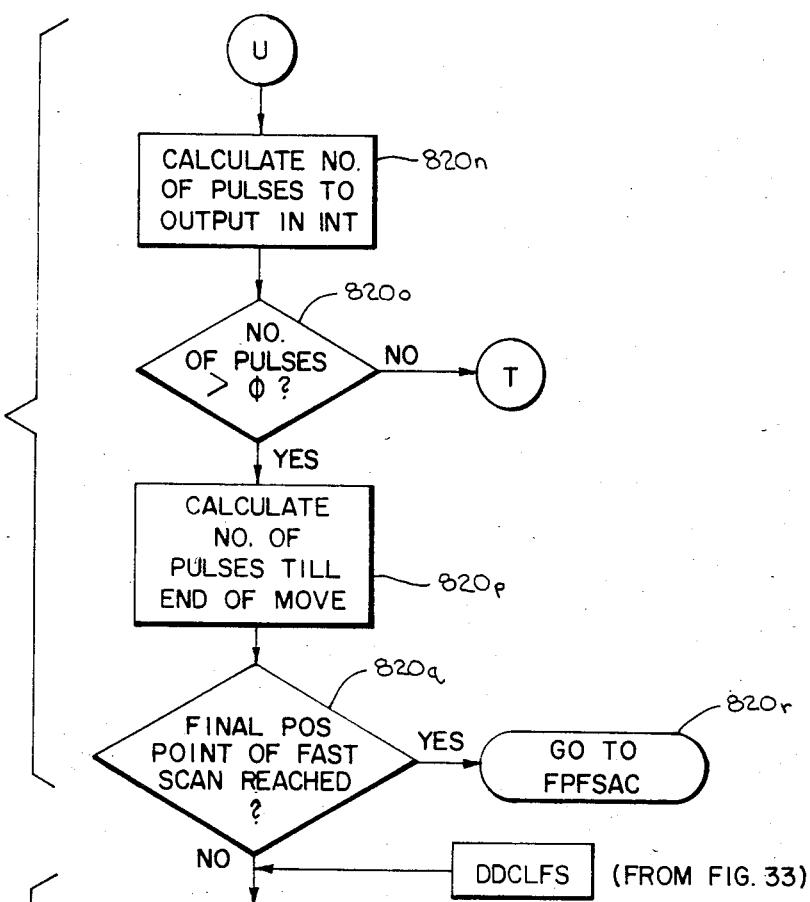

Turning now to FIG. 40, there is shown a flow chart representation of the SPOUTP routine which, when executed in response to a call made during Step 729q of the MIDINT routine of FIG. 33, determines during which interval an extra pulse is to be output following overflow of the accumulating remainder register which stores the fractional pulses resulting from the calculation of the number of pulses per interval performed during the DECLR Down routine of FIGS. 44 and 44a. The XPOUTP routinr if begun (Step 775a) in response to the call made during execution of Step 729q of the MIDINT routine of FIG. 33. Thereafter, the microprocessor 330 performs a division (Step 775b) dividing the value previously calculated during execution of Step 513aj of the subroutine SSDAPROCESS of FIG. 18c by the value 10 (decimal). The result is stored in memory location DXPREM for later use. Next, the microprocessor 330 checks the number of 10 millisecond increments in the deceleration portion of the move and then sets a multiplier value accordingly. The relationship between the number of increments and the multiplier value is set forth in Table V.

TABLE V

| # of INCS | MULTIPLIER |
| --- | --- |
| # INCS < 45 | 5 |
| 45 < # INCS < 55 | 4 |
| 55 < # INCS < 95 | 3 |
| 95 < # INCS < 750 | 2 |
| # INCS > 750 | 1 |

Once the multiplier has been set during the execution of Step 775c, then the microprocessor 330 performs a calculation, multiplying the value ($a/10$) by the previously set multiplier (Step 775d). Thereafter, the result is moved (Step 775e) into the register to which fractions are added at the preprocessing for each interval as occurs during the Steps 820f and 820g of the DECLR DOWN routine of FIGS. 44 and 44a. The larger the product obtained during Step 775d of FIG. 40, the sooner an overflow occurs during execution of the decel increments and the earlier an extra pulse will be output. Following Step 775e, program execution returns (Step 775f) to the MIDINT routine.

As may now be appreciated following the description of the XPOUTP routine, the XPOUTP routine represents an enhancement of the basic "perfect deceleration algorithm" previously described. Instead of waiting for a unity remainder, the XPOUTP routine in fact establishes different values to use in determining when to output the accumulated remainder pulses during processing and execution of the decel increments.

DECELR

Figure 41:
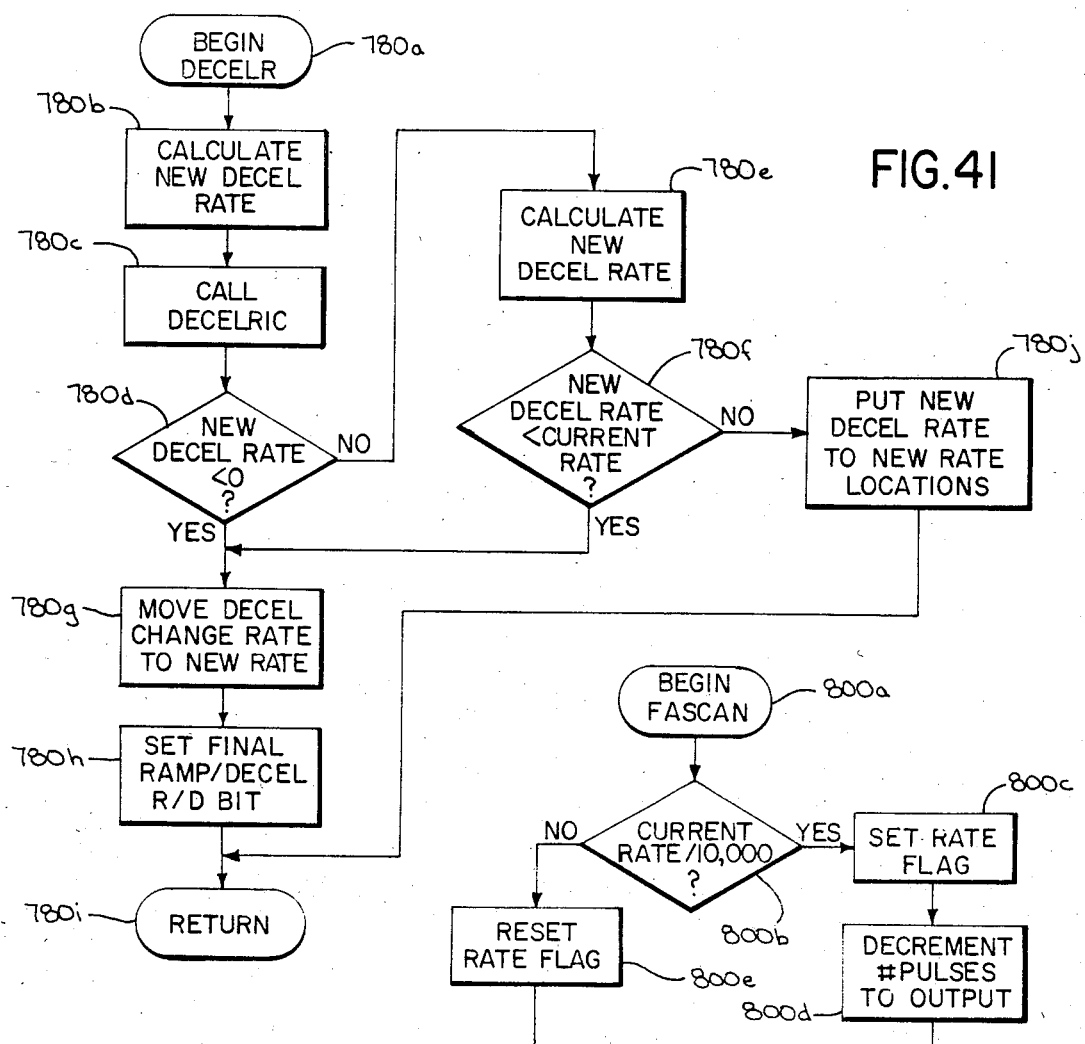
FIG. 41 is a flow chart representation of the DECLR routine which is executed during the MIDINT routine of FIG. 33 to calculate the new deceleration.

Turning now to FIG. 41, there is shown a flow chart representation of the DECELR routine which calculates the next rate in the deceleration interval. Execution of the DECELR routine begins (Step 780a) following a call made during Step 729r of the MIDINT routine of FIG. 33. Thereafter, the new rate is calculated (Step 780b) by subtracting the deceleration value expressed in terms of a rate change per increment, ($\Delta$Hz/INC), as calculated by equation (4) from the current rate. Next, the DECELR routine (described in greater detail with respect to FIG. 42) is called (Step 780c) to perform a rate correction on the new rate. Following Step 780c, the microprocessor 330 performs a comparison to check whether the new rate is greater than zero (Step 780d). If the new rate is not less than zero, then the microprocessor branches to Step 780e and calculates a new rate by subtracting the deceleration value, (ΔHz/INC), from the current rate but the result is not stored in memory. Instead, subsequent comparison is made between the new rate and the current rate (Step 780f). If the new rate is less than the deceleration value, (ΔHz/INC), the new rate value is not stored because the deceleration is finished. Rather, the deceleration value, rate (ΔHz/INC), previously calculated in Step 780b isl moved to the memory location storing the new rate (NEW RAT) (Step 780g) and the final ramp/decel bit is set to indicate the ramp or deceleration has been completed (Step 780h). Following completion of Step 780h program execution returns (Step 780i) to the MIDINT routine.

If, however, the new rate is found to be greater than the current rate upon the comparison therebetween made during Step 780f, then, the new rate calculated during Step 780e is moved into the memory location storing the new rate (NEWRAT) (Step 780j) and program execution returns (Step 780i) to the MIDINT routine.

DECELRIC-RAMPRIC

The DECELRIC and RAMPRIC routines are jointly illustrated in flow chart 42. As will become better understood following a description of the DECELRIC and RAMPRIC routines, the routines not only accomplish correction of the deceleration but also adjusts the ramp as well. Execution of either the DECELRIC or RAMPRIC routine is begun (Step 790a) in response to the call made during the execution of 780c of the DECLR routine of FIG. 41 or in response to a call made during the RAMPT routine of FIG. 30. Thereafter, the microprocessor 330 determines whether a ramp down or deceleration was then being executed. If a deceleration was being executed, then program execution branches to Step 790b and a pointer is set to the address in the work area corresponding to the memory location where the decimal remainder of the calculation of the rate in the deceleration interval is stored. Otherwise, program execution branches to Step 790c and a pointer is set to indicate the address of the memory location in the work area of memory storing the decimal remainder of the calculation of the rate in the ramp interval. Following execution of either of Step 790b or 790c, depending on whether a deceleration or a ramp is then being executed, the microprocessor 330 executes Step 790d and performs an addition, adding the two-byte decimal remainder at the address location identified by the pointer to the register storing the integer correction accumulated value for the rates. Following the two-byte addition performed during Step 790d, the microprocessor 330 checks whether the register had overflowed by determining whether the carry bit had been set (Step 790e). If no carry had been set, then program execution returns (Step 790f) to the DECLR routine of FIG. 41. Otherwise, program execution branches from Step 790e to Step 790g during which the deceleration mode control bit is examined to determine whether the deceleration mode control has been set. If the bit had been set, to designate that a deceleration as opposed to a ramp down had been commanded, then program execution branches from Step 790g to Step 790h and the new ramp down or deceleration value is decremented by 1 before returning (Step 790f). If the decel mode control bit had not been set, then program execution branches from Step 790g to Step 790i during which the ramp down bit is examined to determine whether the ramp down bit is set to reflect that a ramp down is being executed. Upon finding the ramp down bit set, the microprocessor 330 branches to Step 790h to decrement the ramp down or decel value by one before returning (Step 790f). However, if the ramp down bit is found not to be set, upon examination during execution of Step 790i the microprocessor 330 then proceeds to Step 790j and adds one to the new ramp up value before returning (Step 790g).

FASCAN

Figure 43:
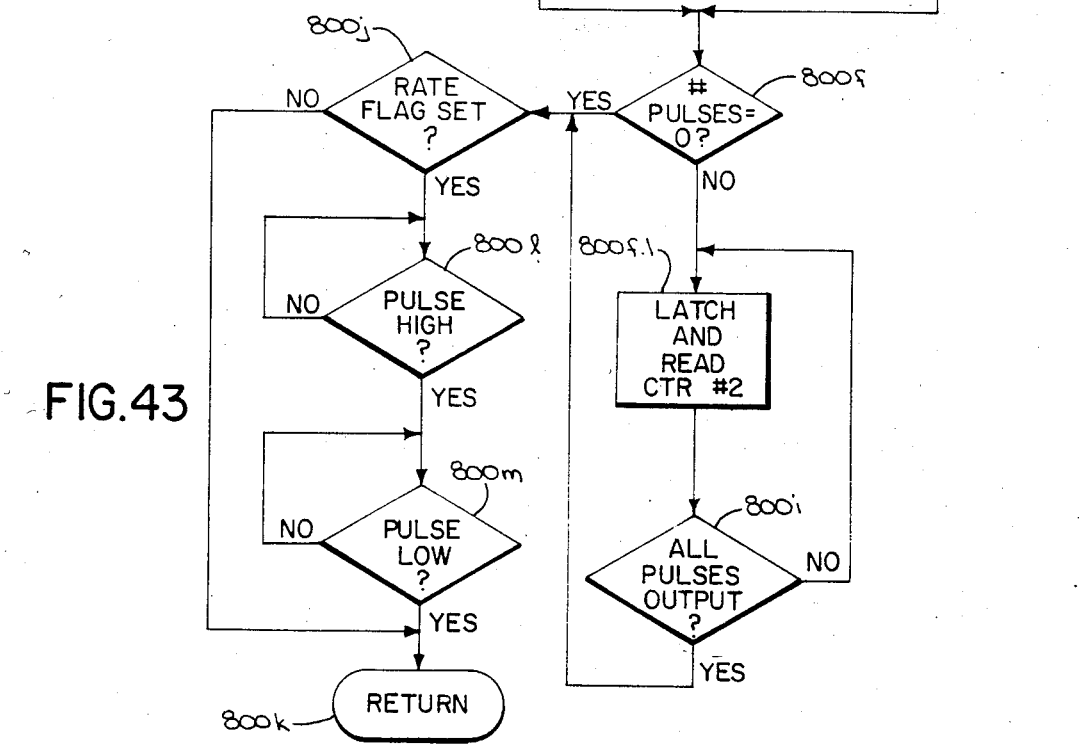
FIG. 43 is a flow chart representation of the FASCAN routine which is executed during the FPFASC routine continuously to check whether the final position has been reached.

The FASCAN routine executing during the FPFASC routine is illustrated in flow chart form in FIG. 43. Execution of the FASCAN routine is begun (Step 800a) following execution of a call made during Step 740j of the FPFASC routine at FIG. 36. Thereafter, the current rate is compared to the value 10,000 (Step 800b). A current rate in excess of 10,000 Hz causes a flag, known as the rate flag to be set to a logic "1" to designate a rate in excess of 10,000 Hz (Step 800c). Following Step 800c, the number of pulses to be outputted is decremented by 1 (Step 800d). Otherwise if the rate is not in excess of 10,000 Hz, then the rate flag is reset (Step 800e). Following execution of either of Steps 800e or 800d depending on whether the rate is greater or less than 10,000 Hz, then program execution branches to Step 800f and the number of pulses to be outputted is compared to the value zero. Should the number of pulses be greater than zero, then counter #2 of counter 410 is read (Step 800f.1) in preparation for Step 800i during which the microprocessor 330 determines if all the pulses to be output have been output. If not, the Step 800f.1 is repeated until all the pulses have been output.

When all the pulses have been output, the program execution branches to Steps 800j. Upon execution of Step 800j, the status of the rate flag is examined and if the rate flag is found not to be set, program execution returns (Step 800k) to the FPFASC routine of FIG. 36. Otherwise, a set rate flag causes program execution to branch to Step 800l during which the status of the then currently outputted pulse is examined. If the pulse is found to be low, the Step 800l is reexecuted until such time as the pulse is found to be high at which time program execution branches to Step 800m. During execution of Step 800m, the microprocessor 330 tests whether the pulse then being outputed is low. If the pulse is not low, the microprocessor reexecutes Step 800m until the pulse is high at which time program execution returns (Step 800k) to the FPFASC routine. The Steps 800l and 800m are the reason why the decrement is performed during Step 800d since the Steps 800l and 800m allow an extra pulse to be output.

DDCFLS

Figure 44B:
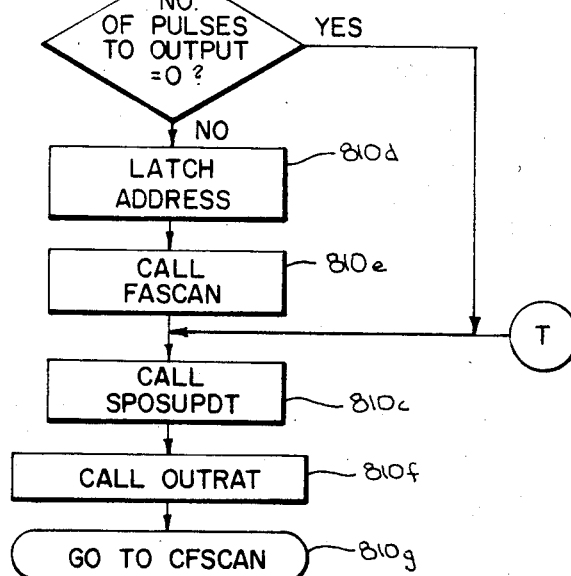
FIG. 44b is a flow chart representation of the DDCFLS routine which is executed during the MIDINT routine upon reaching the point of deceleration fast scan during the deceleration interval.

Turning now to FIG. 44b, there is shown a flow chart representation of the DDCFLS routine which is executed during the DECLR DOWN routine to perform a deceleration fast scan. Execution of the DDCFLS subroutine of FIG. 44b is begun (Step 810a) in response to a jump made during execution of Step 729t of the MIDINT routine of FIG. 33. Thereafter, the microprocessor 330 ascertains whether the number of pulses to the output in the interval is zero (Step 810b). If the number of pulses to the output in the interval is zero, then program execution branches to Step 810c otherwise, program execution branches to Step 810d and the internal counter #2 of the counter 410 is enabled or set up and the address of the data for the internal counter #2 of counter 410 is latched to enable the rate data to be transferred to the microprocessor 330. Following Step 810d, the subroutine FASCAN of FIG. 43 is called (Step 810e) to continually scan the number of pulses output until the proper number of pulses have been output. Following execution of Step 810e or following execution of Step 810b if the number of pulses to be output is zero, program execution branches to Step 810c and a position update is performed by calling the subroutine SPOSUPDT of FIG. 34. Following execution of Step 810c, the subroutine OUTRAT is called (Step 810f) to output the new rate to the stepping motor translator 13a of FIG. 2.

Thereafter, the routine CFASCN is entered (Step 810g). Turning now for a moment to FIG. 33, execution of the CFASCN routine is begun (Step 812) following a jump made during execution of Step 810g of the DDCLFS routine. Thereafter, program execution branches to Step 729c of the MIDINT routine and those following it. Thus, the CFASCN routine is in practically all respects similar to the MIDINT routine with the exception that no position update is performed after beginning the CFASCN routine as is the case of MIDINT routine.

DECLR DOWN

The DECLR DOWN routine is entered following Step 709.4 of the INT routine of FIG. 27. Turning now to FIG. 44, the DECLR DOWN routine accomplishes deceleration of the stepping motor by first calculating the new rate in the deceleration interval (Step 820a) by subtracting the rate change per increment value $\Delta Hz/INC$ from the current rate. Thereafter, the divisor of counter 410 is obtained from the above result (Step 820b) by calling the subroutine RATCONV of FIG. 31. Next, to calculate the number of pulses to be output during this interval according to equation (15) the number of deceleration increments remaining is moved into a multiplier register, decremented by one and stored back as the new number of increments remaining (Step 820c) before being multiplied by the total number of deceleration pulses (Step 820d). The result previously obtained during Step 820d is then divided by the value $\alpha$ (Step 820e) to yield the number of pulses to be output during the present increment. The remainder from the division is then added to the accumulated remainder to keep a running total of the fractional pulses (Step 820f). The value $\alpha$ is then subtracted from the accumulated remainder (Step 820g). Thereafter the result is examined (Step 820h). If the result is not negative, then the result is put back into the accumulated remainder storage location "DXPREM" replacing the previous contents (Step 820h.1). Also, the quotients of Step 820e are incremented by 1. If the result is negative, the quotient is tested (Step 820k) to determine whether the quotient is zero. If the quotient is zero, branch T is undertaken to proceed to Step 810c of the DDCFLS routing of FIG. 44b. Otherwise, the ending position of the current interval is obtained by adding or subtracting the quotient of Step 820k to the end position of the last interval in accordance with the forward or reverse direction, respectively (Step 820l).

Next, a position update is performed (Step 820m) by calling the SPOSUPDT described previosuly with respect to FIG. 34. After a position update has been performed, the number of pulses to output in the current interval is calculated (Step 820n). The resulting number of pulses is then compared to the value zero (Step 820o). If the number of pulses is not greater than zero, then branch T is followed to proceed to Step 810c of DDCFLS routine. Otherwise, the number of pulses until the end of the move is calculated (Step 820p) before testing whether the point of final position fast scan has been reached (Step 820q). The point of final position fast scan is calculated by subtracting the number of pulses in the 10 ms decel increment, given to the microprocessor 330 by the microprocessor 148, from the number of pulses left until the end of the move. If the point of final position fast scan has been reached, then the subroutine FPFASC Is entered (Block 820r) to monitor the output pulse train and indicate when final position has been reached. Otherwise, the DDCFLS routine is begun by executing Step 810b to test whether the number of pulses output in the interval is zero.

The foregoing describes an improved stepping motor controller which allows the user to accomplish stepping motor control by programming the acceleration and deceleration time intervals rather than requiring the user to first calculate the required acceleration and deceleration values. While only certain preferred fetures of the invention have been shown by way of illustration, many modifications and changes will occur to those skilled in the art. It is, therefore, to be understood that the appended claims are intended to cover all such modifications and changes as fall within the true spirit of the invention.

The attached appendix lists the preferred integrated circuits comprising the master controller module and the satellite output module.

APPENDIX

| Component Reference Number | Typical Component Type |
| --- | --- |
| Microprocessor 100, 330 | Intel Model 8039 Microprocessor |
| Address latches 110, 151, 156, 335 and Transparent Data latch 221 | Texas Instruments Model 74LS373 latch |
| Data Buffer 114, 138, 154, 174 and Data Buffer 360 | Texas Instruments Model 74LS245 Data Buffer |
| Address Latch 116 | Texas Instruments Model 74LS175 latch |
| Programmable Read Only Memory 125 | Intel Model 2716 or Texas Instruments Model 2516 Programmable Read Only Memory |
| Temporary Random Access Memory 128 and Common Random Access Memory 135 | (Two) Intel Model 2114 Random Access Memories |
| Address Multiplexer 130 | (Three) Texas Instruments Model 74LS157 Multiplexers |
| Microprocessor 148 | Intel Model 8088 Microprocessor |
| Random Access Memory 162 | Hitachi Model HM6116 Random Access Memory |
| Programmable Read Only Memory 166 | Intel Model 2764 Programmable Read Only Memory |
| Data Buffer 190, 365 | National Semiconductor Model DP8304 Data Buffer |
| Address Demultiplexer 195 | Texas Instruments Model 74LS138 Demultiplexer |
| NOR GATES 200, 210, | Texas Instruments Model 74LS27 NAND GATE |
| NOT GATES 202, 204, 382, 394, 415 | Texas Instruments Model 74LS04 NOT GATE |
| Flip Flops 206, 212, 262, 294, 300 and 380 | Texas Instruments Model 74LS74D-Flip Flop |
| OR GATES 218, 225 and 288 | Texas Instruments Model 74LS32 GATE |
| Data Latch 230 | Texas Instruments Model 74LS273 D-Type latch |
| Transparent Data Latch 234 | American Microsystems Devices Model AM25S533 Data Latch |
| AND GATE 215, 250 and 260 | Texas Instruments Model 74LS08 GATE |
| NAND GATE 268, 384, 400 | Texas Instruments Model |

APPENDIX-continued

| Component Reference Number | Typical Component Type |
|---|---|
| and 420 | 74LS00 GATE |
| Programable Interval Timer 280 | Intel Model 8284A Programmable Interval Timer |
| One Shot Multivibrator 285, 290 | Texas Instruments Model 74LS221 One Shot Multivibrator |
| Flip Flop 287 | Texas Instruments Model 74109 Flip Flop |
| Programmable Timer 298 and 410 | Intel Model 8253-5 Programmable Timer |
| Buffer GATE 301 | Texas Instruments Model 74367 GATE |
| Output Port Latch 305 | Texas Instruments Model 74LS374 Latch |
| Programmable Read Only Memory 166 and 340 | Intel Model 2732A Programmable Read Only Memory |
| Optical Isolators 345a, 345b, 345c | Model 6N139 Optical Isolator |
| Exclusive OR GATES 348a, b, c | Texas Instruments Model 74LS86 |
| Random Access Memory 355 | (Two) Intel Model 2111A Random Access Memory |
| Address Multiplexer 364 | (Three) Texas Instruments Model 74LS157 Multiplexers |
| Latch 370 | Texas Instruments Model 74LS174 Latch |
| Exclusive NOR GATE 374a, 374b, 374c | Texas Instruments Model 74LS266 GATE |
| Counter 392 | RCA Model CD4520 Counter |
| NOT GATE 386 | Texas Instruments Model 74LS240 GATE |

We claim:

1. A stepping motor controller for controlling stepping motor rate and position to achieve a stepping motor move profile that includes an acceleration interval and a deceleration-to-zero interval, the controller comprising:
   a main processor which stores a plurality of move profile parameters which are input by the user in a move data block including
   (i) an acceleration interval for stepping motor acceleration,
   (ii) a steady state rate,
   (iii) a deceleration interval for stepping motor deceleration, and
   (iv) a final position,
   the main processor being operable to transmit the move data block to direct the movement of the stepping motor to achieve the move profile;
   a master controller module coupled to said main processor for receiving said move data block transmitted by said main processor and for processing said move data block to yield a satellite move set data block containing data elements including
   (i) a stepping acceleration value to achieve stepping motor acceleration to said steady rate during the stepping motor acceleration interval,
   (ii) a stepping motor deceleration value to achieve stepping motor deceleration from said steady state rate to a zero rate during the deceleration interval,
   (iii) said steady state rate, and
   (iv) said final position; and
   a satellite output module coupled to the master controller module for obtaining said satellite move set data block from said master module and coupled to said stepping motor for supplying pulses to said stepping motor responsive to said satellite move set data block to accelerate the stepping motor to said steady state rate at said acceleration value specified by said satellite move set data block and to decelerate the stepping motor from the steady state rate to a zero rate to reach the final position at said deceleration value specified by said satellite move set data block.

2. The apparatus according to claim 1 wherein said satellite output module includes means operative to record status and position data indicative of the position and status, respectively, of said stepping motor and wherein said master module includes means operative to read the status and position data from said satellite output module and to transmit said status and position data to said main processor.

3. The apparatus according to claim 1 wherein said master controller module comprises
   a communications processor programmed to receive said move data block from said main processor and to control data communications with said main processor;
   an arithmetic processor coupled to said communications processor and programmed to receive said move data block from said communications processor and to process said move block data to produce said satellite move set data block containing data elements including said stepping motor acceleration and deceleration values; and
   memory means for storing the program executed by said communications processor and said arithmetic processor and for storing said move data block received from said main processor and for storing said satellite move set data block generated by said arithmetic processor.

4. The invention according to claim 1 wherein said satellite output module comprises:
   a data processor for reading said satellite move set data block and for processing said satellite move set data block received from said master controller module to generate data indicative of the number of pulses required to be periodically output to the stepping motor with periodic changes in rate to achieve stepping motor acceleration to the steady state rate within the acceleration interval and to generate data indicative of the number of pulses required to be output to said stepping motor with periodic change in rate to achieve stepping motor deceleration to a zero rate during the deceleration interval to reach the final position;
   a memory for storing the program executed by said data processor and for storing said generated data; and
   a timing means coupled to said data processor and to said memory and being loaded from said memory by said data processor with timing data derived from said generated data, said timing means generating periodic output pulses to said stepping motor, the frequency of said pulses being determined by the timing data, with the timing data being periodically reloaded with new timing data in periodic increments to achieve stepping motor acceleration to the steady state rate and stepping motor deceleration to a zero rate to reach said final position.

5. The invention according to claim 4 wherein:
   said data processor includes an accumulating register, said accumulating register accumulating fractional values indicative of the fractional remainder from the calculations based upon said generated data of the number of pulses to be output during each incremental period of the stepping motor acceleration interval and the stepping motor deceleration interval; and said data processor adjusting said generated data whenever the fractional value accumulated in said accumulating register exceeds a pre-determined threshold.

6. A programmable controller for controlling the rate and position of a stepping motor during a move profile that includes an acceleration interval and a deceleration-to-zero interval, the programmable controller comprising:

a central processor unit with memory means for storing a plurality of data elements which are input by the user including
  (i) an acceleration time interval for stepping motor acceleration;
  (ii) at least one steady-state rate;
  (iii) a deceleration time interval for stepping motor deceleration; and
  (iv) a final position to be reached at the end of the move profile;

a communication channel with one end connected to the central processor unit and with another opposite end;

wherein the central processor unit also includes means coupled to the memory means and coupled to the communication channel for transmitting the data elements through the communication channel; and a motor control interface coupled between the opposite end of the communication channel and the stepping motor and operable to receive the data elements, and to control the stepping motor accordingly, said motor control interface including master controller means responsive to the data elements for determining an acceleration value to accelerate the stepping motor to the steady state rate and for determining a deceleration value for deceleration from the steady state rate to a zero rate to reach the final position, said master controller means being operable to communicate the acceleration value and deceleration value; and satellite output means coupled to the stepping motor and coupled for communication with said master controller means for receiving said acceleration value and said deceleration value, and said satellite output means being responsive to said acceleration value and said deceleration value for supplying pulses which are coupled to the stepping motor to achieve stepping motor acceleration to the steady state rate and deceleration to a zero rate to reach the final position over the acceleration and deceleration time intervals respectively while minimizing any error between the time interval specified in the data elements and the time interval achieved in reaching the final position.

7. The invention according to claim 6 wherein said communications channel comprises a parallel bus.

8. The apparatus according to claim 6 wherein said master controller means comprises:

a communications processor programmed to receive said data elements from said central processor unit and to control data communications with said central processor unit;

an arithmetic processor coupled to said communications processor and programmed to receive said data elements from said central processing unit and to process said data elements to calculate the stepping motor acceleration value and the stepping motor deceleration value; and memory means for storing the program for said communications processor and the program for said arithmetic processor and for storing said data elements received from said central processor unit, said memory means also storing the stepping motor acceleration value and said stepping motor deceleration value.

9. The invention according to claim 6 wherein said satellite output means comprises:

a data processor for processing said stepping motor acceleration value and said stepping motor deceleration value received from said master controller means and to generate acceleration pulse data indicative of the periodic increment in the number of pulses required to be output to the stepping motor over a fixed incremental period of the total acceleration interval to achieve stepping motor acceleration to the steady state rate within the acceleration interval and to generate deceleration pulse data indicative of the periodic decrement in the number of pulses required to be output to said stepping motor over a fixed incremental period of the total deceleration interval to achieve stepping deceleration to a zero rate during the deceleration interval to reach the final position;

a memory for storing the program executed by said data processor and for storing said acceleration pulse data and said deceleration pulse data; and a timing means coupled to said data processor and to said memory and being loaded from said memory by said data processor with timing data, said timing means generating periodic output pulses to said stepping motor, the frequency of said pulses being determined by the timing data, with the timing data being periodically reloaded with new timing data during each said incremental period of the acceleration and deceleration intervals, said timing data and said new timing data being determined by said acceleration and deceleration pulse data respectively.

10. A method for controlling a stepping motor to accomplish a stepping motor move profile including an acceleration to a steady state rate and a deceleration from a steady state rate to a zero rate to reach a final position comprising the steps of:

(a) reading a move data block which stores a plurality of move parameters which are input by the user including
  (i) an acceleration interval
  (ii) a deceleration interval
  (iii) a final position
  (iv) a steady state rate (b) processing the move data block to yield move data elements including
  (i) a stepping motor acceleration value to achieve stepping motor acceleration to the steady state rate within the acceleration interval
  (ii) a stepping motor deceleration value to achieve stepping motor deceleration from the steady state rate to a zero rate to reach the final position within the deceleration interval (c) accelerating the stepping motor to a steady state rate by periodically (i) incrementing the stepping motor rate according to the acceleration value to yield a new stepping motor rate (ii) output the new rate (iii) checking whether the steady state stepping motor rate has been reached and repeating the steps of (i) incrementing the stepping motor rate, and (ii) outputting the new rate until the steady state stepping motor rate is reached; and (d) decelerating the stepping motor to a zero rate by periodically (i) decreasing the current stepping motor rate according to the deceleration value to yield a new stepping motor rate (ii) calculating the number of pulses required to be output during the current incremental period to achieve the new stepping motor rate (iii) outputting the calculated number of pulses to the stepping motor during the current incremental period (iv) repeating the steps of (i) decreasing the current stepping motor rate, (ii) calculating the number of pulses and (iii) outputting the calculated number of pulses to decelerate the motor to a zero rate to reach the final position.

11. The method according to claim 10 wherein the stepping motor acceleration value is calculated in accordance with the ratio of the steady state stepping motor rate to the acceleration interval.

12. The method according to claim 10 wherein the stepping motor deceleration value is calculated in accordance with the ratio of the steady state stepping motor rate to the decleration interval.

13. The method according to claim 10 wherein the stepping motor is decelerated once the stepping motor position is at a position calculated to be the position where the deceleration interval must begin to ensure a zero stepping motor rate at the final position.

14. The method according to claim 10 wherein the step (d) (ii) of calculating the number of pulses to be output during an incremental period of deceleration includes the steps of (a) calculating the total number of deceleration interval pulses (P);

(b) calculating the total number of incremental periods (D) during which deceleration interval pulses are to be output to the stepping motor;

(c) determining the integer number of pulses (Q) to be output during the next incremental period in accordance with the calculated total number of deceleration interval pulses (P), the total number of incremental periods (D), and the number of incremental periods remaining in the deceleration interval; and (d) accumulating the remainder from each successive calculation in (c) above and incrementing the number of integer pulses (Q) when the accumulated remainder exceeds a preselected value.

15. The method according to claim 10 including the step of verifying that the move parameters constitute a valid move profile and aborting the stepping motor move if the move parameters do not constitute a valid move profile.

16. The method according to claim 10 wherein the step (d) (iv) of repeating the steps (i) decreasing the current stepping motor rate, (ii) calculating the number of pulses and (iii) outputting the calculated number of pulses is performed until the stepping motor position is less than a preselected distance from the final position.

17. A method for controlling a stepping motor to decelerate the stepping motor from a steady state rate to a zero rate to reach a final position within a deceleration interval comprising the steps of:

(a) calculating the stepping motor deceleration value required to decelerate the stepping motor to a zero rate within the deceleration interval;

(b) determining the point of deceleration initiation based upon the final position, the steady state rate, and the deceleration interval;

(c) commencing deceleration of the stepping motor when the stepping motor current position is at said point of deceleration initiation by periodically:

(i) decreasing the current stepping motor rate according to the deceleration value to yield a new stepping motor rate, (ii) calculating the number of pulses required to be output during the current incremental period to achieve the new stepping motor rate, (iii) outputting the calculated number of pulses to the stepping motor during the current incremental period, and (iv) repeating the steps of (i) decrementing the current stepping motor rate, (ii) calculating the number of pulses, and (iii) outputting the calculated number of pulses to decelerate the motor until a zero rate is achieved to reach the final position.

18. The method according to claim 17 wherein the step (c) (ii) of calculating the number of pulses required to be output during the current incremental period to achieve the new stepping motor rate includes the steps of:

(a) calculating the total number of deceleration interval pulses (P) required to be output during the deceleration interval to reach the final position;

(b) calculating the total number of incremental periods (D) during which the deceleration interval pulses are to be output to the stepping motor;

(c) determining the integer number of pulses to be output during the next incremental period in accordance with the total number of deceleration interval pulses (P), the total number of incremental periods (D), and the number of incremental periods remaining in the deceleration interval;

(d) saving the fractional pulse remainder if any resulting from the calculation of the integer number of pulses to be output during the next incremental period;

(e) accumulating the value of the saved fractional pulse remainders of successive calculations; and (f) incrementing the number of integer pulses to be output when the accumulated remainder exceeds a preselected value.

19. The invention according to claim 18 wherein the step of accumulating the value of the saved fractional pulse remainders comprises the steps of:

(a) establishing a multiplier value in accordance with the number of deceleration increments;

(b) multiplying the multiplier value by a quantity proportional to the number of pulses to be output during the next incremental period;

(c) adding the result of the multiplication to the accumulated remainder.

* * * * *